(12) United States Patent
Rogojina et al.

(10) Patent No.: US 10,920,035 B2
(45) Date of Patent: Feb. 16, 2021

(54) TUNING DEFORMATION HYSTERESIS IN TIRES USING GRAPHENE

(71) Applicant: Lyten, Inc., Sunnyvale, CA (US)

(72) Inventors: Elena Rogojina, San Jose, CA (US); Bryce H. Anzelmo, Mountain View, CA (US); Daniel Cook, Woodside, CA (US); Bruce Lanning, Littleton, CO (US); Margaret Hines, San Jose, CA (US)

(73) Assignee: LytEn, Inc., San Jose, CA (US)

( * ) Notice: Subject to any disclaimer, the term of this patent is extended or adjusted under 35 U.S.C. 154(b) by 67 days.

(21) Appl. No.: 16/422,895

(22) Filed: May 24, 2019

(65) Prior Publication Data

US 2019/0315939 A1 Oct. 17, 2019

Related U.S. Application Data

(63) Continuation-in-part of application No. 15/918,422, filed on Mar. 12, 2018, now Pat. No. 10,428,197.
(Continued)

(51) Int. Cl.
*C08J 3/20* (2006.01)
*C08K 3/04* (2006.01)
(Continued)

(52) U.S. Cl.
CPC ............ *C08K 3/042* (2017.05); *B60C 1/0016* (2013.01); *B60C 11/0008* (2013.01);
(Continued)

(58) Field of Classification Search
CPC ................................ C08J 11/04; C09C 1/482
(Continued)

(56) References Cited

U.S. PATENT DOCUMENTS

| 3,217,056 A | 11/1965 | Kurt et al. |
| 3,409,695 A | 11/1968 | Kurt et al. |

(Continued)

FOREIGN PATENT DOCUMENTS

| CN | 1112086 A | 11/1995 |
| CN | 1207189 C | 6/2005 |
| CN | 100368080 | 2/2008 |
| CN | 101580241 A | 11/2009 |
| CN | 101885481 A | 11/2010 |
| CN | 101993060 A | 3/2011 |

(Continued)

OTHER PUBLICATIONS

"Pyrolytic Carbon," Biomedical Engineering Desk Reference, Oxford, UK: Elsevier, 2009, pp. iii-vi and 267.
(Continued)

*Primary Examiner* — Khanh T Nguyen
(74) *Attorney, Agent, or Firm* — Paradice & Li LLP

(57) ABSTRACT

Methods include determining a desired hysteretic curve that corresponds to a set of dynamic mechanical analysis parameters, where the desired hysteretic curve comprises elastic portions and plastic portions, and the elastic and plastic portions comprise specific desired shapes. A first tuned carbon is selected, the first tuned carbon facilitating achievement of a desired shape of a particular elastic portion of the hysteretic curve. One or more selected post-treatments is performed on the first tuned carbon to form a first post-treatment carbon, the selected post-treatment facilitating achievement of a desired shape of a particular plastic portion of the hysteretic curve. The methods also include combining the first post-treatment carbon with other materials that are used in components of the tire and curing the combination comprising the first post-treatment carbon and the other materials. Carbon and elastomer compounds are also disclosed.

8 Claims, 30 Drawing Sheets

Related U.S. Application Data

(60) Provisional application No. 62/676,628, filed on May 25, 2018, provisional application No. 62/630,179, filed on Feb. 13, 2018, provisional application No. 62/581,533, filed on Nov. 3, 2017, provisional application No. 62/472,058, filed on Mar. 16, 2017.

(51) Int. Cl.
   *C01B 32/21* (2017.01)
   *C01B 32/194* (2017.01)
   *B60C 11/00* (2006.01)
   *B60C 1/00* (2006.01)
   *C08K 9/02* (2006.01)

(52) U.S. Cl.
   CPC ............ *C01B 32/194* (2017.08); *C01B 32/21* (2017.08); *C08J 3/203* (2013.01); *C08K 9/02* (2013.01); *C08K 2201/011* (2013.01)

(58) Field of Classification Search
   USPC .......................................................... 521/41
   See application file for complete search history.

(56) References Cited

U.S. PATENT DOCUMENTS

| | | |
|---|---|---|
| 3,706,445 A | 12/1972 | Gentry |
| 4,701,317 A | 10/1987 | Arakawa et al. |
| 5,143,709 A | 9/1992 | Labes |
| 5,211,923 A | 5/1993 | Harkness et al. |
| 5,321,177 A | 6/1994 | Nakamura et al. |
| 5,321,191 A | 6/1994 | Alagy et al. |
| 5,324,553 A | 6/1994 | Ovshinsky et al. |
| 5,515,011 A | 5/1996 | Pasco |
| 5,556,475 A | 9/1996 | Besen et al. |
| 5,572,866 A | 11/1996 | Loving |
| 5,693,173 A | 12/1997 | Colombo et al. |
| 5,874,705 A | 2/1999 | Duan |
| 5,985,232 A | 11/1999 | Howard et al. |
| 6,120,741 A | 9/2000 | Jacquault et al. |
| 6,156,114 A | 12/2000 | Bell et al. |
| 6,224,736 B1 | 5/2001 | Miyamoto |
| 6,340,912 B1 | 1/2002 | Gerstenberg et al. |
| 6,383,301 B1 | 5/2002 | Bell et al. |
| 6,525,105 B1 * | 2/2003 | Udagawa ............... C09C 1/482 521/41 |
| 6,582,778 B2 | 6/2003 | Namiki et al. |
| 6,599,492 B2 | 7/2003 | Iwamura et al. |
| 6,692,718 B1 | 2/2004 | Osawa |
| 6,805,779 B2 | 10/2004 | Chistyakov |
| 6,884,405 B2 | 4/2005 | Ryzhkov |
| 6,914,556 B1 | 7/2005 | Nyswander |
| 6,916,400 B2 | 7/2005 | Moisan et al. |
| 7,022,149 B2 | 4/2006 | Krause et al. |
| 7,102,110 B2 | 9/2006 | Shinohara |
| 7,608,798 B2 | 10/2009 | Kumar et al. |
| 7,739,029 B2 | 6/2010 | Ishikawa et al. |
| 7,745,528 B2 | 6/2010 | Prud'Homme et al. |
| 7,790,243 B2 | 9/2010 | Radhakrishnan et al. |
| 7,799,119 B2 | 9/2010 | Zakrzewski et al. |
| 7,875,322 B2 | 1/2011 | Kobayashi et al. |
| 7,981,396 B2 | 7/2011 | Harutyunyan |
| 8,034,321 B2 | 10/2011 | Mauthner et al. |
| 8,075,869 B2 | 12/2011 | Zhu et al. |
| 8,110,026 B2 | 2/2012 | Prud'Homme et al. |
| 8,114,375 B2 | 2/2012 | Jang et al. |
| 8,147,765 B2 | 4/2012 | Muradov et al. |
| 8,222,579 B2 | 7/2012 | Taguchi et al. |
| 8,337,764 B2 | 12/2012 | Yang et al. |
| 8,475,760 B2 | 7/2013 | Rajala et al. |
| 8,603,402 B2 | 12/2013 | Chang et al. |
| 8,636,960 B2 | 1/2014 | Spitzl et al. |
| 8,808,507 B2 | 8/2014 | Kasin |
| 8,821,745 B2 | 9/2014 | Luo et al. |
| 8,933,629 B2 | 1/2015 | Heil et al. |
| 8,968,588 B2 | 3/2015 | Zhao et al. |
| 8,992,880 B2 | 3/2015 | Terayama et al. |
| 9,051,185 B2 | 6/2015 | Levendis et al. |
| 9,090,756 B2 | 7/2015 | Du et al. |
| 9,090,757 B2 | 7/2015 | Mruk et al. |
| 9,156,699 B2 | 10/2015 | Yamada et al. |
| 9,162,530 B2 | 10/2015 | Du et al. |
| 9,171,679 B2 | 10/2015 | Gogotsi et al. |
| 9,293,302 B2 | 3/2016 | Risby et al. |
| 9,518,157 B2 | 12/2016 | Zhao et al. |
| 9,576,694 B2 | 2/2017 | Gogotsi et al. |
| 9,757,983 B1 | 9/2017 | Du et al. |
| 9,767,992 B1 | 9/2017 | Stowell |
| 9,862,602 B1 | 1/2018 | Riso et al. |
| 9,862,606 B1 | 1/2018 | Cook et al. |
| 2002/0050323 A1 | 5/2002 | Moisan et al. |
| 2003/0024806 A1 | 2/2003 | Foret |
| 2003/0086859 A1 | 5/2003 | Kawakami et al. |
| 2003/0138365 A1 | 7/2003 | Obidniak et al. |
| 2004/0029339 A1 | 2/2004 | Yamamoto et al. |
| 2004/0245088 A1 | 12/2004 | Gardner |
| 2004/0261617 A1 | 12/2004 | Stewart |
| 2004/0265211 A1 | 12/2004 | Dillon et al. |
| 2005/0003247 A1 | 1/2005 | Pham |
| 2005/0089684 A1 | 4/2005 | Barron et al. |
| 2005/0121309 A1 | 6/2005 | Chhowalla et al. |
| 2005/0123467 A1 | 6/2005 | Harutyunyan |
| 2005/0163696 A1 | 7/2005 | Uhm et al. |
| 2005/0253529 A1 | 11/2005 | Kumar et al. |
| 2006/0078488 A1 | 4/2006 | Suemura et al. |
| 2007/0186470 A1 | 8/2007 | Ennis |
| 2007/0212254 A1 | 9/2007 | Nagatsu |
| 2007/0274893 A1 | 11/2007 | Wright et al. |
| 2008/0029030 A1 | 2/2008 | Goto et al. |
| 2009/0060805 A1 | 3/2009 | Muradov et al. |
| 2009/0194528 A1 | 8/2009 | Kotzian et al. |
| 2009/0196801 A1 | 8/2009 | Mills |
| 2009/0220767 A1 | 9/2009 | Schlogl et al. |
| 2010/0036023 A1 | 2/2010 | Weng et al. |
| 2010/0056819 A1 | 3/2010 | Jang et al. |
| 2010/0233366 A1 | 9/2010 | Fukushima et al. |
| 2011/0033639 A1 | 2/2011 | Coll et al. |
| 2011/0036014 A1 | 2/2011 | Tsangaris et al. |
| 2011/0059006 A1 | 3/2011 | Donnet et al. |
| 2011/0206946 A1 | 8/2011 | Schmidt et al. |
| 2012/0034137 A1 | 2/2012 | Risby |
| 2012/0058397 A1 | 3/2012 | Zhamu et al. |
| 2012/0094175 A1 | 4/2012 | Sheem et al. |
| 2012/0107525 A1 | 5/2012 | Ohmae |
| 2012/0189530 A1 | 7/2012 | Marmaro et al. |
| 2012/0258374 A1 | 10/2012 | Raston et al. |
| 2013/0136684 A1 | 5/2013 | Wu et al. |
| 2013/0150516 A1 | 6/2013 | Lettow |
| 2013/0248773 A1 | 9/2013 | Chang et al. |
| 2013/0270110 A1 | 10/2013 | Sasai et al. |
| 2013/0296479 A1 | 11/2013 | Martin et al. |
| 2013/0310495 A1 | 11/2013 | Kim et al. |
| 2014/0030181 A1 | 1/2014 | Liu et al. |
| 2014/0159572 A1 | 6/2014 | Risby et al. |
| 2014/0208638 A1 | 7/2014 | Thorre et al. |
| 2014/0238842 A1 | 8/2014 | Gokhale et al. |
| 2014/0251955 A1 | 9/2014 | Itoh et al. |
| 2014/0263202 A1 | 9/2014 | Partridge |
| 2014/0313636 A1 | 10/2014 | Tour et al. |
| 2014/0353207 A1 | 12/2014 | Strohm et al. |
| 2015/0023858 A1 | 1/2015 | Tour et al. |
| 2015/0044565 A1 | 2/2015 | Wang et al. |
| 2015/0073072 A1 | 3/2015 | Kim et al. |
| 2015/0179294 A1 | 6/2015 | Kim et al. |
| 2015/0246813 A1 | 9/2015 | Koveal et al. |
| 2015/0267063 A1 | 9/2015 | Drewer et al. |
| 2015/0299437 A1 | 10/2015 | Mruk et al. |
| 2016/0032062 A1 | 2/2016 | Clauss et al. |
| 2016/0043384 A1 | 2/2016 | Zhamu et al. |
| 2016/0045841 A1 | 2/2016 | Kaplan et al. |
| 2016/0059197 A1 | 3/2016 | Stevanovic et al. |
| 2016/0137506 A1 | 5/2016 | Amault et al. |
| 2016/0141114 A1 | 5/2016 | Shelke et al. |
| 2016/0172123 A1 | 6/2016 | Yang et al. |

(56) References Cited

U.S. PATENT DOCUMENTS

| | | |
|---|---|---|
| 2016/0185603 A1 | 6/2016 | Bozalina et al. |
| 2016/0243518 A1 | 8/2016 | Spitzl |
| 2016/0276055 A1 | 9/2016 | Choi et al. |
| 2016/0340495 A1 | 11/2016 | Pan et al. |
| 2017/0073522 A1 | 3/2017 | Hardman et al. |
| 2017/0096341 A1 | 4/2017 | Chen et al. |
| 2017/0113935 A1 | 4/2017 | Pennington et al. |
| 2017/0174520 A1 | 6/2017 | Walters et al. |
| 2018/0022925 A1 | 1/2018 | Hardman et al. |
| 2018/0099871 A1 | 4/2018 | Tanner et al. |
| 2018/0327611 A1 | 11/2018 | Scheffer et al. |

FOREIGN PATENT DOCUMENTS

| | | |
|---|---|---|
| CN | 101997120 A | 3/2011 |
| CN | 201789030 U | 4/2011 |
| CN | 101905881 B | 5/2013 |
| CN | 102502597 B | 6/2013 |
| CN | 102757038 B | 2/2014 |
| CN | 103935989 A | 7/2014 |
| CN | 104058396 A | 9/2014 |
| CN | 103382025 B | 1/2015 |
| CN | 102674321 B | 2/2015 |
| CN | 104528690 B | 8/2016 |
| CN | 105833797 A | 8/2016 |
| CN | 105870419 A | 8/2016 |
| CN | 106098944 A | 11/2016 |
| CN | 106398802 A | 2/2017 |
| EP | 0184475 B1 | 5/1989 |
| EP | 0808682 A3 | 3/2000 |
| EP | 1469941 B1 | 10/2007 |
| EP | 1502486 B1 | 11/2011 |
| EP | 2702839 B1 | 3/2015 |
| JP | H0290939 A | 3/1990 |
| JP | H05208805 A | 8/1993 |
| JP | 2000150195 A | 5/2000 |
| JP | 2001122690 A | 5/2001 |
| JP | 2001220114 A | 8/2001 |
| JP | 2003212502 | 7/2003 |
| JP | 3437066 B2 | 8/2003 |
| JP | 3544267 B2 | 7/2004 |
| JP | 2004323345 A | 11/2004 |
| JP | 2004346385 A | 12/2004 |
| JP | 4411039 B2 | 2/2010 |
| JP | 2012059462 A | 3/2012 |
| JP | 5162061 B2 | 3/2013 |
| JP | 2003206102 | 7/2013 |
| JP | 5298309 B2 | 9/2013 |
| JP | 5375197 B2 | 12/2013 |
| JP | 5649186 B2 | 1/2015 |
| JP | 6044934 B2 | 12/2016 |
| KR | 100583500 B1 | 5/2006 |
| WO | 1999012184 A2 | 3/1999 |
| WO | 2000014518 A1 | 3/2000 |
| WO | 2001009031 A1 | 2/2001 |
| WO | 2004092058 A2 | 10/2004 |
| WO | 2007001412 A2 | 1/2007 |
| WO | 2010094969 A1 | 8/2010 |
| WO | 2014090992 A3 | 8/2014 |
| WO | 2015157280 A1 | 10/2015 |
| WO | 2015189643 A1 | 12/2015 |
| WO | 2015193155 A1 | 12/2015 |
| WO | 2015193267 A1 | 12/2015 |
| WO | 2016001476 A1 | 1/2016 |
| WO | 2016040948 A1 | 3/2016 |
| WO | 2016126599 A1 | 8/2016 |
| WO | 2016135328 A1 | 9/2016 |

OTHER PUBLICATIONS

Abanades et al., Experimental analysis of direct thermal methane cracking, International Journal of Hydrogen Energy, vol. 36, Issue 20, Oct. 2011, pp. 12877-12886.

Abbas and Wan Daud, Hydrogen production by methane decomposition: A review, International Journal of Hydrogen Energy, vol. 35, Issue 3, Feb. 2010, pp. 1160-1190.

Ahmed et al., Decomposition of hydrocarbons to hydrogen and carbon, Applied Catalysis A: General vol. 359, Issues 1-2, May 2009, pp. 1-24.

Alexandrou et al., Structure of carbon onions and nanotubes formed by arc in liquids, Journal of Chemical Physics, vol. 120, No. 2, Jan. 2004, pp. 1055-1058.

Asokan et al., Microwave irradiation on carbon black: Studies on the transformation of particles into nano-balls, nano-sticks and nano-onion like structures, Journal of Physics and Chemistry of Solids, vol. 99, Dec. 2016, pp. 173-181.

Baldissarelli, Vanessa et al., "Plasma-Assisted Production of Carbon Black and Carbon Nanotubes from Methane by Thermal Plasma Reform," J. Braz., Chem. Soc., vol. 25, No. 1, 126-132, 2014, pub. online: Nov. 26, 2013.

Beguin et al., Carbons and Electrolytes for Advanced Supercapacitors. Adv. Mater., 26, Feb. 2014, pp. 2219-2251.

Berezkin, Fullerenes as nuclei of carbon black particles, Physics of the Solid State, , vol. 42, No. 3, Mar. 2000, p. 580-585.

Berezkin, Nucleation and Growth of Closed Many-Layer Carbon Particles, Phys. Stat. Sol. (b), 226, Jul. 2001, pp. 271-284.

Biomedical Engineering Desk Reference. Oxford: Academic Press, 2009, pp. iii-vi, 267, Print.

Bu, Synthesis of graphitic carbon nano-onions for dye sensitized solar cells, Solar Energy, vol. 105, Jul. 2014, pp. 236-242.

Buchholz et al., Mechanism for the growth of multiwalled carbon-nanotubes from carbon black, Carbon, vol. 41, Issue 8, Mar. 2003, pp. 1625-1634.

Bushueva et al., Double layer supercapacitor properties of onion-like carbon materials, Phys. Status Solidi B, vol. 245, No. 10, Oct. 2008, pp. 2296-2299.

Bystrzejewski et al., "Catalyst-free synthesis of onion-like carbon nanoparticles," New Carbon Materials, vol. 25, No. 1, Feb. 2010, p. 1-8.

Bystrzejewski et al., Catalyst-free synthesis of onion-like carbon nanoparticles, New Carbon Materials, vol. 25, Issue 1, Feb. 2010, pp. 1-8.

Cabioch et al., Fourier transform infra-red characterization of carbon onions produced by carbon-ion implantation, Chemical Physics Letters 285(3), Mar. 1998, pp. 216-220.

Cadez et al., "Influence of Hydrocarbons on Vibrational Excitation of H2 Molecules", Nuclear Engineering and Design, vol. 241, Apr. 2011, p. 1267-1271.

Cadez et al., Influence of hydrocarbons on vibrational excitation of H2 molecules, Nuclear Engineering and Design 241, Apr. 2011), 1267-1271.

Chen et al., New method of carbon onion growth by radio-frequency plasma-enhanced chemical vapor deposition, Chemical Physics Letters 336, Mar. 2001, pp. 201-204.

Cho et al., Conversion of natural gas to hydrogen and carbon black by plasma and application of plasma carbon black, Catalysis Today, vol. 98, Issue 4, Nov. 2004, pp. 633-638.

Choucair and Stride, The gram-scale synthesis of carbon onions, Carbon, vol. 50, Issue 3, Mar. 2012, pp. 1109-1115.

Chung et al., Flame synthesis of carbon nano-onions enhanced by acoustic modulation, Nanotechnology, vol. 21, No. 43, Oct. 2010, 11 pages.

Das et al., Formation of onion-like fullerene and chemically converted graphene-like nanosheets from low-quality coals: application in photocatalytic degradation of 2-nitrophenol, RSC Advances, Issue 42, Apr. 2016, 41 pages.

Definition of coat, accessed online at https://www.merriam-webster.com/dictionary/coat on Jul. 24, 2017.

Definition of coating, accessed on line at https://www.merriam-webster.com/dictionary/coating on Jul. 24, 2017.

Deshmukh et al., Carbon spheres, Materials Science and Engineering: R: Reports, vol. 70, Issues 1-2, Sep. 20, 2010, pp. 1-28.

Dhand et al., Flame synthesis of carbon nano onions using liquefied petroleum gas without catalyst, Materials Science and Engineering: C, vol. 33, Issue 2, Mar. 2013, pp. 758-762.

(56) References Cited

OTHER PUBLICATIONS

Dorobantu et al., Pulse Laser Ablation System for Carbon Nano-Onions Fabrication, Surface Engineering and Applied Electrochemistry, vol. 50, Issue 5, Sep. 2014, pp. 19-23.
Dresselhaus, et al., Science of Fullerenes and Carbon Nanotubes, pp. 60-79 (Academic Press 1996).
Fan et al., The production of onion-like carbon nanoparticles by heating carbon in a liquid alcohol, Journal of Materials Chemistry, 22, Issue 19, May 2012, pp. 9794-9797.
Final Office Action dated Mar. 21, 2019 for U.S. Appl. No. 15/918,422.
Fu et al, Synthesis of Nano-structured Onion-like Fullerenes by MW Plasma, Journal of Inorganic Materials, vol. 21, No. 3, May 2006, 576-582.
Gao et al., Chemical activation of carbon nano-onions for high-rate supercapacitor electrodes, Carbon, vol. 51, Jan. 2013, pp. 52-58.
Gao et al., Growth of Carbon Nano-Onions in the Open Air by Laser Resonant Excitation of Precursor Molecules, Jan. 2010, 5 pages.
Gao et al., Resonant excitation of precursor molecules in improving the particle crystallinity, growth rate and optical limiting performance of carbon nano-onions, Nanotechnology, 22, Apr. 2011, 6 pages.
Geng et al., Preparation of graphite nanoplatelets and graphene sheets, Journal of Colloid and Interface Science 336, Apr. 2009, pp. 592-598.
Gicquel et al., "New Driving Parameters for Diamond Deposition Reactors: Pulsed Mode versus Continuous Mode", Materials Research, vol. 6, No. 1, p. 25-37, Sep. 2002.
Grieco et al., Fullerenic carbon in combustion-generated soot, Carbon, vol. 38, Issue 4, Dec. 2000, pp. 597-614.
Gubarevich et al., Onion-like carbon deposition by plasma spraying of nanodiamonds, Carbon, vol. 41, Issue 13, Jul. 2003, pp. 2601-2606.
Guo and Jayatissa, Growth of Carbon Nanotubes on Metallic Catalyst by CVD, Proceedings of IMECE2006, 2006 ASME International Mechanical Engineering Congress and Exposition, Nov. 5-10, 2006, Chicago, Illinois, USA, 5 pages.
He et al., Effect of annealing on the structure of carbon onions and the annealed carbon coated Ni nanoparticles fabricated by chemical vapor deposition, Journal of Alloys and Compounds, vol. 472, Issue 1, Mar. 2009, pp. 230-233.
He et al., TEM investigation on the initial stage growth of carbon onions synthesized by CVD, Journal of Alloys and Compounds, vol. 452, Issue 2, Mar. 2008, pp. 258-262.
Hirata and Igarashi, Solid Lubricant Properties of Carbon Onions Prepared by Heat Treatment of Diamond Fine Particles, Journal of the Japan Society for Precision Engineering, vol. 69, No. 5, 2003 pp. 683-687, Released Apr. 10, 2009.
Hof et al., Conductive inks of graphitic nanoparticles from a sustainable carbon feedstock, Carbon 111, Jan. 2017, pp. 142-149.
Hou et al., High-yield synthesis of carbon nano-onions in counterflow diffusion flames, Carbon, vol. 47, Issue 4, Apr. 2009, pp. 938-947.
Hydrogen Atom Beam Source HABS, MBE Komponenten, Dr. Eberl, www.mbe-components.com, Accessed on Feb. 10, 2017, 2 pages.
Iijima, Direct observation of the tetrahedral bonding in graphitized carbon black by high resolution electron microscopy, Journal of Crystal Growth, vol. 50, Issue 3, Nov. 1980, pp. 675-683.
Inaba and Hirata, Lubrication Property of Carbon Onions on Silicon Surface with Fine Patterns, Journal of the Japan Society for Precision Engineering, vol. 76, No. 1, Jul. 2010 p. 59-63.
International Search Report and Written Opinion dated Feb. 9, 2018 for PCT Application No. PCT/US2017/057892.
International Search Report dated Aug. 23, 2018 for PCT Patent Application No. PCT/US2018/015674.
International Search Report dated Jan. 24, 2018 for PCT Patent Application No. PCT/US/2017/055337.
International Search Report dated Jul. 9, 2018 for PCT Patent Application No. PCT/US2018/022420.
International Search Report dated Jun. 25, 2018 for PCT Patent Application No. PCT/US2018/022072.
International Search Report dated Jun. 27, 2018 for PCT Patent Application No. PCT/US2018/015671.
International Search Report dated Jun. 28, 2018 for PCT Patent Application No. PCT/US2018/020963.
Jackel et al., Comparison of carbon onions and carbon blacks as conductive additives for carbon supercapacitors in organic electrolytes, Journal of Power Sources, vol. 272, Dec. 25, 2014, pp. 1122-1133.
Jasinski et al., "Hydrogen Production via Methane Reforming Using Various Microwave Plasma Sources", Chem. Listy 102, s1332-s1337, Jan. 2008.
Jiang et al., Structure and electromagnetic properties of both regular and defective onion-like carbon nanoparticles, Carbon, vol. 95, Dec. 2015, pp. 910-918.
Kaito and Hirata, Synthesis of Numerous Onion-like Fullerenes and Its Application to Solid Lubricant, Japan Society for Precision Engineering, vol. 67, No. 7, 2001, pp. 1175-1179, Released Apr. 2009.
Ko et al., Inherently-Forced Tensile Strain in Nanodiamond-Derived Onion-like Carbon: Consequences in Defect-Induced Electrochemical Activation, Scientific Reports, Apr. 2016, 10 pages.
Kobayashi, Formation of Carbon Onion from Heavily Shocked SiC, Chemistry of Materials, 15 (14), Jun. 2003, pp. 2681-2683.
Kogo and Hirata, Study on applicability of carbon onions as nano-abrasives, Japan Society for Precision Engineering, vol. 77, No. 3, Sep. 2011, pp. 311-315.
Konno et al, Direct Preparation of Hydrogen and Carbon Nanotubes by Microwave Plasma Decomposition of Methane over Fe/Si Activated by Biased Hydrogen Plasma, Green and Sustainable Chemistry, 2013, 3, 19-25, http://dx.doi.org/10.4236/gsc.2013.31004 Published Online Feb. 2013 (http://www.scirp.org/journal/gsc).
Konno et al., "Direct Preparation of Hydrogen and Carbon Nanotubes by Microwave Plasma Decomposition of Methane over Fe/Si Activated by Biased Hydrogen Plasma", Green and Sustainable Chemistry, Nov. 2012, 3, p. 19-25.
Krishnamurthy, Formation of onion-like carbon from the evaporation of ultra-dispersed nanodiamonds, Carbon, vol. 52, Feb. 2013, pp. 145-149.
Kromka et al., Investigation of Carburisation of Tungsten-Carbide Formation by Hot-Filament CVD Technique, Acta Physica Slovaca, 51(6), 359-368, Dec. 2001.
Kuznetsov et al., Onion-like carbon from ultra-disperse diamond, Chemical Physics Letters, vol. 222, Issue 4, May 1994, pp. 343-348.
Kwan, Hot-Filament Chemical Vapor Deposition of Selectively Deposited Diamond and Silicone Thin Films, Submitted to the Department of Chemical Engineering, Massachusetts Institute of Technology, Jul. 15, 1997, 183 pages.
Macutkevic et al., Dielectric Properties of Onion-Like Carbon and Detonation Nanodiamond/Polydimethysiloxane Composites, Polymer Composits, vol. 36, Issue 11, Nov. 2015, pp. 2084-2092.
Merijs-Meri et al., Carbon Nanotubes and Carbon Onions for Modification of Styrene-Acrylate Copolymer Nanocomposites, Polymer Composites, vol. 36, Issue 6, Jun. 2015, pp. 1048-1054.
MGC Series Thermal Gas Cracker, Mantis Deposition Ltd, Accessed on Feb. 10, 2017, 2 pages.
Moustakas, The Role of the Tungsten Filament in the Growth of Polycrystalline Diamond Films by Filament-assisted CVD of Hydrocarbons, Solid State Ionics, vols. 32-33, Part 2, Feb.-Mar. 1989, pp. 861-868.
Muradov et al., Autothermal catalytic pyrolysis of methane as a new route to hydrogen production with reduced $CO_2$ emissions, Catalysis Today 116, Jun. 2006, 281-288.
Namiki and Hirata, Low-temperature catalytic synthesis of carbon onions and evaluation of its solid lubricant property, Japan Society for Precision Engineering, vol. 2004S, 2004, pp. 723-724, Released May 2005.
Non-Final Office Action dated Mar. 21, 2019 for U.S. Appl. No. 15/710,679.

(56) References Cited

OTHER PUBLICATIONS

Nos et al., Real-time monitoring of the silicidation process of tungsten filaments at high temperature used as catalysers for silane decomposition, Materials Chemistry and Physics vol. 143(2), Jan. 2014, pp. 881-888.
Notice of Allowance dated Feb. 15, 2019 for U.S. Appl. No. 15/727,533.
Notice of Allowance dated Jan. 11, 2019 for U.S. Appl. No. 167/003,680.
Notice of Allowance dated Jul. 19, 2017 for U.S. Appl. No. 15/351,858.
Notice of Allowance dated Jul. 28, 2017 for U.S. Appl. No. 15/594,032.
Notice of Allowance dated Jun. 29, 2018 for U.S. Appl. No. 15/794,965.
Notice of Allowance dated Mar. 16, 2018 for U.S. Appl. No. 15/711,620.
Notice of Allowance dated May 24, 2017 for U.S. Appl. No. 15/428,474.
Notice of Allowance dated Nov. 17, 2017 for U.S. Appl. No. 15/594,032.
Notice of Allowance dated Nov. 29, 2017 for U.S. Appl. No. 15/470,450.
Notice of Allowance dated Oct. 11, 2018 for U.S. Appl. No. 15/725,928.
Obraztsova, et al., Raman Identification of Onion-Like Carbon, Carbon 1998; 36(5-6): 821-826.
Office Action dated Dec. 28, 2017 for U.S. Appl. No. 15/725,928.
Office Action dated Jul. 10, 2018 for U.S. Appl. No. 15/725,928.
Office Action dated Jun. 26, 2018 for U.S. Appl. No. 15/727,533.
Office Action dated Mar. 23, 2017 for U.S. Appl. No. 15/428,474.
Office Action dated May 26, 2017 for U.S. Appl. 15/470,450.
Office Action dated Nov. 1, 2018 for U.S. Appl. No. 15/918,422.
Office Action dated Nov. 29, 2017 for U.S. Appl. No. 15/711,620.
Office Action dated Oct. 24, 2017 for U.S. Appl. No. 15/470,450.
Office Action dated Sep. 20, 2018 for U.S. Appl. No. 16/003,680.
Office Action dated Sep. 7, 2017 for U.S. Appl. No. 15/470,450.
Okoli et al., Influence of the Filament Material on Low-Presure Hot-Filament CVD Diamond Deposition, Journal de Physique IV (Proceedings) 02(C2), Sep. 1991, 8 pages.
Onoue et al., Fine structure analysis of spherical carbon particles produced in a methane plasma, Diamond and Related Materials, vol. 27, Jul.-Aug. 2012, pp. 10-13.
Osawa et al., Revival of Carbon Nano-Onions : Towards Alternatives of the Arc Discharge Method for the Production of Fullerenes, Japan Society of Plasma Science and Nuclear Fusion Research, vol. 75, No. 8, 1999, pp. 914-920, Released Dec. 2000.
Ouyang, George B., "Modulus, Hysteresis and the Payne Effect," Construction and Simulation, Jun. 2006, pp. 332-343.
Ozawa and Osawa, Carbon Blacks as the Source Materials for Carbon Nanotechnology, 'Carbon Nanotechnology', Dai, L. (Ed.), Chapt. 6, p. 127-151, Elsevier: Dordrecht, Apr. 2006.
Pech et al., Ultrahigh-power micrometre-sized supercapacitors based on onion-like carbon, Nature Nanotechnology, vol. 5, Aug. 2010, pp. 651-654.
Plonska-Brzezinska and Echegoyen, Carbon nano-onions for supercapacitor electrodes: recent developments and applications, Journal of Materials Chemistry A, Issue 44, Nov. 2013, 11 pages.
Plonska-Brzezinska et al., The synthesis and characterization of carbon nano-onions produced by solution ozonolysis, Carbon, vol. 49, Issue 15, Dec. 2011, pp. 5079-5089.
Portet et al., Electrochemical performance of carbon onions, nanodiamonds, carbon black and multiwalled nanotubes in electrical double layer capacitors, Carbon, vol. 45, Issue 13, Nov. 2007, pp. 2511-2518.
Qiao et al., Structural evolution and Raman study of nanocarbons from diamond nanoparticles, Chemical Physics Letters, vol. 429, Issue 4, Oct. 2006, pp. 479-482.
Rodat et al., Characterisation of carbon blacks produced by solar thermal dissociation of methane, Carbon, vol. 49, Issue 9, May 2011, pp. 3084-3091.
Scientific Background on the Nobel Prize in Physics 2010, Graphene compiled by the Class for Physics of the RoyalSwedish Academy of Sciences, pp. 1-1 (2010).
Shen and Lua, A facile method for the large-scale continuous synthesis of graphene sheets using a novel catalyst, Scientific Reports, 3, 3037, Oct. 2013, pp. 1-6.
Studart et al., Arrested Coalescence of Particle-coated Droplets into Nonspherical Supracolloidal Structures, J. Phys. Chem. B, vol. 113 (12), Jan. 2009, pp. 3914-3919.
Sun et al., Preparation of carbon black via arc discharge plasma enhanced by thermal pyrolysis, Diamond and Related Materials, vol. 61, Jan. 2016, pp. 21-31.
Szerencsi and Radnoczi, The mechanism of growth and decay of carbon nano-onions formed by ordering of amorphous particles, Vacuum, vol. 84, Issue 1, Aug. 2009, pp. 197-201.
Tapia et al., Carbon nano-allotropes produced by ultrasonication of few-layer graphene and fullerene, Carbon, vol. 99, Apr. 2016, pp. 541-546.
Thermal Gas Cracker TGC-H, Specs GmbH, Components for Surface Analysis, www.specs.de, Access on Feb. 10, 2017, 2 pages.
Thune et al., Nucleation and growth of carbon onions synthesized by ion-implantation: a transmission electron microscopy study, Materials Letters, vol. 54, Issue 2, May 2002, pp. 222-228.
Tikhomirov et al., The chemical vapor infiltration of exfoliated graphite to produce carbon/carbon composites, Carbon, vol. 49, Issue 1, Jan. 2011, pp. 147-153.
Tomita et al., Structure and electronic properties of carbon onions, Journal of Chemical Physics, vol. 114, No. 17 May 2001, pp. 7477-7482.
Ugarte, Curling and closure of graphitic networks under electron-beam irradiation, Letters to Nature, vol. 359, Oct. 1992, 707-709.
Ugarte, Graphitic Nanoparticles, MRS Bulletin, vol. 19, Issue 11 Nov. 1994, pp. 39-42.
Universal Thermal Cracker for Surface Science, Oxford Applied Research, www.oaresearch.co.uk, Accessed on Feb. 10, 2017, 2 pages.
Weingarth et al., Graphitization as a Universal Tool to Tailor the Potential-Dependent Capacitance of Carbon Supercapacitors. Adv. Energy Mater., 4, May 2014, 13 pages.
Wu et al., Synthesis of Graphene Sheets with High Electrical Conductivity and Good Thermal Stability by Hydrogen Arc Discharge Exfoliation, ACS Nano, Feb. 2009, vol. 3 (2), pp. 411-417.
Xu, Prospects and research progress in nano onion-like fullerenes, New Carbon Materials, vol. 23, Issue 4, Mar. 2008, pp. 289-301.
Yamada et al., Concentric shell carbon: curling process of graphitic layers, Carbon, vol. 35, Issue 12, Oct. 1997, pp. 1844-1846.
Yamada, Shock synthesis of concentric shell fullerene dimers and trimers, Carbon 42, Jun. 2004, pp. 3003-3042.
Yang et al., Synthesis of nano onion-like fullerenes by chemical vapor deposition using an iron catalyst supported on sodium chloride, J Nanopart Res, 13, May 2011, pp. 1979-1986.
Yeheskel and Epstein, Thermolysis of methane in a solar reactor for mass-production of hydrogen and carbon nano-materials, Carbon vol. 49, Issue 14, Nov. 2011, pp. 4695-4703.
Yuan et al., "Low-temperature plasma preparation and application of carbon black nanoparticles", Chemical Engineering Journal, vol. 253, May 2014, pp. 107-120, ISSN 1385-8947.
Zeiger et al., Review: carbon onions for electrochemical energy storage, Journal of Materials Chemistry A, Issue 6, Mar. 2016, pp. 3172-3196.
Zeiger et al., Understanding structure and porosity of nanodiamond-derived carbon onions, Carbon, vol. 84, Apr. 2015, pp. 584-598.
Zeiger et al., Vacuum or flowing argon: What is the best synthesis atmosphere for nanodiamond-derived carbon onions for supercapacitor electrodes?, Carbon, vol. 94, Nov. 2015, pp. 507-517.
Zhang et al., Graphene-based materials as supercapacitor electrodes, Journal of Materials Chemistry, Issue 29, Aug. 2010, pp. 5983-5992.
Zhang et al., Methane Catalytic Cracking to Make Hydrogen and Graphitic Nano Carbons (Nanotubes, Microfibers, Microballs, Onions)

(56) References Cited

OTHER PUBLICATIONS with Zero Emission, Synthesis and Reactivity in Inorganic, Metal-Organic, and Nano-Metal Chemistry vol. 44, Iss. 8, 2014, pp. 1116-1174, published online: Dec. 17, 2013.

Zhang et al., Microstructure and adsorption property of nanocarbide-derived carbon (CDC) synthesized at ambient temperature, Materials Letters, vol. 130, Sep. 2014, pp. 188-191.

Zheng et al., Development on the Preparation and Application of Onion-like Carbon, Journal of Inorganic Materials, vol. 30 No. 8, Aug. 2015, pp. 793-801.

* cited by examiner

| Partially functionalized Architecture I (graphite decorated graphene scaffold) | Partially functionalized Architecture II (graphene decorated graphite "chain of pearls") |
|---|---|
| 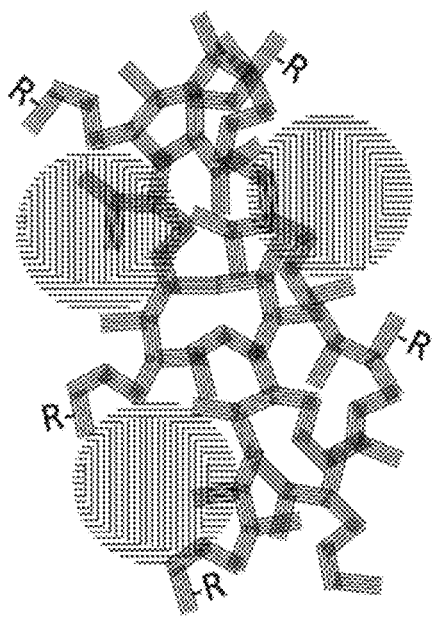 | 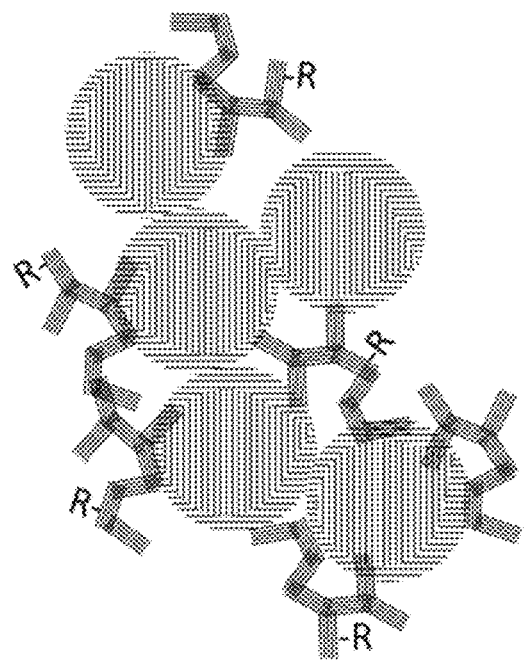 |

R = X, A-Y, B-Z

Direct functionalization via Si-H: X = Aromatics, Siloxanes

Functionalization via linker A (Si-H):
Y = Aromatics, Alkanes, Epoxides, Amines, Polybutadienes, Urethanes, polyesters Functionalization via linker B (O-H):
Z = Aromatics, Alkanes, Epoxides, Amines, M/acrylates

FIG. 4

TUNING DEFORMATION HYSTERESIS IN TIRES USING GRAPHENE

RELATED APPLICATIONS

The present application is a continuation-in-part of U.S. patent application Ser. No. 15/918,422 entitled "Carbon and Elastomer Integration," filed on Mar. 12, 2018, which claims the benefit of: 1) U.S. Provisional Patent Application No. 62/472,058 filed on Mar. 16, 2017, and entitled "Carbon and Elastomer Integration"; 2) U.S. Provisional Patent Application No. 62/581,533 filed on Nov. 3, 2017, and entitled "Carbon and Elastomer Integration"; and 3) U.S. Provisional Patent Application No. 62/630,179 filed on Feb. 13, 2018, and entitled "Carbon and Elastomer Integration," which are hereby incorporated by reference. This application also claims the benefit of priority to U.S. Patent Application No. 62/676,628 entitled "Tires with Structured Carbon Materials for Specific Vehicle Applications," filed on May 25, 2018, which is hereby incorporated by reference in its entirety.

BACKGROUND

Rubber products, tires and seals are made by compounding or mixing fillers, such as carbon black and silica, into rubber, which is then vulcanized. The rubber products typically contain 20-30% by weight carbon black as a reinforcing filler, where the percentage and type of carbon black, the type of rubber used (e.g., natural, synthetic), and additional additive materials and chemicals are varied to customize the properties of the finished product. For vehicle tires, additional structural properties are provided by embedding cords and by using different types of elastomer compounds in the tread, side wall and interior lining. Carbon black—also known in the industry as, for example, acetylene black and furnace black—is a type of carbon that is typically produced by combusting petroleum. A manufacturer, such as a tire manufacturer, typically receives its raw materials (e.g., rubber, carbon black, etc.) from different sources. Carbon black is a light and hard-to-handle material, which drives the tire industry to require the carbon to be densified, i.e. pelletized, so that it can be handled more easily. Pelletizing also can facilitate mixing of the carbon black when added to the elastomer compound. In order to pelletize the carbon, additives are usually required, which can undesirably contaminate the carbon.

SUMMARY

In some embodiments, methods include determining a desired hysteretic curve that corresponds to a set of dynamic mechanical analysis parameters, where the desired hysteretic curve comprises elastic portions and plastic portions, and the elastic and plastic portions comprise specific desired shapes. A first tuned carbon is selected, the first tuned carbon facilitating achievement of a desired shape of a particular elastic portion of the hysteretic curve. One or more selected post-treatments is performed on the first tuned carbon to form a first post-treatment carbon, the selected post-treatment facilitating achievement of a desired shape of a particular plastic portion of the hysteretic curve. The methods also include combining the first post-treatment carbon with other materials that are used in components of the tire and curing the combination comprising the first post-treatment carbon and the other materials.

In some embodiments, a compound comprises an elastomer material and a carbon material. The carbon material includes graphene flakes assembled into three-dimensional scaffolds, where the three-dimensional scaffolds are decorated with graphite particles.

In some embodiments, a compound comprises an elastomer material and a carbon material. The carbon material includes graphitic particles in a chains of pearls structure, wherein the graphitic particles are decorated with graphene flakes.

BRIEF DESCRIPTION OF THE DRAWINGS

The drawings described below are for illustration purposes only. The drawings are not intended to limit the scope of the present disclosure. The drawings are not necessarily to scale.

FIG. 4 illustrates partially functionalized structured microwave graphene architectures, according to an embodiment.

DETAILED DESCRIPTION

Figure 1A:
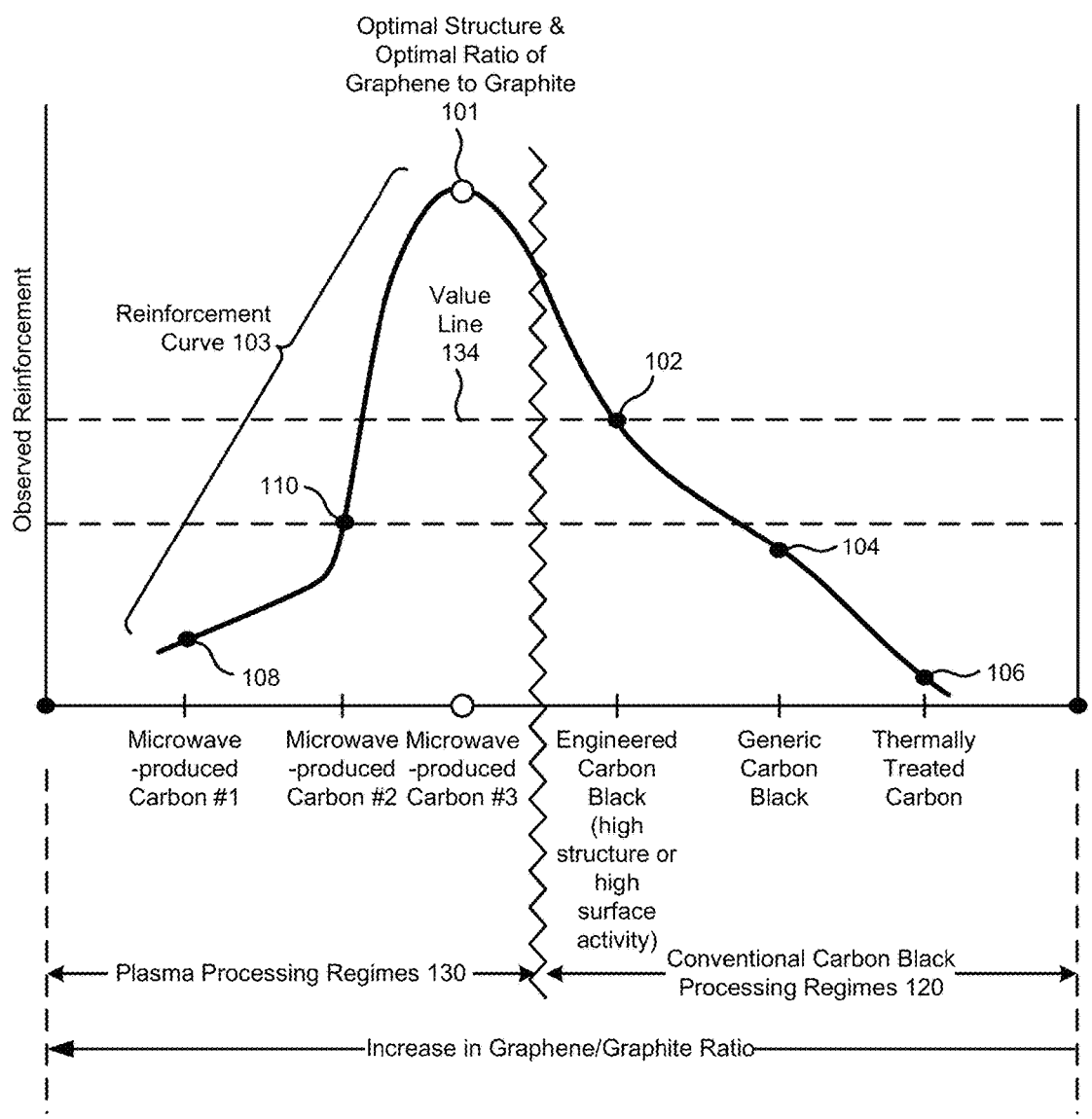
FIG. 1A is a chart for comparing reinforcement properties of carbon blacks produced by conventional methods to structured carbons produced using a microwave plasma reactor, according to some embodiments.

Aspects of the present disclosure solve problems associated with tuning deformation hysteresis of elastomers in tires. Some embodiments are directed to approaches for hysteresis tuning, by introducing specially-processed graphene into the elastomer before curing. The accompanying figures and discussions herein present example environments, systems, and methods for making high-performance, special-application vehicle tires using graphene.

OVERVIEW

Different vehicle types and different vehicle use modes (e.g., commuting, carriage, racing, etc.) demand very different properties of tires. Accordingly, what is desired is a way to manufacture tires that have particular properties that correspond to the different operational regimes (e.g., under vehicle acceleration, under vehicle deceleration, under turning conditions, underweight loading, etc.) that in turn correspond to the foregoing operational modes. More specifically, what is desired is a way to optimize a tire material for a particular elasticity and/or a particular plasticity under different operating conditions of a tire covering a very wide range of temperature, shear amplitude and mechanical deformation oscillation frequencies.

Conventional techniques involving carbon blacks rely on their morphology, and surface activity for the purpose of rubber reinforcement. Modern evidence suggests that surface activity is a function of the number of open edged layer planes exposed at the surface along with the associated unsatisfied carbon bonds, in addition to a function of the surface chemical groups that might be present there. In some cases, the concentration of open-edged layer planes has a larger impact on surface activity than surface chemical groups. This theory fits empirical observations with the process.

In general, when carbon is used to reinforce elastomers, the deformation resistance of the elastomer is improved. It is known that the carbon blacks that provide the highest reinforcement to surface area ratio are those that have been produced using the shortest reaction time, and thus shortest exposure to high temperatures of the process. Such higher surface activity carbon blacks (i.e., those that have been produced using the shortest reaction time, and thus shortest exposure to high temperatures of the process) are examples of modern carbon blacks used for rubber applications. The immediate precursor of finished carbon black includes very rough-surfaced particles composed of fused microcrystalline arrays, joined in a random fashion, and oriented in such a way that the ends of planes are exposed along with large number of unsatisfied carbon bonds. Presence of these graphene-like edges of graphitic planes results in the most active carbon black surface that can be obtained using known-in-the-art techniques.

However, such a random arrangement is metastable, and as such, the long exposure times to high temperatures that are involved in carbon black production processes cause realignment of the microcrystalline arrays. This realignment tends to decrease the fraction of the exposed graphitic plane edges, and thereby decreasing the occurrence of unsatisfied carbon bonds. Under sufficient heat treatment these arrays will rearrange themselves in such a way that the layered graphitic planes will lie with only planes at the surface, thereby effectively satisfying the largest possible number of bonds as carbon-carbon linkages and forming a structure with diminished surface activity. For example, thermal blacks produced by an extremely long reaction time are characterized by such low surface energy structures—and thus they exhibit an undesirably low reinforcement potential.

Another example of modern carbon blacks that offer improved reinforcement are high structure carbon black materials. Such materials with enhanced fusion between smaller individual particles forming so called "chain of pearls", and "chain of pearl" branching, which in turn enable stronger reinforcement even at lower volume fraction of carbon as compared to conventional carbon blacks.

Both types of carbon black materials, that is ones with high surface activity due to shorter process time/shorter high temperature exposure enabling higher fraction of remaining graphene-like graphitic planes edges, and other ones with high structure due to high branching of chains composed of fused primary particles, serve to provide modulus increase for elastomer-carbon compounds. However, each type of the carbon black materials brings additional specific improvements as well. For example, higher surface activity improves abrasion resistance and rebound of produced elastomer-carbon compounds; while higher structure improves hardness and viscosity, improves dispersibility, and reduces die swell for elastomer-carbon compounds. It would be beneficial to combine high surface activity with high structure in one material. However, these materials have different carbon production process requirements, and as such, many desired property combinations cannot be achieved in a single process.

In addition to the undesirable effects of the foregoing heat treatments, oxidation reactions are unavoidably present during the final stages of carbon black production reactions. Such surface oxidation reactions can be deleterious to the carbon black particle surface activity. Moreover, further substantial increase in carbon black particle surface activity would require a significant increase in a fraction of graphene-like microstructures at the surface, which is not feasible to achieve under high temperature and partial oxidation conditions.

In contrast, carbons that are produced using a microwave chemical reactor can be formed under extremely short high temperature exposure time (e.g., by using a pulsed microwave energy source). This results in formation of carbons with large graphene fractions that retain their innate high surface activity. At the same time, microwave carbon morphology can be simultaneously controlled by changing reaction chamber parameters such a flow rate, duty cycle, and reaction chamber pressures to result in production of graphene enriched high structure carbon materials. Techniques for using microwave chemical reactors are discussed below, and still further details regarding use of microwave chemical reactors are described in U.S. Pat. No. 9,812,295, entitled "Microwave Chemical Processing," and in U.S. Pat. No. 9,767,992, entitled "Microwave Chemical Processing Reactor," which are hereby incorporated by reference in their entirety.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A is a chart 1A00 for comparing carbon blacks produced by conventional methods to structured carbons produced using a plasma reactor. The x-axis of the figure is increasing graphene to graphite ratio, moving from right to left. The y-axis of the figure is the observed reinforcement the carbon provides to an elastomer. The left side of the figure characterizes a plasma processing regime 130 for carbon reinforcing materials that is distinguished from the right side of the figure that characterizes a conventional carbon black processing regime 120. What is desired is an optimal ratio of graphene to graphite 101, however the highest graphene/graphite ratio that can be achieved by carbons produced in the conventional carbon black processing regime 120 is quite low, mainly due to the high temperatures of the process. As such, thermally treated carbons such as thermal blacks produced by an extremely long reaction time are characterized by low surface energy structures, and thus they exhibit an undesirably low reinforcement potential 106. The maximum reinforcement 104 possible when using generic carbons produced in the conventional carbon black processing regime 120 is still limited by this deficiency, although to a lesser degree. Reinforcement can be further improved to the maximum value 102 (value line 134) by selecting specially engineered carbon blacks with high surface activity, or high structure over generic carbon blacks (engineered carbon black materials). However, neither one of those alternatives can provide the desired higher graphene to graphite ratios. Specifically, none of those alternatives achieve significant enrichment with graphene structure that provide the desired optimal ratios of graphene to graphite.

In contrast to the undesirable limitations exhibited when using carbons produced in the conventional carbon black processing regime 120, carbons produced in the shown plasma processing regimes 130 can exhibit very high graphene/graphite ratio, as well as high structure morphology. As a result, carbons produced in the shown plasma processing regimes 130 can be tuned to any point that falls into the wide range of the shown reinforcement curve 103. Such tuning can be controlled by pulsing a microwave energy source in a pulsed microwave reactor. Changing reaction chamber parameters such a flow rate, duty cycle, and reaction chamber pressures also result in production of a range of carbons, some of which are depicted on the chart as microwave-produced carbon #1 (see point 108), microwave-produced carbon #2 (see point 110), and microwave-produced carbon #3 (see point 101) with a consequent decrease of the graphene/graphite ratio to reach an optimal ratio enabling highest reinforcement.

Figure 1B:
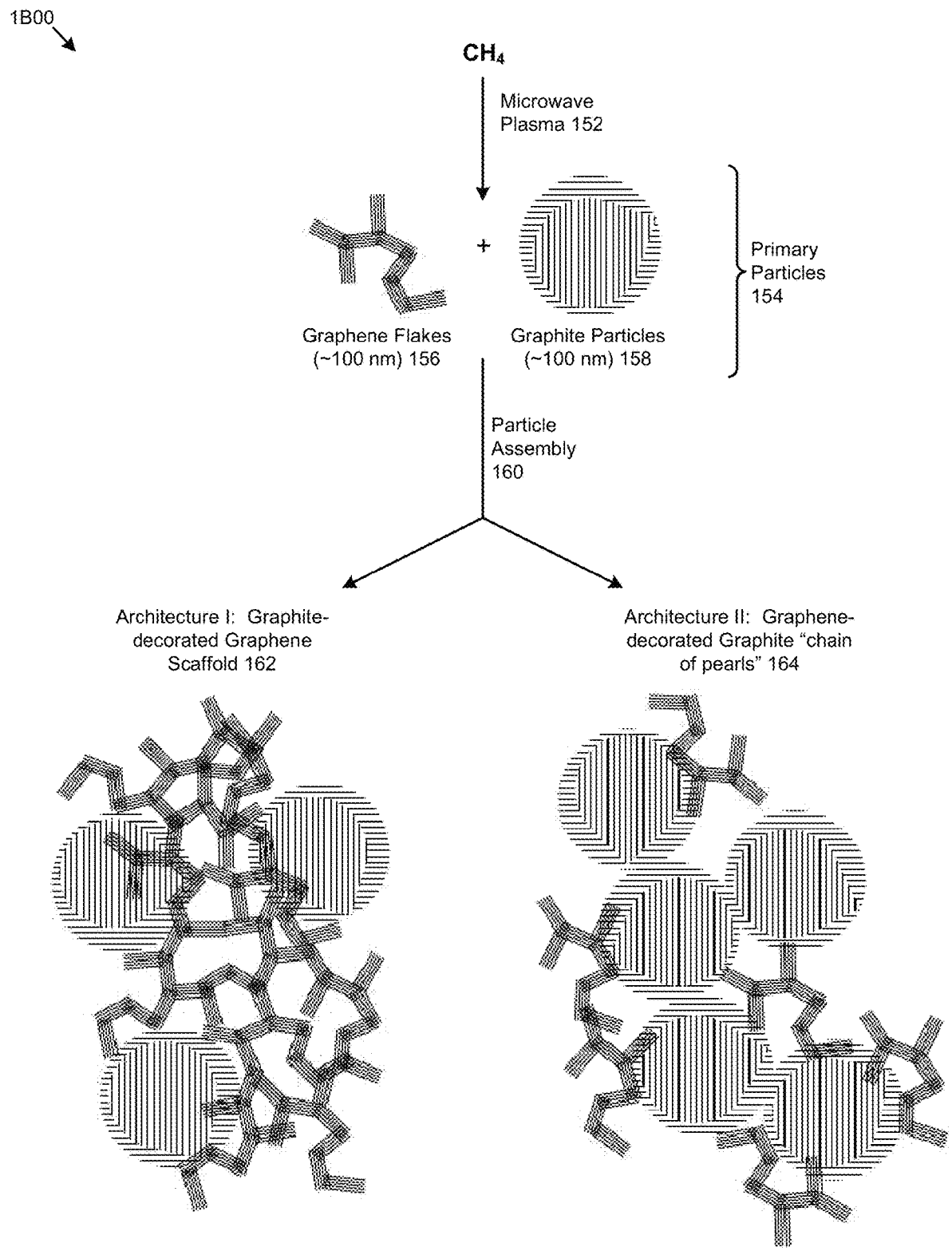
FIG. 1B represents two morphologies of graphene enriched structured carbon materials that are produced using a microwave plasma reactor, according to some embodiments.

Schematic 1B00 of FIG. 1B depicts three dimensional morphologies of graphene enriched structured carbons that are produced using a microwave plasma 152 reactor. Changing microwave process parameters can be used to tune production of the graphene enriched carbon materials to correspond to a particular morphology. While both types of primary particles 154, namely graphitic particles 158 and graphene flakes 156, may form during microwave plasma assisted decomposition of precursor gas, their ratio, and assembly 160 into different architectures is determined by the process parameters.

Continuing with FIG. 1B, under conditions producing mostly graphene flakes 156 made of graphene sheet bundles, the flakes would assemble into three-dimensional scaffolds, decorated with graphite particles 158 forming as a minor fraction (as shown in Architecture I, 162). A concentration of the graphene flakes 156 during the microwave process would define the size of such scaffolds, and their further assembly into larger aggregates. Such Architecture I 162 structures are characterized by (1) extremely high surface activity due to enormous surface energy of planes, and (2) the edges of graphene bundles being made of a few graphene sheets.

Continuing with FIG. 1B, under certain conditions, increased formation of graphite particles 158 result in the formation of an additional type of structured carbon assembly (as shown in Architecture II 164). In such a structure, graphitic particles 158 may form "chains of pearls" further decorated with graphene flakes 156. The size and branching of such "chain of pearls" structures made off primary graphitic particles 158, and degree of their decoration with the graphene flakes 156 correlates to their respective concentrations. Architecture II 164 structure has lower surface activity compare to Architecture I 162, however Architecture II 164 is characterized by increased structure/branching of "chains of pearls." At the same time, Architecture II 164 has higher surface activity compared to conventional high structure carbon blacks due to a presence of graphene flakes 156 at branched carbon surface.

Primary particles 154 tend to randomly assemble into these two types of architectures. Architecture I 162 would preferentially form under conditions generating mostly graphene flakes 156, and a blend of Architecture I 162 and Architecture II 164 is expected to form when graphite particles 158 are generated in large quantities.

A combination of Architecture I 162 and Architecture II 164 structures are found in microwave plasma-produced carbon materials. Controlling their relative ratios serve to tune reinforcement properties of elastomers made with such novel structured carbons. Moreover, hysteretic behavior of elastomers can be controlled by controlling relative ratios of Architecture I 162 and Architecture II 164 structures in elastomeric composites. Hysteretic behavior of elastomeric composites with rubber materials is discussed further below.

The dynamic viscoelastic properties of a reinforced elastomer are commonly used to predict the performance of the elastomer in tire applications. For example, the dynamic viscoelastic properties can be measured using ASTM D5992-96 testing standards. Some common metrics used are G' storage modulus, tan delta and J" loss compliance at different temperatures. Each metric relates to a different tire performance characteristic. For example, tan delta at higher temperatures such as 30° C. and 60° C. are a good predictor of rolling resistance. Higher tan delta values indicate higher hysteresis and therefore higher rolling resistance and poorer fuel economy. The G' storage modulus at low temperatures such as −20° C. is a good predictor of winter traction, and the G' at higher temperatures such as 30° C. is a good predictor of dry handling. Compounds with higher stiffness give higher dry handling because the tread compound is stiffer when the tire is cornering through a curve. Dry traction, on the other hand, is quite different from dry handling. A softer more pliable compound gives better dry traction because it conforms more to the surface of the road and gives more contact area. Compounds with higher tan delta (higher hysteresis) tend to be better for dry traction. Higher J" loss compliance at 30° C. is also a good predictor of higher dry traction. Ice and wet traction performance are predicted by higher tan delta (higher hysteresis) at lower temperatures of −10° C. (ice) and 0° C. (wet) because the lower temperatures are equivalent to high frequencies which are seen with traction.

Two other dynamic materials properties, which are used to characterize reinforced elastomers are the Mullins Effect and the Payne Effect. The Mullins Effect and the Payne Effect can be measured, for example using ASTM 5992-96 (2011), whereby the modulus versus the dynamic strain of a sample is measured in a first sweep, and then repeated in a second sweep. The Mullins Effect is a measure of the difference between the G' storage modulus at 0.001% strain in the first sweep and the G' at 0.001% strain in a second sweep. The Mullins Effect is related to the dynamic stress-softening that is observed between the first and second strain sweeps, which can be due to the polymer-filler matrix being pulled apart during the first strain sweep and not having time to re-form. The Payne Effect is a measure of the difference between the G' storage modulus at 0.001% strain in the first sweep and the G' at 0.05% strain in a second sweep. A lower Payne Effect can be indicative of better filler dispersion because filler particles are finer and more evenly distributed throughout the polymer with less chance to re-agglomerate. The Payne Effect is typically seen in filled rubber compounds, and not in gum compounds.

Figure 2A:
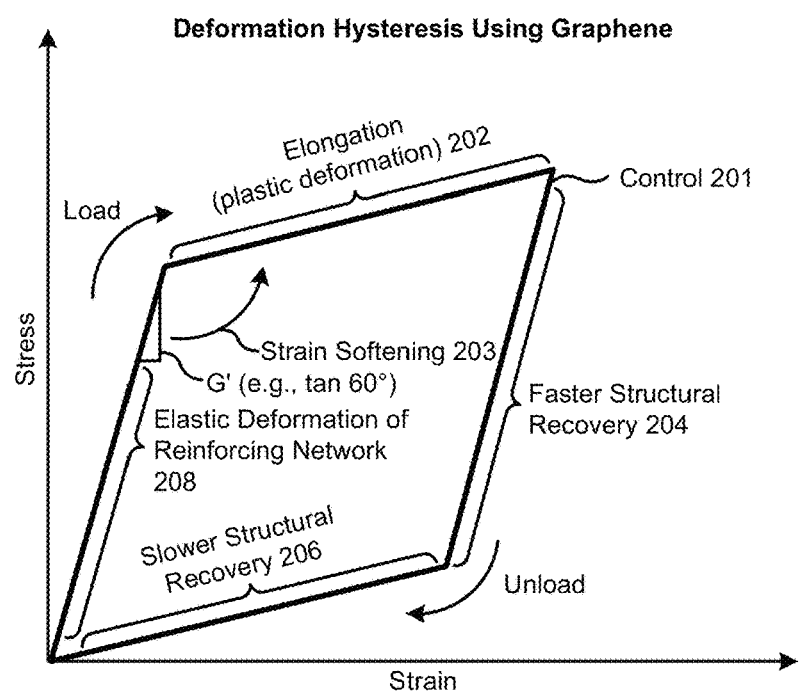
FIG. 2A presents a stress versus strain chart showing parameters used for describing deformation hysteresis in tires, according to an embodiment.

FIG. 2A presents a stress versus strain chart 2A00 showing parameters used for describing deformation hysteresis in tires. The figure illustrates aspects pertaining to the effects of introducing carbon blacks into an elastomer before curing. Specifically, the figure is being presented with respect to its applicability to techniques for tuning deformation hysteresis in tires.

The embodiment shown in FIG. 2A is merely one simplified example that describes deformation of an elastomer-carbon nanocomposite (or composite, or rubber-carbon composite) under load/unload conditions. This characteristic deformation hysteresis curve 201 is split in four distinct deformation domains. The example depicts stress/strain behavior of a reinforcing network in an elastomer-carbon composite. The curve 201 is a hysteresis curve that an elastomer-carbon composite will typically exhibit, and the curve 201 is therefore labeled as a "control" curve. The curve 201 is measured under particular conditions, such as strain rates, maximum strain, and ambient temperature. As described further herein, the selection of different carbon reinforcing materials can change different regions of the curve 201. Some specific regions of curve 201 are labeled in the figure, as follows. As strain increases, the deformation is initially elastic, and characterized by linear increase of stress with strain 208. The steepness of this region defines a stiffness of the tire composite material. As stiffer the material is, as faster stress builds up with deformation. A storage modulus G', which is a ratio of stress to strain, is higher for stiffer, or more elastic materials.

At higher strain the deformation curve 201 then enters a plastic deformation (or elongation) region 202, where a significant increase in strain happens with minimal stress buildup. The terms "plastic deformation," "plastic behavior," and "plastic region," as used herein, refer to recoverable deformation, in some embodiments. The storage modulus value in this region is much lower than in the elastic deformation region. This ability to provide significant elongation is a unique property of elastomers (e.g., in cross-linked polymers with low glass temperature ($T_g$), including rubbers used for tires applications). Maximum elongation before break point defines tensile strength of an elastomer-carbon composite (e.g., a rubber-structured carbon nanocomposite).

A transition from elastic to plastic deformation regions of the stress versus strain curve 201 is called strain softening 203, and it is a very important property of elastomer-carbon composites (e.g., rubber/structured carbon nanocomposites). Strain softening 203 strongly depends on a strength of an extensive network of the carbon filler particles inside of the elastomer matrix, and their re-arrangement during deformation. The network strength depends on carbon material morphology and surface area (e.g., related to primary particles and aggregates size, and branching), surface activity, and loading, which define interaction of carbon particles with each other, and their interaction with elastomer (e.g., rubber) polymer chains. The strength of these interactions increases for higher structure, higher surface activity, and higher loading of carbons, resulting in stiffer material with higher G', because all of these factors increase resistance of the carbon particles to rearrangement during deformation/ increased strain of an elastomer-carbon (e.g., rubber-structured carbon) composite. This re-arrangement results in the strain softening 203 transition from elastic to plastic behavior of carbon filled rubber nanocomposites. An effect associated with a gradual drop in storage modulus G' value during increased strain is also called "strain softening," or the "Payne effect." This effect relates to rolling resistance of a tire. Stronger networks are usually characterized by strong Payne effect and higher rolling resistance, while the effect is typically weaker for networks that exhibit a lower initial G' value. In contrast however, very stiff networks (high G' value) with strong interaction between carbon filler particles, and strong interaction of carbon filler particles with elastomer (e.g., rubber) polymer chains may not deform easily and undergo minimal strain softening due to restricted rearrangement. In this case, even though the decrease of G' with strain is minimal, the rolling resistance is still high, while elongation/Tensile strength would be minimized.

The other two parts of the hysteresis curve 201 describe elastomer-carbon composite (or nanocomposite, or rubber-carbon composite) behavior under unloading conditions (e.g., corresponding to a decrease in strain). Initially, stress decreases very quickly to a certain relatively high strain level, as reflected by a domain of relatively fast (i.e., faster) structural recovery 204 of the deformation curve 201. It is driven by fast re-arrangement of stretched polymer chain segments between cross-links of the elastomeric network. Then it is followed by a domain of relatively slow (i.e., slower) structural recovery of a carbon filler network 206, until the deformation returns to the origin. Such delayed recovery of carbon filled elastomeric composite to initial deformation stage is called hysteretic behavior, and the curve 201 in FIG. 2A formed by the four stress/strain sections from load/unload conditions is called a hysteresis curve 201. The area between the load and unload regions of curve 201 reflects amount of deformation energy stored inside of an elastomer-carbon composite (or nanocomposite, or rubber-carbon composite). A higher area inside a hysteresis curve corresponds to a higher energy storage capacity, while a lower area indicates faster energy dissipation.

Hysteretic behavior, and, specifically the shape of each of these deformation regions can be controlled by selection of particular carbons, and, additionally by partial functionalization of such selected particular carbons, to achieve a desired behavior at each of the deformation and recovery steps.

The foregoing discussion of FIG. 2A includes the concept of tuning the shape of a deformation hysteresis curve 201 by selection of specially-processed graphene enriched structured carbons, and, optionally, their partial functionalization for incorporation into an elastomer before curing. Three examples of deformation hysteresis tuning are disclosed in FIG. 2B below. The elastomer stress-strain curves, such as the curves in FIGS. 2A and 2B can be affected by many parameters (e.g., strain rates, maximum strain, and ambient temperature), and therefore the discussions regarding changing the hysteretic stress-strain behavior of an elastomer-carbon composite herein assume that no other parameters change besides the intended change (e.g., the type of reinforcing carbon utilized).

Figure 2B:
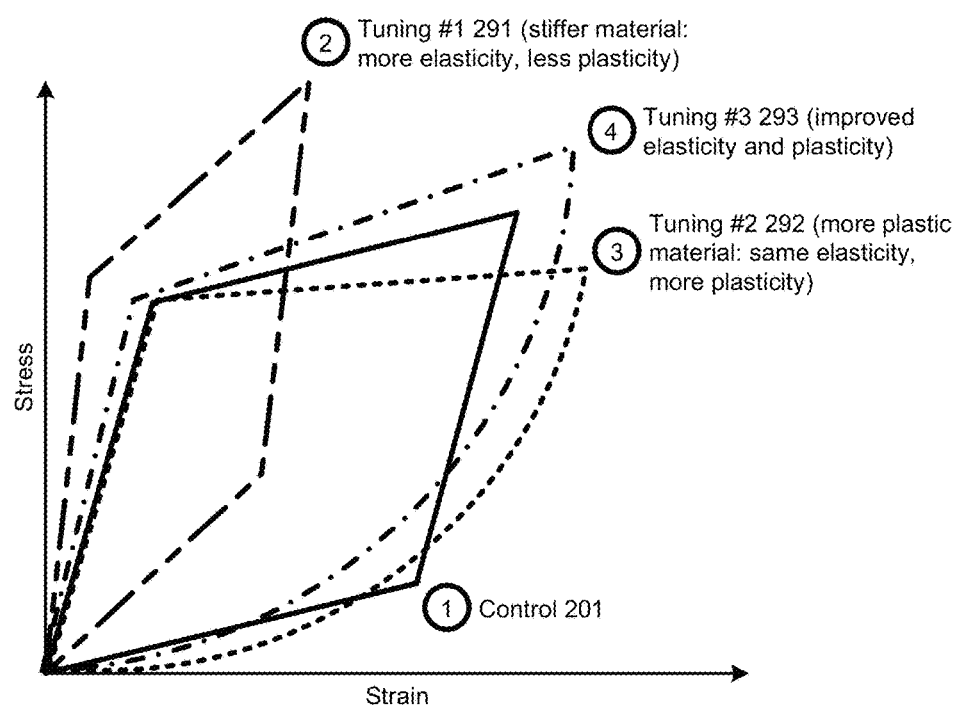
FIG. 2B presents examples of deformation hysteresis tuning in tires by controlling the graphene-to-graphite ratio and branching in plasma-produced carbons, according to some embodiments.

FIG. 2B is a comparison chart 2B00 representing examples of deformation hysteresis in tires using specially-processed graphene enriched structured carbons from microwave processes, in the context of the architecture and functionality of the embodiments described herein. The hysteresis tuning technique 2B00 or any aspect thereof may be implemented in any environment.

The deformation hysteresis shape (Control 201) illustrates behavior of a rubber/conventional carbon composite, described above. The deformation hysteresis shape #1 291 depicts the result of introducing one of the microwave-produced carbons with very high graphene fraction (for example, structured Carbon with Architecture I described above) into the rubber matrix (with the testing conditions and carbon loading comparable to those of the conventional carbon black in the composite corresponding to hysteresis shape of a control 201). This deformation hysteresis shape illustrates behavior corresponding to an extremely strong reinforcement network. Such network provides elastic material with very high storage modulus (G') due to enhanced surface activity derived from very high surface energy of the graphene scaffolds. However, formation of extremely strong carbon filler network minimizes composite elongation and may lead to lower tensile strength. However, if both of these parameters are within a required range, such elastomer (e.g., rubber) composite materials may find application for track and SUV tires, which require high stiffness, and cut and abrasion resistance.

At the same time, a substantial decrease in the loading of the high surface activity microwave carbon described above to match storage modulus of the conventional carbon composite (shown in Control 201) will create a composite with much higher elastomer fraction in the composite. As a result, the deformation hysteresis shape of this new composite #2 292 will exhibit decreased rolling resistance, improved composite elongation, and improved tensile strength. It will also have an increased structure recovery rate. These type of rubber composites may be more beneficial for passenger cars.

Referring to deformation hysteresis shape #3 293, corresponding elastomer-carbon composite (or nanocomposite, or rubber-carbon composite or nanocomposite) would exhibit higher elasticity (i.e., higher G' than curve #2 292), and similar rolling resistance, but extremely fast structural recovery versus conventional carbon composite (shown in Control 201), as the deformation hysteresis shape #3 293 reflects. Such novel tire material would be applicable to racing tires. Described tuning of the microwave produced structured carbons in these composites can be enabled by tuning the microwave reactor parameters for optimal ratio between Architectures I and II.

As an option, one or more variations of comparison chart 2B00 or any aspect thereof may be implemented in the context of the architecture and functionality of the embodiments described herein. The comparison chart 2B00 or any aspect thereof may be implemented in any environment.

Any of the foregoing tunings can be further facilitated by surface treatment of the microwave-produced carbons via chemical processing. Such partial surface functionalization may be especially beneficial to improve dispersibility of very high surface activity carbons, which tend to form stronger Van der Waals bonding between individual carbon particles.

Figure 3:
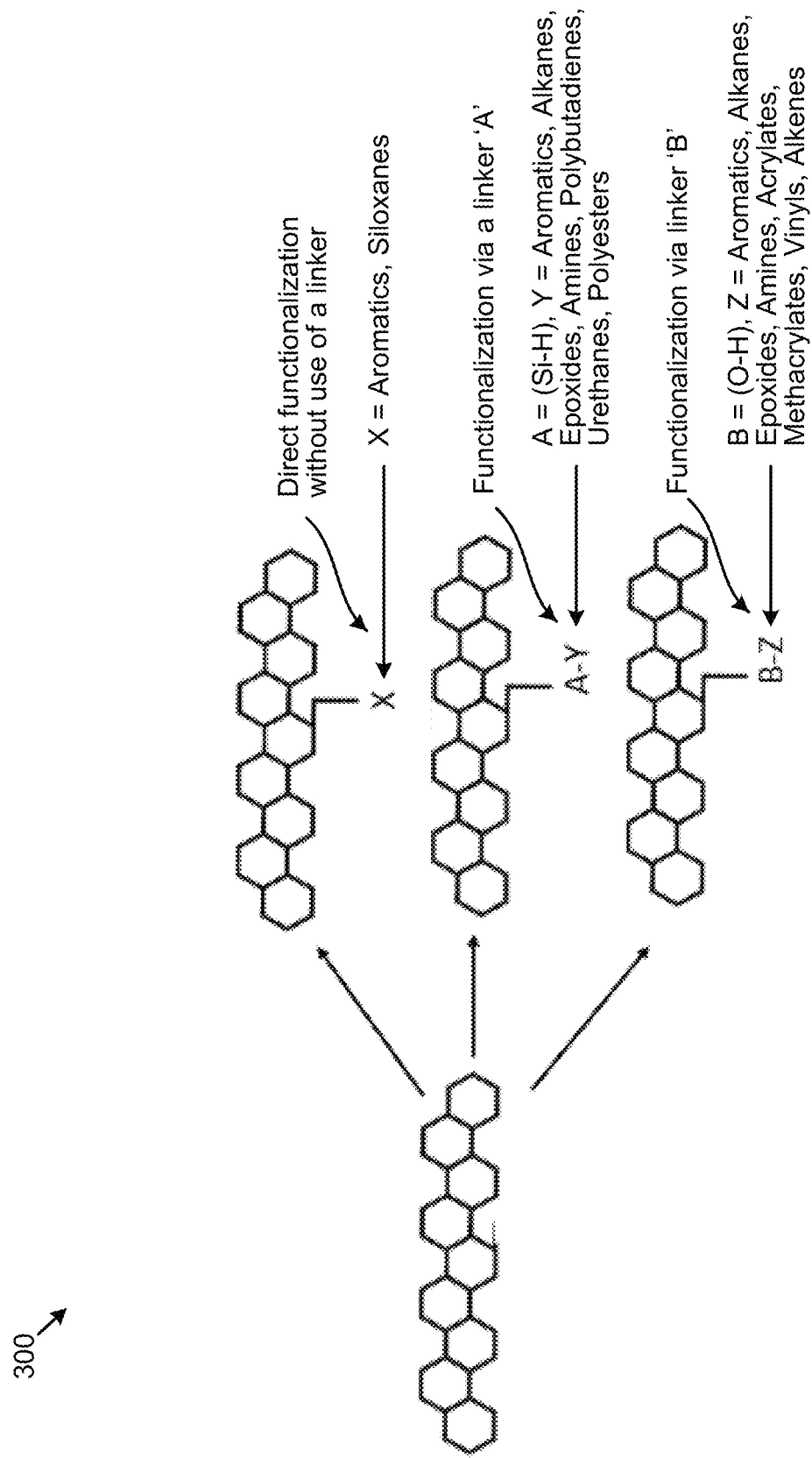
FIG. 3 depicts chemical pathways for achieving surface functionalization of microwave plasma-produced, graphene enriched, structured carbon materials that are used to tune properties of tire materials, according to some embodiments.

FIG. 3 shows a diagram 300 that depicts various chemical pathways 300 to incorporate small quantities of specific functional groups enhancing dispersion quality, and/or surface compatibility, which in turn may improve carbon network formation, and/or vulcanized network density, in accordance with some embodiments. Graphene surfaces can be functionalized directly by reaction of $sp^2$ hybridized C—C bonds with low molecular weight organic molecules, oligomers, and/or polymers (e.g., aromatics, siloxanes, or other species containing Si—H groups) (path 1). The reaction can be initiated thermally at temperatures greater than 120° C., or at lower temperatures in the presence of a radical initiator. This pathway will preserve initial architecture of microwave reactor produced structured carbons.

Linker A (Si—H) can also be incorporated on a graphene surface if a reagent with multiple Si—H groups is used.

Linker A then will enable further functionalization with various low molecular weight organic molecules, oligomers, and polymers (e.g., aromatics, alkanes, epoxides, amines, polybutadienes, urethanes, and polyesters) containing unsaturated carbon bonds (path 2).

Structured graphene carbons can also be treated with oxidizing agents to incorporate linker B (—OH) on the surface, which then can be treated with various low molecular weight organic molecules, oligomers, and polymers (e.g., aromatics, alkanes, epoxides, amines, M/acrylates (acrylates and methacrylates), vinyls and alkenes) containing chemical groups active toward —OH (path 3). This chemical pathway may decrease initial carbon particles size due to oxidative treatment.

In some embodiments, the targeted partial functionalization approaches described herein, involve only a minor fraction of graphene bonds described, and as a result the above chemical treatments will not have a significant impact on the innate graphene surface activity.

As an option, one or more variations of chemical pathways 300 or any aspect thereof may be implemented in the context of the architecture and functionality of the embodiments described herein. The chemical pathways 300 or any aspect thereof may be implemented in any environment.

FIG. 4 is a diagram 400 that illustrates structured microwave graphene architectures of Architecture I and Architecture II that are partially functionalized with surface species (—R) (similar to the functional groups described above and in FIG. 3) via the chemical pathways described above. Low molecular weight organic functional groups would mostly impact structured microwave carbons compatibility with an elastomeric matrix and dispersibility, while oligomeric and polymeric species may actively contribute into elastomeric properties of the rubber/microwave carbons nanocomposites (or elastomer-carbon composites). Thus, a combination of both types of functional groups can provide possibilities for further tuning of the composites to achieve a certain set of, and/or contours of hysteretic properties.

Additional Practical Application Examples

Figure 5A:
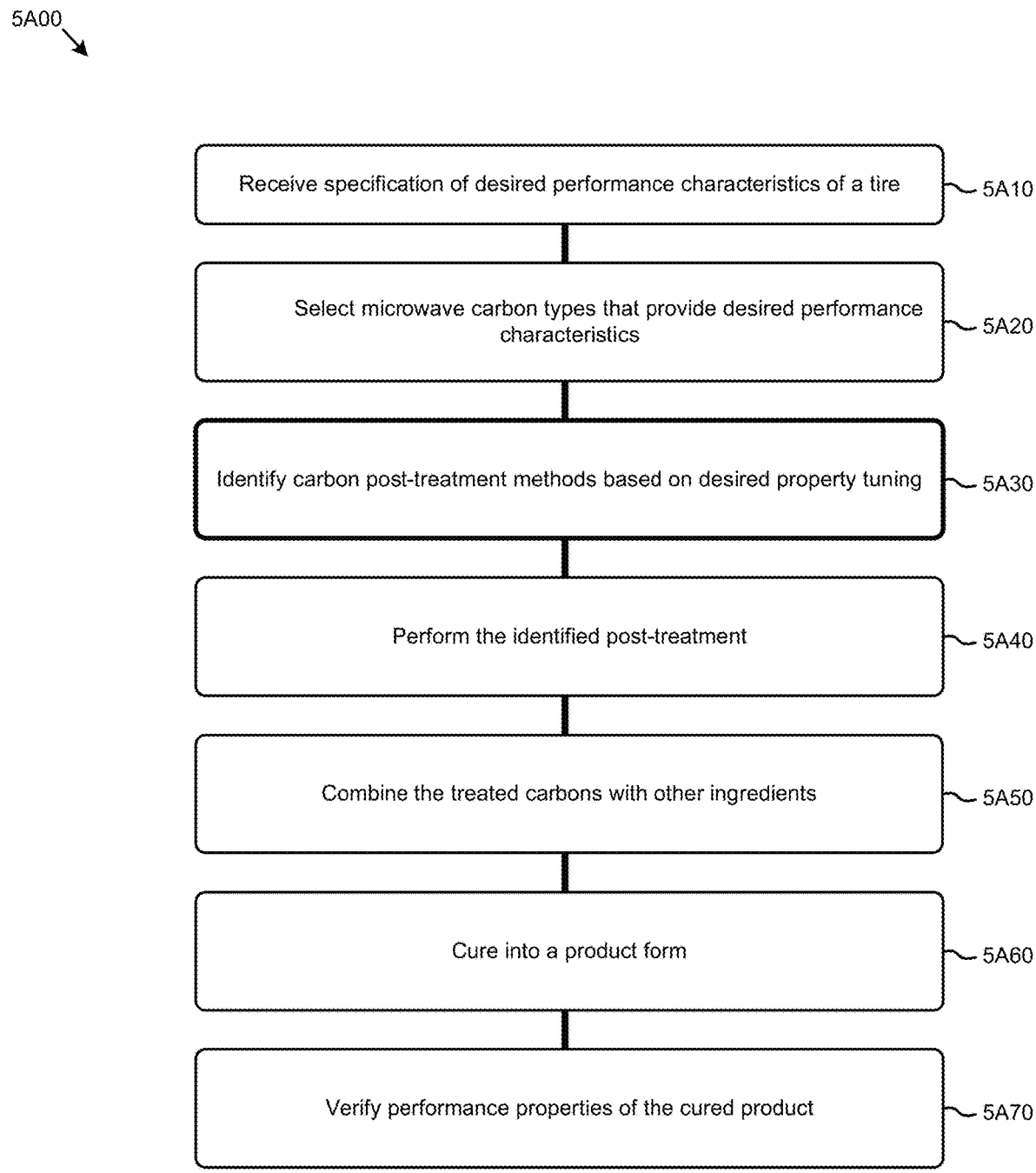
FIG. 5A depicts a processing flow used to tune properties of tire materials, according to an embodiment.

FIG. 5A depicts a processing flow 5A00 used to tune properties of tire materials. The flow progresses step-by-step, beginning upon receipt of a specification of desired performance characteristics of an elastomer or tire (step 5A10). After considering the desired performance characteristics, microwave-produced carbon types are selected (step 5A20) such that elastomers formed using the selected microwave carbon types are tuned to provide desired performance characteristics. In some cases, carbon post-treatment methods (if any) are identified (optional step 5A30) and thereafter performed (optional step 5A40). The resulting materials are combined with other ingredients (step 5A50) which are then cured into product form (step 5A60). In some cases, a sample of the resulting product (e.g., an elastomer, a tire, etc.) is analyzed to verify that actual performance of the elastomer or tire is in accordance with the desired properties (optional step 5A70). In some embodiments, the present elastomer-carbon composites include an elastomer material (e.g., rubber), a filler material (i.e., the present carbon materials), at least one additive material, and at least one accelerant material. The elastomer, additive and accelerant materials are examples of the other ingredients described in step 5A50 in method 5A00. The additive material may be, for example, a material selected from the group consisting of: a silane coupling agent, an oil, a zinc oxide material, a stearic acid material, a wax material, a plasticizer, an antiozonant, an antioxidant, a viscosity modifier, and a sulfur cross-linker. The accelerant material may comprise, for example, N-tert-butyl-2-benzothiazyl sulfonamide. In other embodiments, the accelerant material may comprise N-tert-butyl-2-benzothiazyl sulfonamide and diphenylguanidine, where the concentration of N-tert-butyl-2-benzothiazyl sulfonamide is higher than the concentration of diphenylguanidine.

The flow of FIG. 5A may be used in methods for manufacturing a tire. The methods include determining a desired hysteretic curve that corresponds to a set of dynamic mechanical analysis parameters, where the desired hysteretic curve comprises elastic portions and plastic portions, and the elastic and plastic portions comprise specific desired shapes. A first tuned carbon is selected, the first tuned carbon facilitating achievement of a desired shape of a particular elastic portion of the hysteretic curve. One or more selected post-treatments is performed on the first tuned carbon to form a first post-treatment carbon, the selected post-treatment facilitating achievement of a desired shape of a particular plastic portion of the hysteretic curve. The methods also include combining the first post-treatment carbon with other materials that are used in components of the tire and curing the combination comprising the first post-treatment carbon and the other materials.

Variations of the foregoing may include more or fewer of the shown steps. Certain variations may perform more or fewer (or different) steps and/or certain variations may use data elements in more, or in fewer, or in different operations.

Figure 5B:
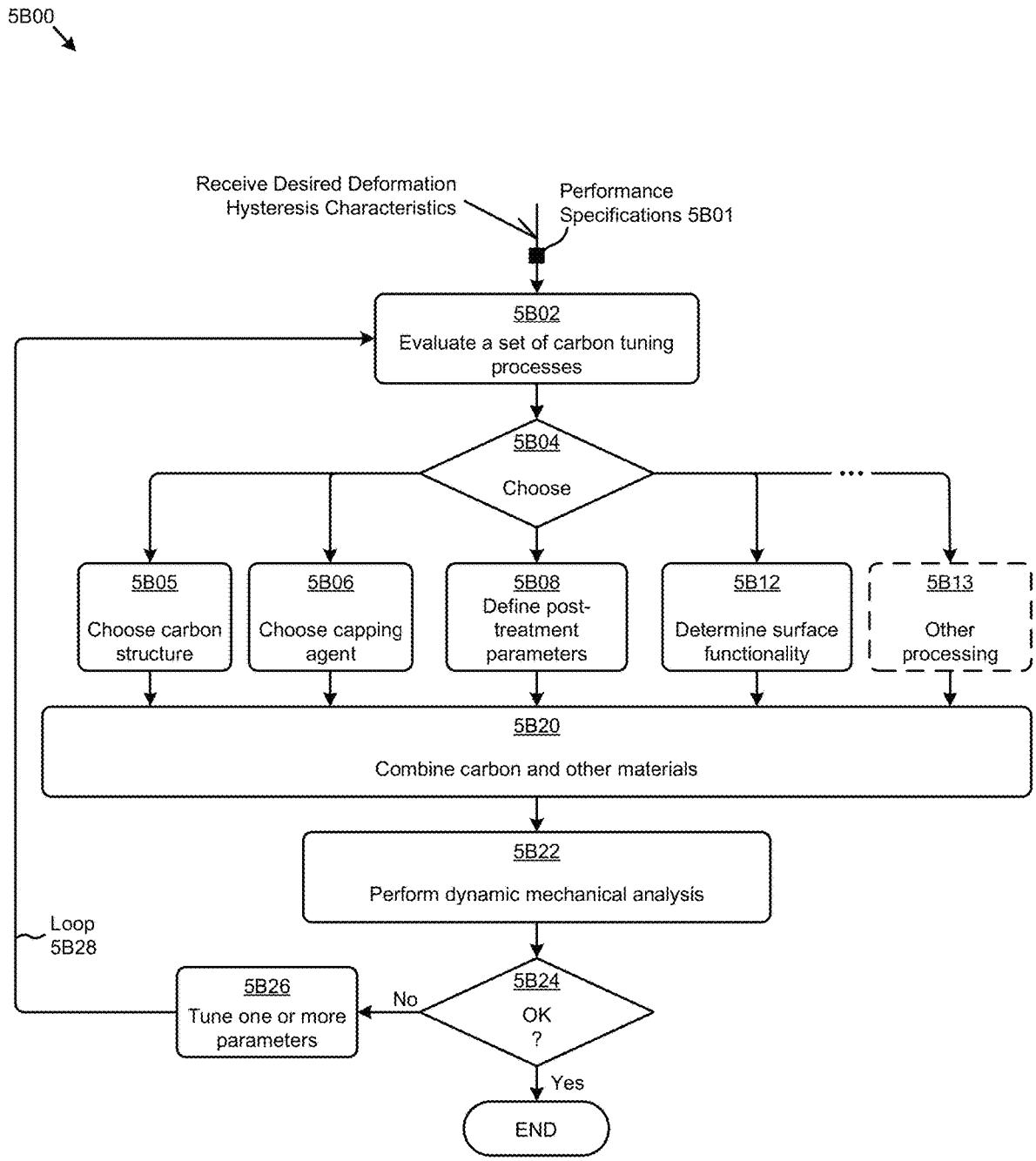
FIG. 5B is a flowchart showing an operational flow from receiving a set of deformation characteristics through testing of a tire using tuned carbons, according to some embodiments.

FIG. 5B is a diagram showing an operational flow 5B00 from receiving a set of deformation characteristics through testing of a tire using tuned carbons.

FIG. 5B is a diagram showing an operational flow 5B00 that commences upon receiving a set of deformation hysteresis characteristics and continues through to a feedback loop that is entered after testing a sample made with tuned carbons. The shown flow commences upon receiving a performance specification 5B01 that codifies desired tire performance characteristics. These performance specifications can relate to particular desired deformation hysteresis characteristics. At step 5B02, a set of carbon tuning processes are evaluated. The evaluation can comprise a starting set of processes and a respective starting set of parameter values. Any of the processes and/or parameter values can be tuned to facilitate achievement of the desired deformation hysteresis characteristics. For example, to achieve a steep deformation curve as strain is decreased (e.g., in the structural recovery domain of the hysteresis shape) the surface of selected carbons might be functionalized with a particular linker.

The operational flow 5B00 continues such that one or more determinations (e.g., at decision point 5B04) are made that control the selection of a carbon structure (e.g., at step 5B05), the selection of a capping agent (e.g., at step 5B06), a determination of post-treatment parameters (e.g., at step 5B08), a determination of methods and materials to functionalize the surface (e.g., at step 5B12), and determination of other processes and/or other processing parameters (e.g., at step 5B13). Capping agents are low molecular weight, oligomeric, or polymeric organics molecules, containing functional groups with desired chemical structure/s, and linker group/s. A linker group is organic group with specific chemistry enabling covalent binding of organic functional molecules to graphene surface under certain reaction conditions. For example, methylhydrosiloxane-dimethylsiloxane copolymer contains Si—H groups, which will interact with graphene C—C bonds under elevated temperatures, resulting in covalent attachment of such siloxane copolymer chains to the surface of graphene flakes. Another example is a treatment of partially oxidized graphene surface, containing —OH surface groups, with functionalized trimethoxysilane coupling agent under basic, or acidic conditions. Multiple functional groups, such as alkyl, alkene, vinyl, methacrylate, or thiol can be incorporated on graphene surface using this type of capping agent. One or more of steps 5B05, 5B06, 5B08, 5B12, and 5B13 are optional. In other words, all of these determinations need not be made in any given embodiment. In some embodiments, one or more of these determinations will be made to tune the carbon for the particular desired performance specifications 5B01 and desired deformation hysteresis characteristics.

After the foregoing carbon(s) have been selected and processed, the operational flow moves to step 5B20 where the selected and processed carbons are combined with other materials (e.g., elastomers, and optionally additives and accelerants) that are used in components of a tire. The combination of materials is cured and formed into a tire (e.g., at step 5B20), which is then subjected to dynamic mechanical analysis (e.g., at step 5B22). The set of DMA parameters might or might not meet the given performance specifications 5B01. Such a determination is made at decision 5B24. Specifically, if the dynamic mechanical analysis of the tire is deemed to meet the given performance specifications 5B01, then the shown operational flow ends. Otherwise, step 5B26 is performed to tune one or more parameters that affect the processes, and loop 5B28 is then taken to once again pass through decision point 5B04. In the second pass or Nth pass through decision point 5B04, different choices of parameter values and/or different selections of processes are made based on the tuned one or more parameters (e.g., the tuned parameters from step 5B26). Such different choices can be made based on the specific performance values measured during the dynamic mechanical performance analysis (e.g., of step 5B22) as compared to the given performance specifications 5B01. Moreover, such different choices can be made based on the specific tuned parameters with respect to its effect on tire performance under DMA testing (in step 5B22).

In many scenarios, tuning a particular parameter to increase a performance metric that corresponds to a particular specification often has the undesired effect of decreasing a different performance metric. However, in many situations involving the present carbons, tuning a particular parameter to increase a performance metric that corresponds to a particular specification has the surprising effect of also increasing (e.g., improving) a different performance metric.

Figure 5C:
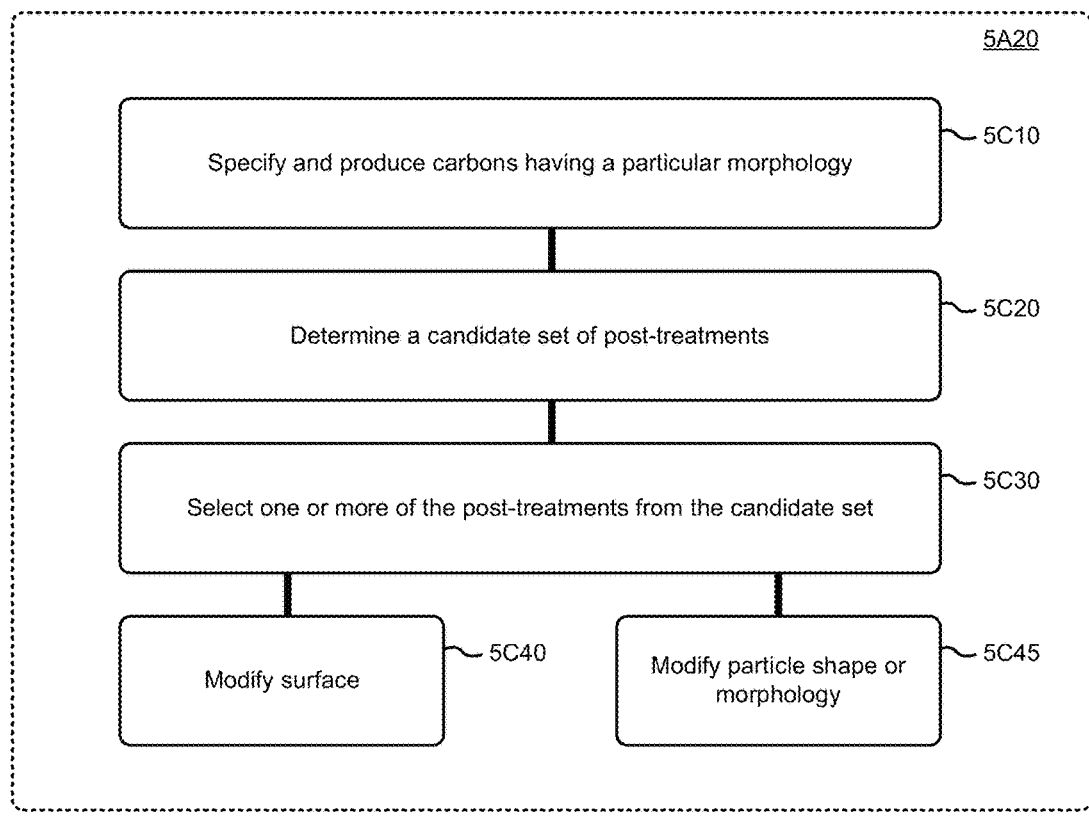
FIG. 5C depicts a carbon selection and treatment process, according to some embodiments.

FIG. 5C depicts a carbon selection and treatment process. Referring again to the flow of FIG. 5A, and specifically referring to the operations to identify carbon post-treatment methods based on desired property tuning (step 5A30), the operations to make such an identification may involve many variables and/or may involve many sub steps or additional steps. Flow 5C00 of FIG. 5C presents example steps. Specifically, a first step for selecting a microwave-produced carbon type might involve steps for specifying and then producing carbons that have a particular morphology (step 5C10). A second step for selecting a microwave-produced carbon type might involve a step for determining a candidate set of post-treatments of the produced carbons (step 5C20). In many cases there are many post-treatments that apply only to some morphologies, whereas there are many other post-treatments that apply only to other morphologies. As such, the aforementioned candidate set of post-treatments may be based at least in part on the carbons specified in step 5C10. Within a particular set of post-treatments, there may be one or more sub-treatments in the candidate set that are more effective to achieve a particular DMA performance characteristic. Step 5C30 serves to identify one or more applicable post-treatments from the candidate set. Strictly as examples, a post-treatment might involve modification of surfaces of the carbons (e.g., as depicted at step 5C40) and/or a post-treatment might involve modification of a particle size or shape or morphology of the carbons (e.g., as depicted at step 5C45) and/or a post-treatment might involve modification of other characteristics of the carbons.

Figure 6:
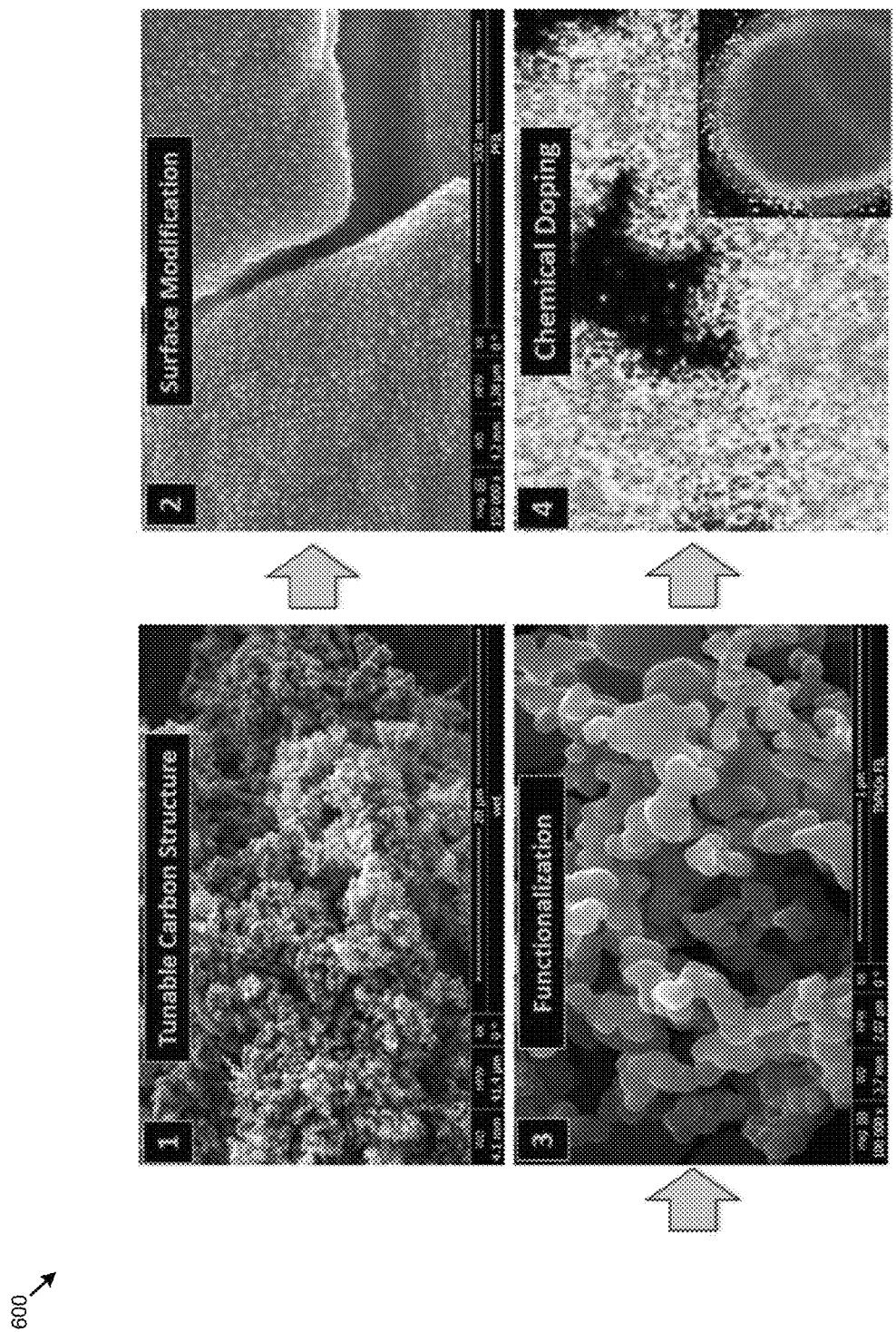
FIG. 6 depicts example tuning processes that can be used singly or in combination to implement certain of the herein-disclosed embodiments.

Diagram 600 of FIG. 6 depicts example tuning processes that can be used singly or in combination to implement certain of the herein-disclosed embodiments. The shown tuning processes involve (1) tuning/engineering carbon production to result in a particular selected carbon structure, (2) surface modification, (3) functionalization, and (4) chemical doping. In this example, image #1 shows a porous network of carbon that is engineered to breakdown predictably within the shearing process of the mechanical mixing of the elastomer processing. Image #2 shows an ability to modify the carbon surface to accept the elastic system (i.e., to promote interfacial bonding). Image #3 depicts in-situ or ex-situ functionalization of carbon to promote bonding and/or dispersion of materials within the elastic system. Image #4 depicts a chemical group modification so as to build a bridge between the carbon and elastomer, which in turn serves promote reinforcement in the resulting composite.

Figure 7:
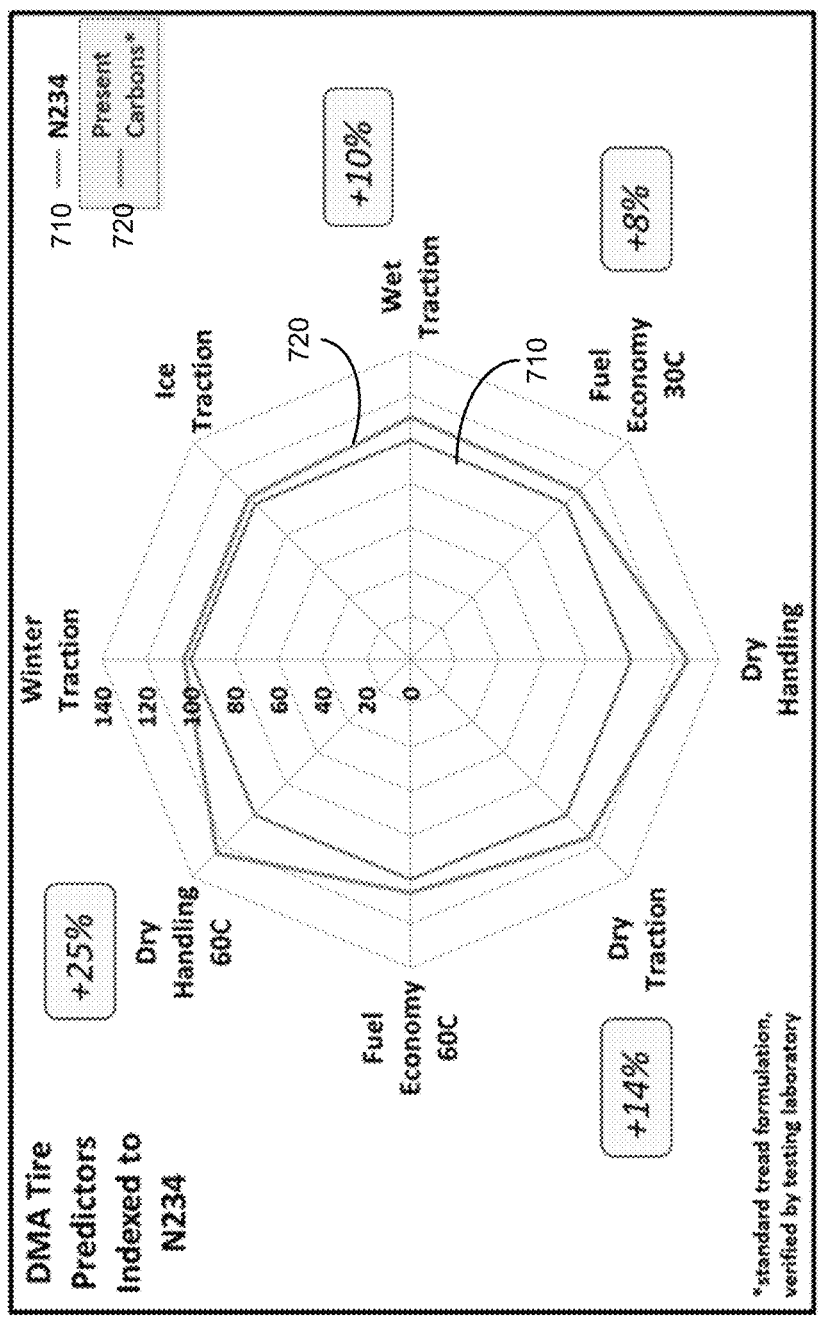
FIG. 7 depicts a dynamic mechanical analysis (DMA) chart, according to some embodiments.

FIG. 7 depicts a dynamic mechanical analysis (DMA) chart 700 measured using ASTM D5992 (DMA-Metravib-Temperature sweep in dual lap shear). This dynamic mechanical chart (DMA) relates to the properties described, fuel economy, etc. found by varying the strain oscillation frequency imposed on the elastic system. The "N234" line 710 shows the response for each parameter for a conventional elastomer-carbon composite containing ASTM standard carbon black (N234), while the "Present Carbons" line 720 shows the response for each parameter for an elastomer-carbon composite containing certain of the herein-disclosed carbon materials. The data in the DMA chart in FIG. 7 is normalized to the N234 results. As can be seen from comparison of the "Present Carbons" line 720 to the "N234" line 710, the present carbons perform better in every one of the eight DMA properties. These results are exceptional, since oftentimes when one property is improved others suffer. In some cases, the performance is improved by double digit percentages. For example, and as shown, the DMA parameter for dry handling when using the present carbons exhibits 25% better performance than the DMA parameter for dry handling when using "N234."

Figure 8A:
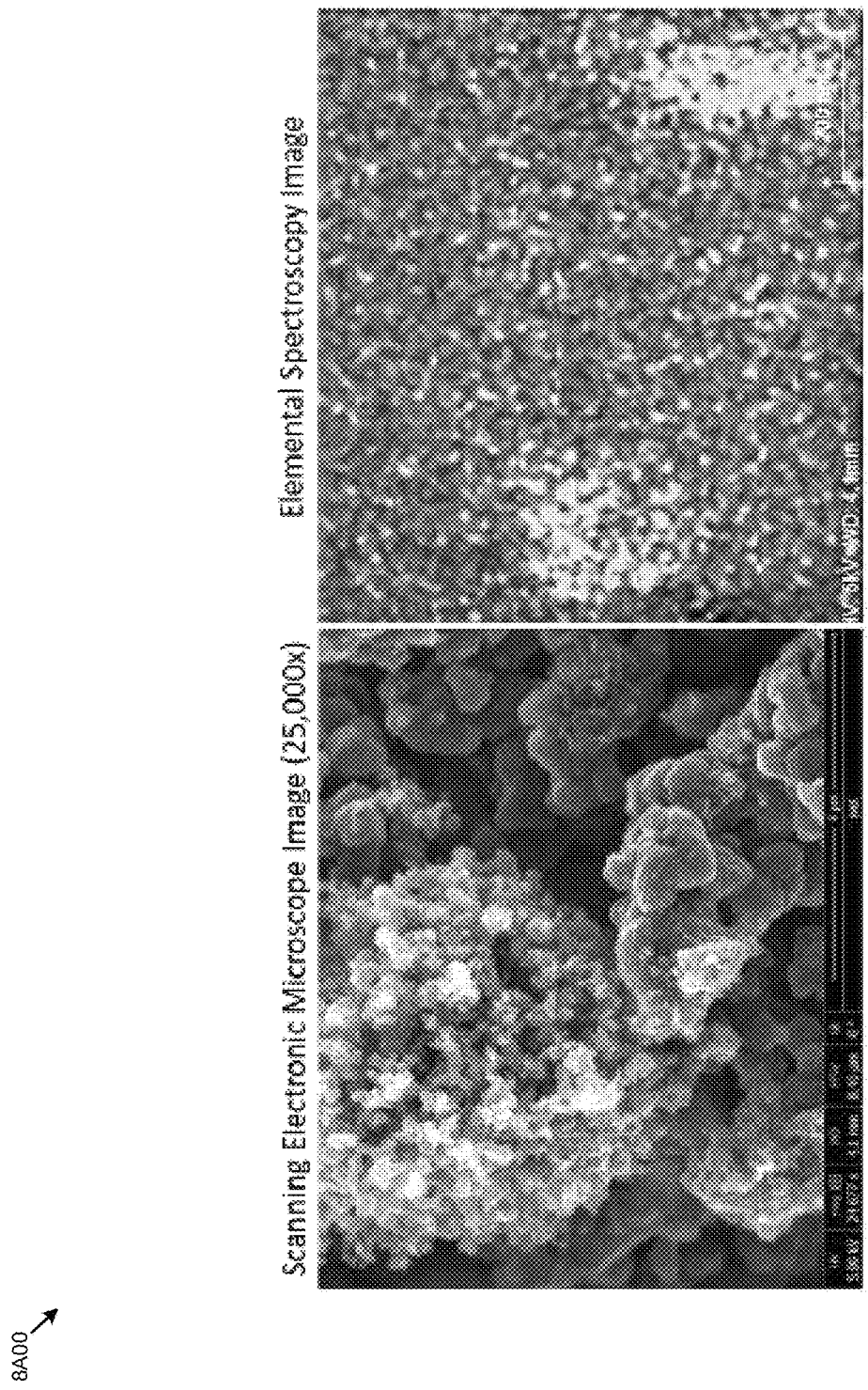
FIG. 8A and FIG. 8B depict a tuned carbon and corresponding dry traction DMA parameters, according to some embodiments.
Figure 8B:
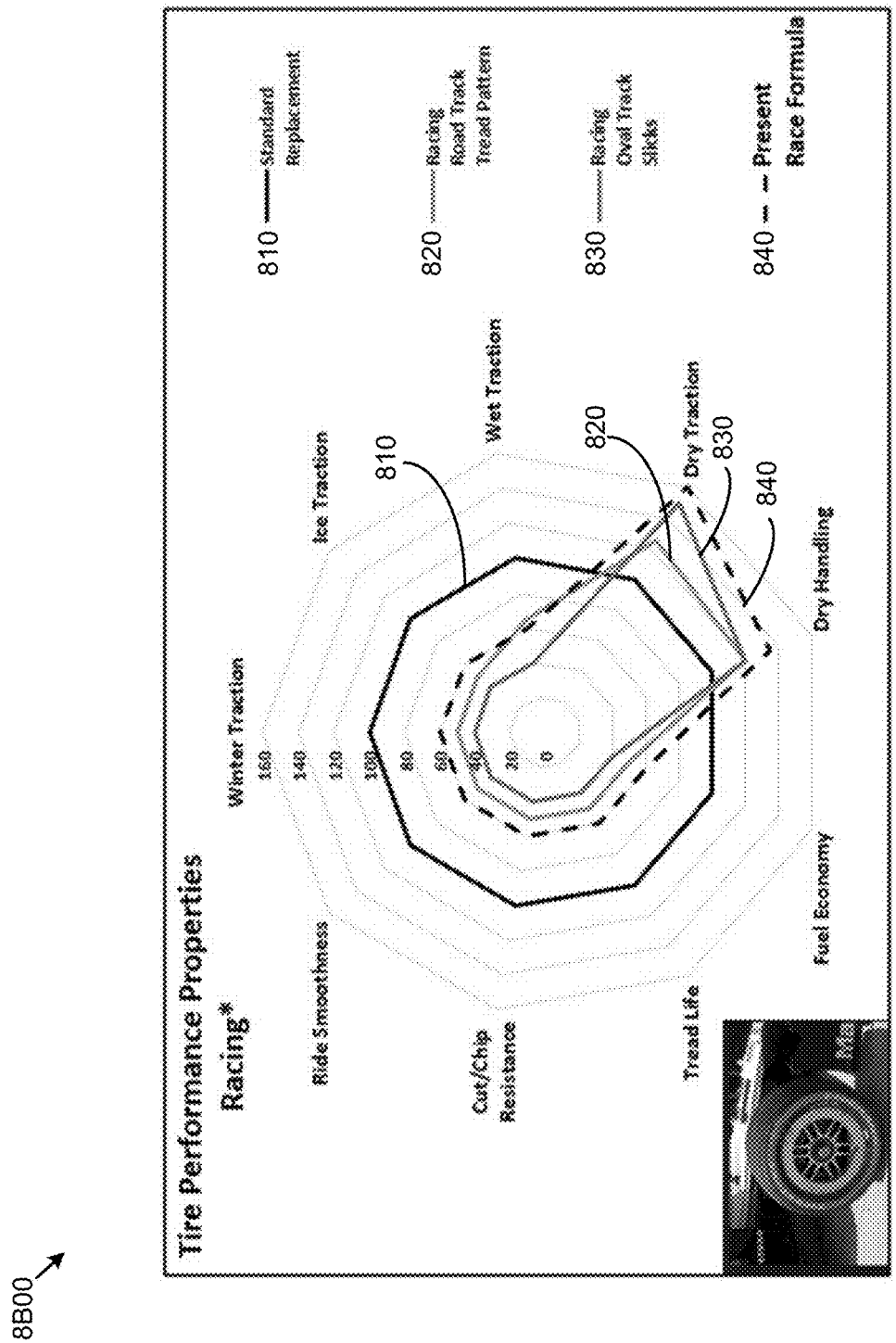

FIG. 8A and FIG. 8B (diagrams 8A00 and 8B00, respectively) depict a tuned carbon and corresponding DMA parameters measured using ASTM D5992-96 (2011). This example shows a scanning electron microscope image (left image in FIG. 8A) of a tuned carbon along with a corresponding elemental spectroscopy image (right image in FIG. 8A) illustrating the chemical doping of this material. The carbons in this example have been tuned to promote specific DMA properties, in this case dry traction, as shown in FIG. 8B. More specifically, the carbons are tuned to correspond to a particular point on the reinforcement curve 103. The characteristics of those tuned carbons used in the composite include result in a tuned hysteretic curve such a depicted by tuning #3 293. The DMA chart in FIG. 8B has been normalized to a standard carbon reinforcing material (i.e., "Standard Replacement" curve 810), and the tuned carbon in this example (i.e., "Present Race Formula" curve 840) has greatly improved dry traction. However, some of the other DMA properties have decreased compared to the standard. Curves for two different tire treads used in racing tires with standard carbon are also shown in the figure for reference (i.e., "Racing Road Track Tread Pattern" curve 820, and "Racing Oval Track Slicks" curve 830). The "Present Race Formula" in this example outperforms or is equivalent to the conventional racing formulations in all eight DMA properties.

Figure 9A:
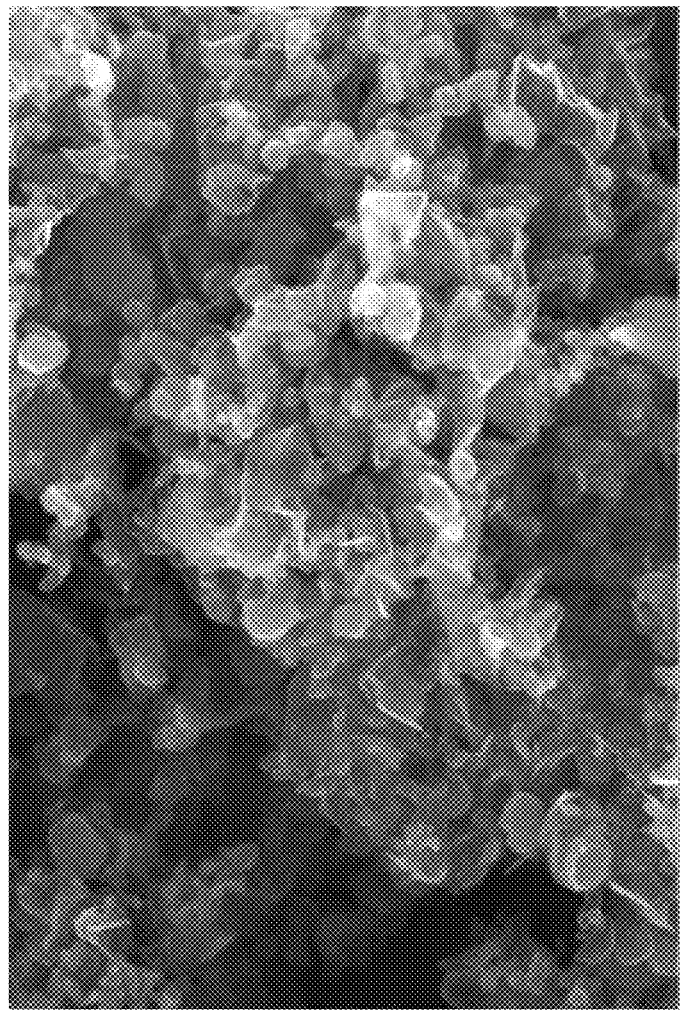
FIG. 9A and FIG. 9B depict a tuned carbon and corresponding dry handling DMA parameters, according to some embodiments.
Figure 9B:
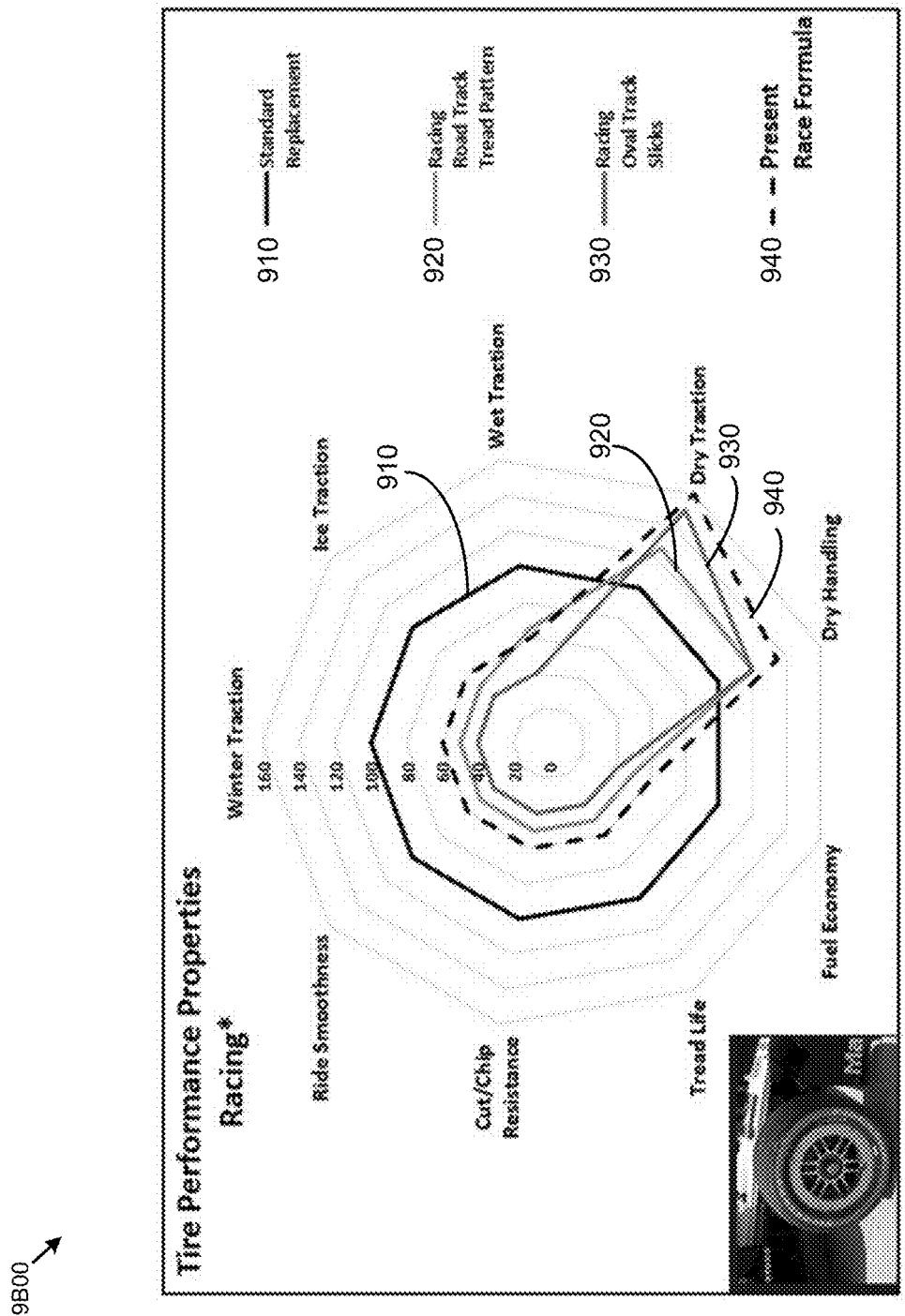

FIG. 9A and FIG. 9B (diagrams 9A00 and 9B00) depict a scanning electron microscope image of tuned carbon and the corresponding DMA parameters measured using ASTM D5992-96 (2011). In this example, a specific tuned carbon structure and surface is selected to promote dry handling. More specifically, the tuned carbons correspond to a particular point on the reinforcement curve 103. A composite made with the tuned carbons exhibit in a tuned hysteretic curve such a depicted by tuning #3 293. The DMA chart in FIG. 9B has been normalized to a standard carbon reinforcing material (i.e., "Standard Replacement" curve 910), and the tuned carbon in this example (i.e., "Present Race Formula" curve 940) has greatly improved dry traction. However, some of the other DMA properties have decreased compared to the standard. Curves for two different tire treads used in racing tires with standard carbon are also shown in the figure for reference (i.e., "Racing Road Track Tread Pattern" curve 920, and "Racing Oval Track Slicks" curve 930). The "Present Race Formula" in this example outperforms or is equivalent to the conventional racing formulations in all 8 DMA properties.

Figure 10A:
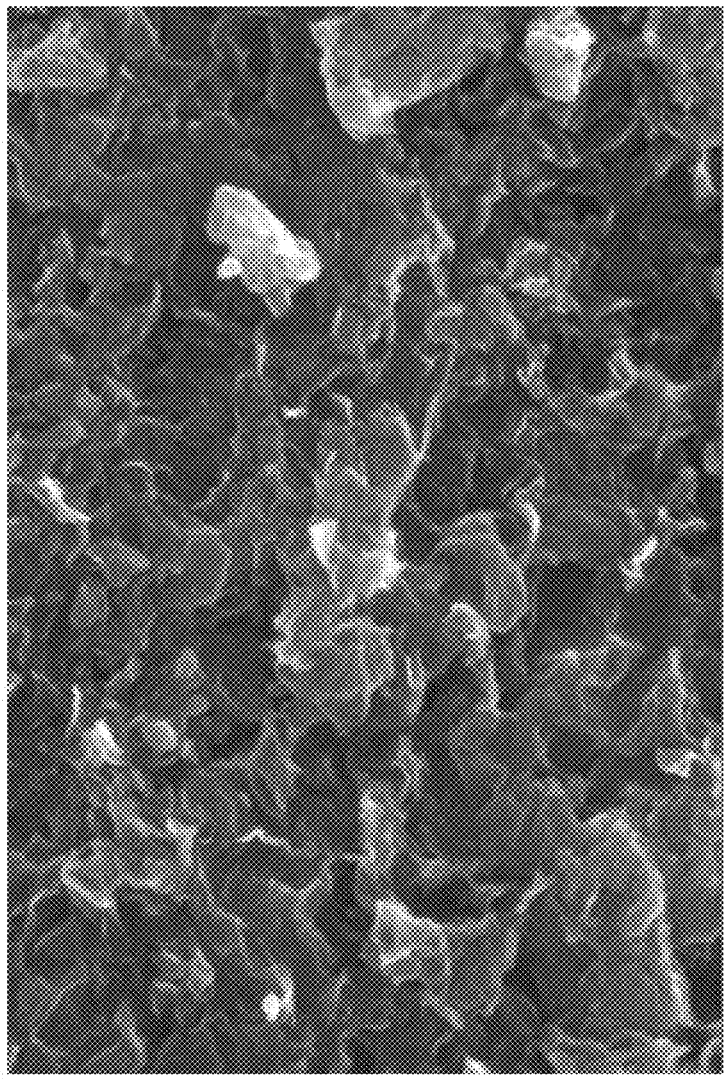
FIG. 10A and FIG. 10B depict a tuned carbon and corresponding fuel economy DMA parameters, according to some embodiments.
Figure 10B:
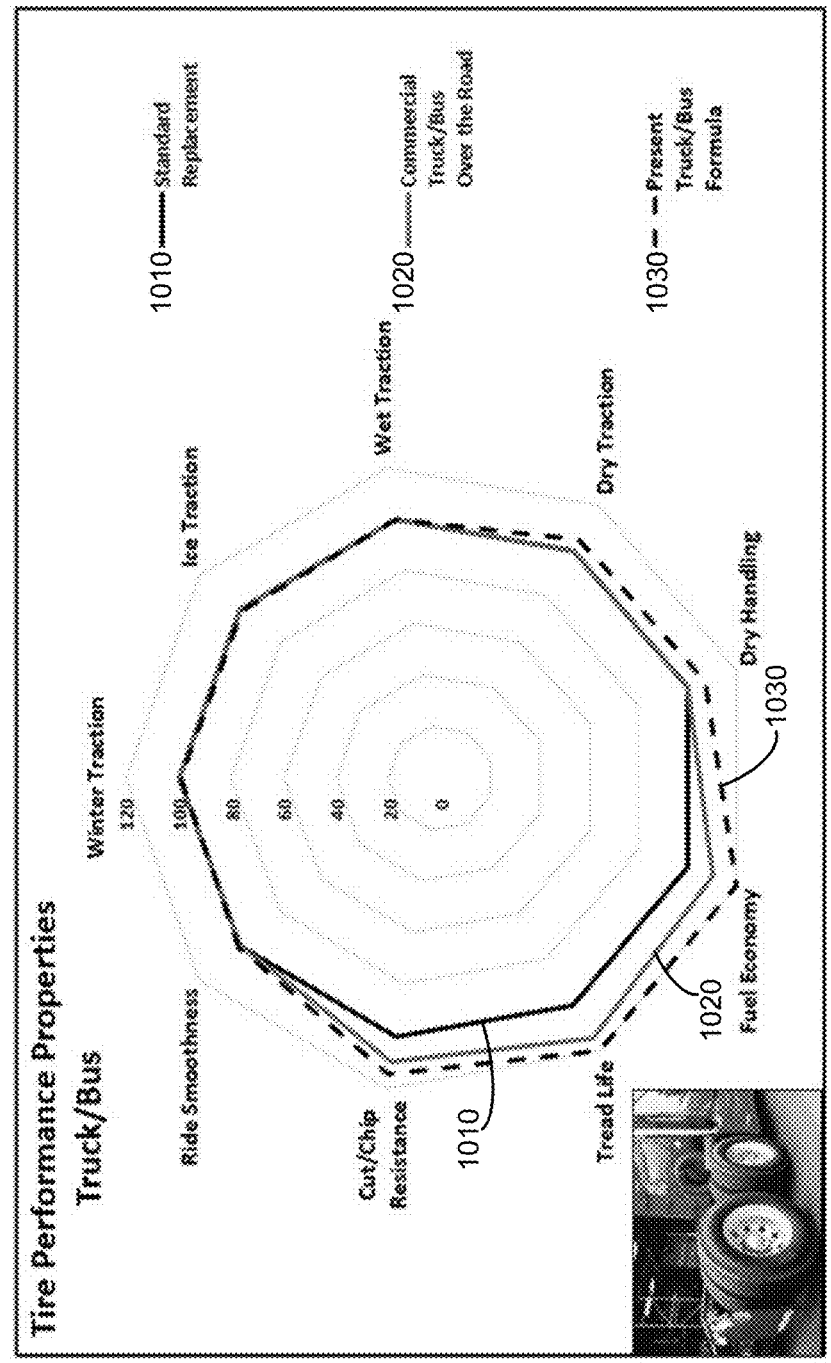

FIG. 10A and FIG. 10B depict a scanning electron microscope image 10A00 of tuned carbon and the corresponding parameters measured using ASTM D5992-96 (2011). In this example, a specific tuned carbon structure and surface is selected to promote fuel economy. More specifically, the tuned carbons correspond to a particular point on the reinforcement curve 103. A composite made with the tuned carbons exhibit in a tuned hysteretic curve such a depicted by tuning #2 292. The DMA chart 10B00 in FIG. 10B has been normalized to a standard carbon reinforcing material (i.e., "Standard Replacement" curve 1010), and the tuned carbon in this example (i.e., "Present Truck/Bus Formula" curve 1030) has improved cut/chip resistance, tread life, and fuel economy. Furthermore, in this example it is exceptional that the other DMA properties are equivalent to the standard, since oftentimes when one property is improved others suffer. Also, for reference, in the DMA chart in FIG. 10B a curve 1020 is shown that corresponds to the "Commercial Truck/Bus Over the Road," which also uses standard carbon. The "Present Truck/Bus Formula" in this example outperforms the conventional "Commercial Truck/Bus Over the Road" in all eight DMA properties.

Figure 11A:
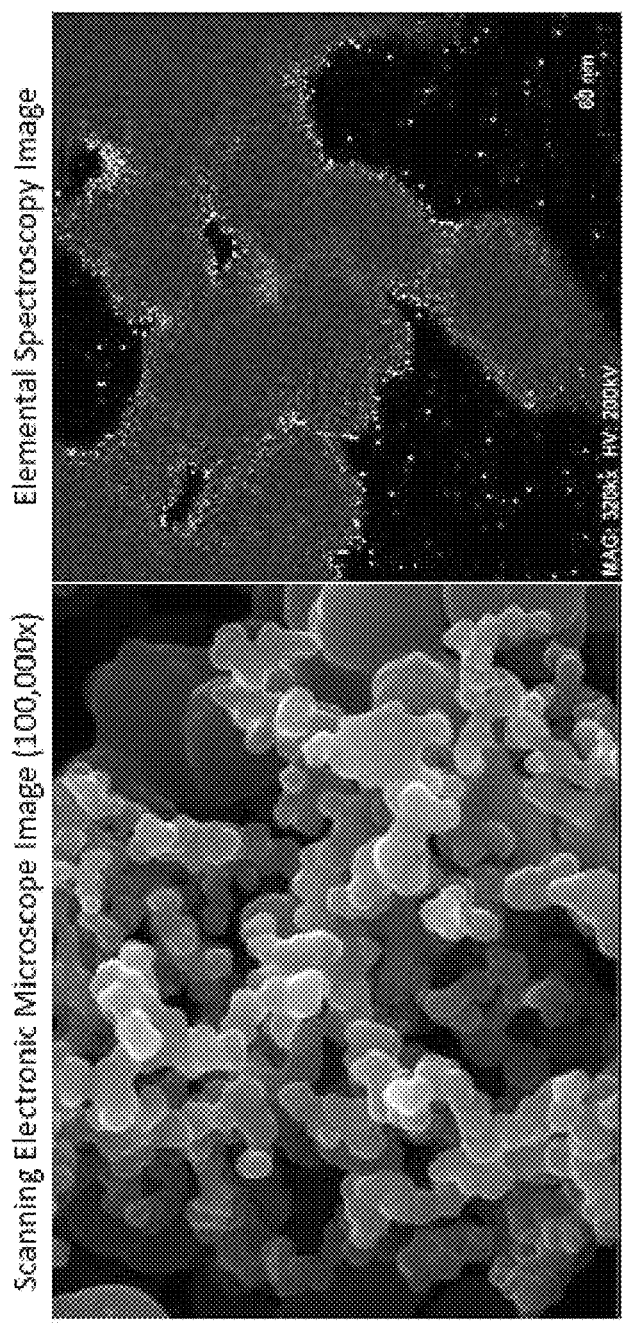
FIG. 11A and FIG. 11B depict a tuned carbon and corresponding wet traction DMA parameters, according to some embodiments.
Figure 11B:
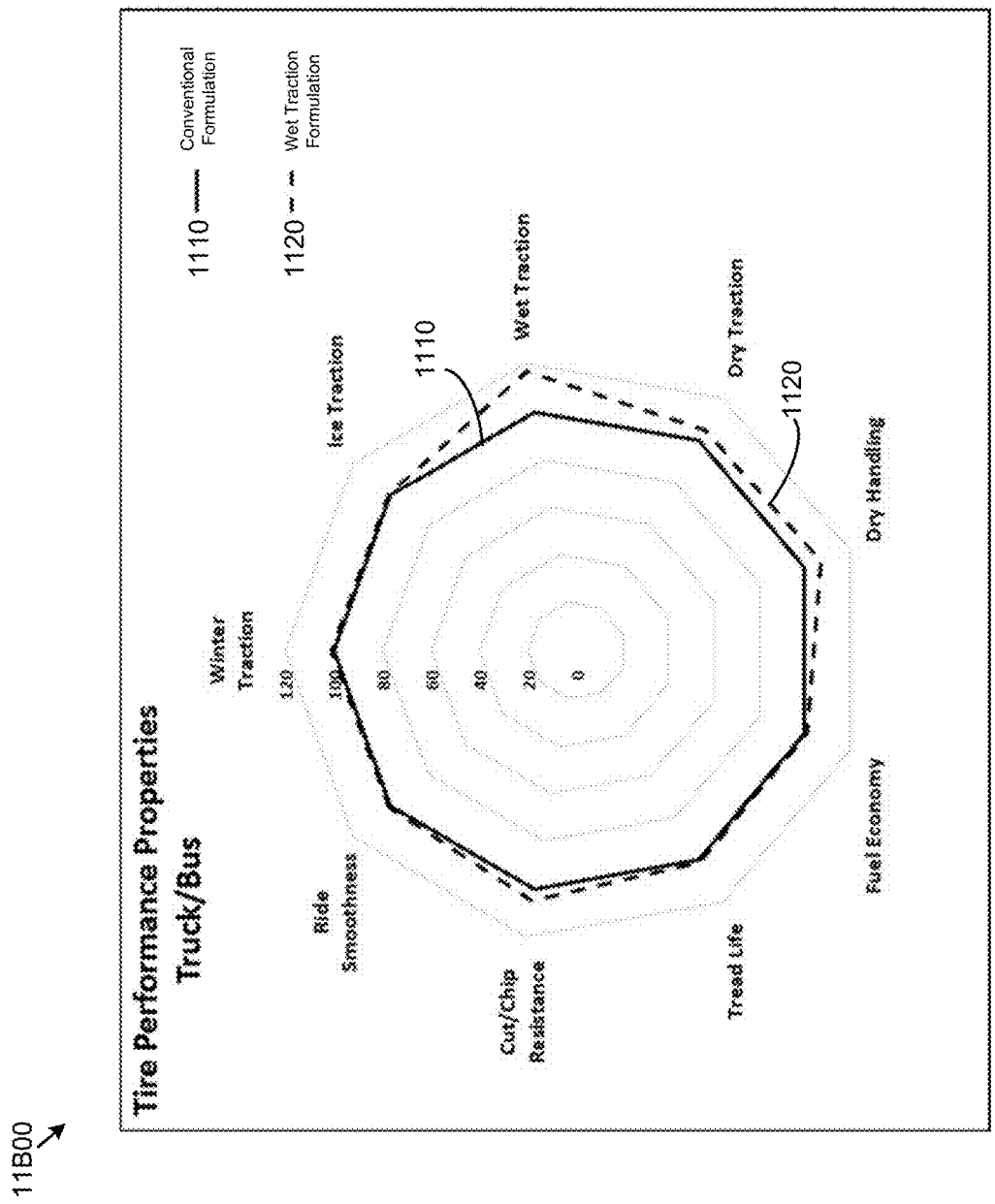

FIG. 11A and FIG. 11B depict a tuned carbon and corresponding DMA parameters measured using ASTM D5992-96 (2011). The image 11A00 of FIG. 11A depict a specific tuned carbon surface that is functionalized for use in a tire composite having characteristics that promote wet traction (e.g., in acceleration or braking). This example shows a scanning electron microscope image (left image in FIG. 11A) of a tuned carbon along with a corresponding elemental spectroscopy image (right image in FIG. 11A) illustrating the distribution of functional groups of this material. The carbons in this example have been tuned to promote specific DMA properties, mainly wet traction in this case, as shown in the "Wet Traction Formulation" curve 1120 in FIG. 11B. The DMA chart 11B00 in FIG. 11B has also been normalized to a standard carbon reinforcing material (i.e., "Conventional Formulation" curve 1110), and the DMA plot shows that the wet traction, dry traction and dry handling have all improved, while the remaining DMA properties are equivalent or better than the standard, which is again an exceptional result.

Figure 12:
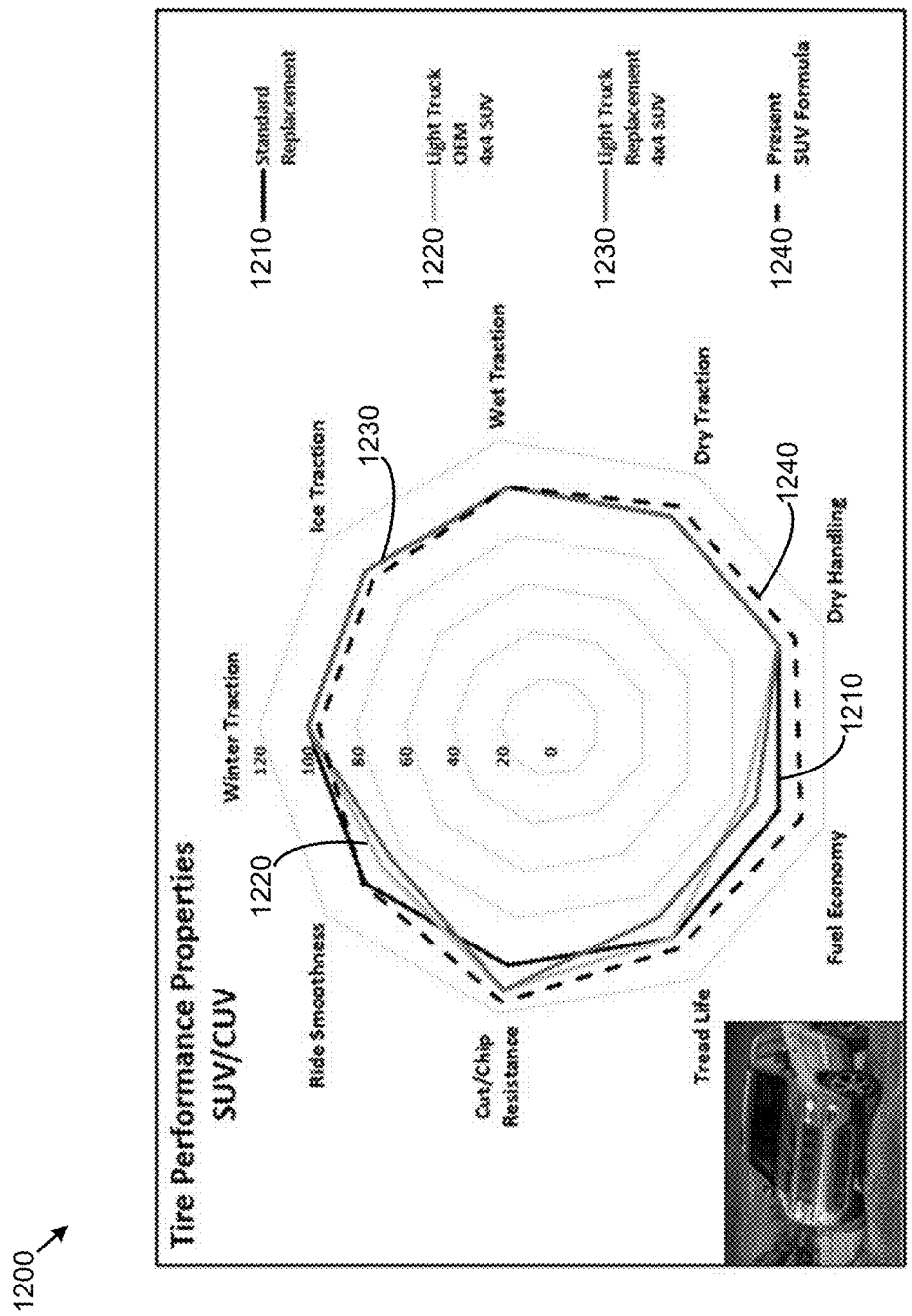
FIG. 12 depicts optimized DMA parameters for sport-utility vehicle applications, according to some embodiments.

FIG. 12 depicts DMA parameters for sport-utility vehicle (SUV) applications measured using ASTM D5992-96 (2011). A specific optimized material for SUV and/or passenger elastomer tire systems is selected in accordance with the herein-disclosed techniques. The DMA chart 1200 in FIG. 12 has been normalized to a standard carbon reinforcing material (i.e., "Standard Replacement" curve 1210), and the tuned carbon in this example "Present SUV Formula" curve 1240 has improved or equivalent DMA properties except for slightly lower winter traction and ice traction. Also, for reference, in the DMA chart 1200 in FIG. 12 two curves are shown that correspond to conventional SUV tire formulations (i.e., "Light Truck OEM 4×4 SUV" curve 1220 and "Light Truck Replacement 4×4 SUV" curve 1230), which also use standard carbons. The "Present SUV Formula" curve 1240 in this example outperforms or are equivalent to the DMA properties for the conventional formulations except for winter traction and ice traction.

Figure 13:
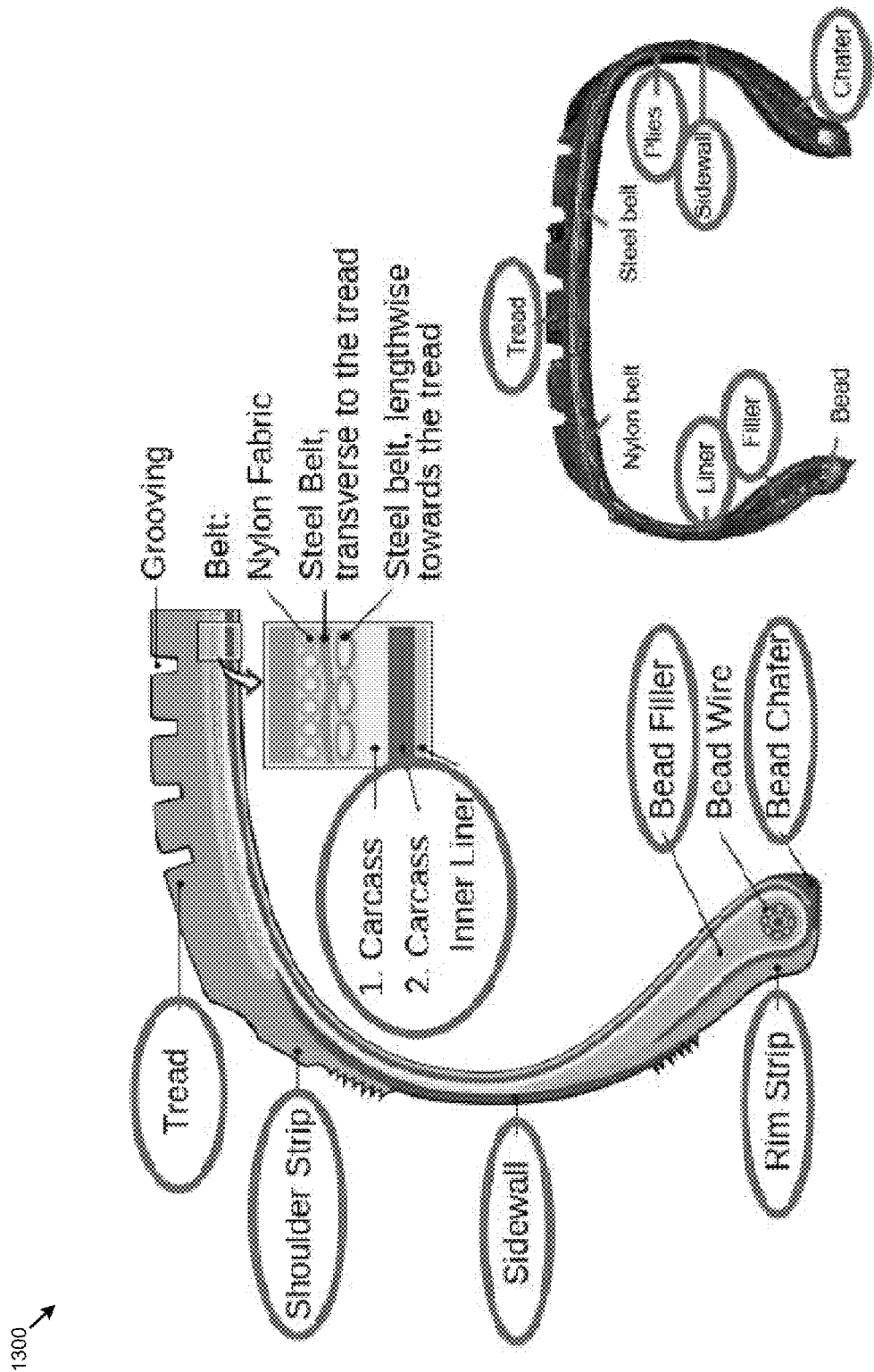
FIG. 13 shows a cross-section of a radial tire structure, in accordance with some embodiments.

FIG. 13 shows a cross-section of a radial tire structure. The diagram 1300 shows that the foregoing elastomers that have been tuned to exhibit particular hysteretic behaviors can be used in various components that make up a tire. As shown, the encircled components indicate areas where the present carbons can be used. In some cases, different carbons are combined with different elastomer formulations, which in turn are used to form different tire components, and/or to be used in different areas of the tire.

Further details regarding selecting particular carbons to be combined with different elastomer formulations are described in U.S. Application No. 62/824,440 entitled "Tuning Resonant Materials for Vehicle Sensing," filed on Mar. 27, 2019, which is hereby incorporated by reference in its entirety.

The encircled example areas in FIG. 13 include, but are not limited to, the sidewalls, the tread, the liner and the carcasses. Different types of rubber compounds are typically used in different areas, where the tread requires higher grade materials than the other areas of the tire. Different formulations of the present elastomer compounds can be used for areas such as, but not limited to, the treads, sidewalls and carcass.

Due to the properties of elastomer compounds containing the graphene-based carbon materials described herein, these compounds can be used in tires for various industries, such as tires for automotive, aerospace, other aircraft, passenger tires, off-road equipment, earth-mover type vehicles, racing tires, and all other/similar industrial applications that use tires.

Additionally, the present elastomer compounds with graphene-based carbon can be used in various applications besides tires. For example, fluoroelastomers (FKM) are another possible application of the present graphene-based carbon materials, such as for aerospace applications and other extreme high or low temperature environments. Since the graphene-based carbons described herein have very little, if any, sulfur upon production, they are attractive substitutes for the conventional carbon that is used for FKM. Hydrogenated nitrile butadiene rubber (HNBR) is another area of application, where the present graphene-based carbons can be a direct replacement for standard carbon blacks (e.g., for oil field applications, and other abrasive environments). The present reinforced elastomer compounds can also be used in applications such as door seals, gaskets, anti-vibration applications, energy dampening applications, hoses, conveyor belts, engine belts, and many others.

Other Linkers and Uses Thereof

In some embodiments, the surface area, structure, and surface activity of the carbon materials described herein are tuned by nano-mixing, or mixing, the carbon particles within the carbon materials with particles of other materials. In some embodiments, particles of nano-mix additive materials can be beneficially integrated with the particles of the graphene-based carbon on a particle level, which shall be referred to as nano-mixing in this disclosure. The average diameter of the particles of the nano-mix additive material and the graphene-based carbon materials in the nano-mixture can be from 1 nm to 1 micron, or from 1 nm to 500 nm, or from 1 nm to 100 nm, or can be as small as 0.1 nm. In some embodiments, the nano-mix additive material and the graphene-based carbon material are chemically bound, or are physically bound, together in the nano-mixture. The nano-mixing involves introducing nano-mix additives during the hydrocarbon cracking process in a reactor as the carbon particles are being formed, such that the nano-mix additive material is integrated into the graphene-based carbon material as the carbon material is produced, rather than combining a carbon raw material with an additive in a later process as in conventional methods (e.g., the macro-mixing mentioned above). For example, the resulting nano-mixed carbon materials of the present embodiments can contain particles of silica, ZnO, and/or metals. The nano-mix additive material can be introduced into the reactor as a gas, liquid, or colloidal dispersion. As an example, silica or silicon can be input into the reactor along with a hydrocarbon process gas (or other carbon-containing process material such as a liquid alcohol) to produce silica in combination with carbon materials and/or silicon wrapped in or coated with graphene, graphene-based carbon materials, and/or other carbon allotropes.

Returning to the discussion of FIG. 3, linkers such as Si or H, or O—H are used in combination with organic molecules, oligomers, and/or polymers (e.g., aromatics, siloxanes, amines, etc.) to functionalize a surface. Other embodiments might functionalize a surface by introducing metals, such as particles, gases or liquids containing S, Na, K, B, Cr, Ca, Sr, Mg, Zn, Ga, Rb, Cs, B, Mn, alkali metals and other metals, into a reactor used to produce the carbons (e.g., a microwave plasma reactor) along with a hydrocarbon process gas to produce functionalized and/or nano-mixed carbon materials with the metals incorporated into the carbon materials. The incorporation of metals during the hydrocarbon disassociation and/or during the carbon particle formation process can create carbon particles with improved surface area, structures and/or surface activity. In some embodiments, alkali metals can be incorporated into the functionalized graphene-based carbon materials and the alkali metals functions as a coupling/linking agent to improve the adhesion between the carbon materials and the elastomer materials in a compound.

In another example, adding halogens, such as particles, gases or liquids containing F, Cl, Br, I, and other halogens, into the reactor along with a hydrocarbon process gas can produce functionalized carbon materials with the halogens incorporated into the carbon materials. The incorporation of halogens during the hydrocarbon cracking carbon particle formation process can create carbon particles with improved surface area, structures and/or surface activity.

In another example, adding particles, such as oxides (e.g., silica, zinc oxide, titanium dioxide) or metals, into the reactor along with a hydrocarbon process gas can produce nano-mixed carbon materials with the particles of the nano-mix additive and the particles of the carbon materials forming aggregates together. The incorporation of nano-mix additive particles during the hydrocarbon cracking carbon particle formation process can create nano-mixed carbon particles with improved surface area, structures and/or surface activity.

In yet another example, adding oxygen-containing reactants or oxidizing reactants into the reactor along with a hydrocarbon process gas can produce functionalized carbon materials with oxygen incorporated into the carbon materials. Some examples of oxygen-containing or oxidizing reactants are ozone, hydrogen peroxide, potassium hydroxide, potassium chloride, hydrochloric acid, nitric acid, chromic acid, permanganates and diazonium salts. The oxygen-containing or oxidizing materials can be added to the reactor in concentrations of the reactive species in the oxygen-containing or oxidizing materials (e.g., O, K, Cl, etc.) to the carbon in the hydrocarbon process gas from 5 ppm to 100 ppm, or 5 ppm to 30 ppm, or greater than 5 ppm, or greater than 15 ppm. The incorporation of oxygen-containing reactants or oxidizing reactants during the hydrocarbon cracking carbon particle formation process can create carbon particles with improved surface area, structures and/or surface activity. Oxidized carbon materials tend to slow the cure time of a reinforced elastomer. Therefore, incorporating oxidized carbon materials into a reinforced elastomer compound can enable the tuning of the cure time, which can improve the resulting mechanical properties of the cured compound.

In some embodiments, the carbon materials described herein (e.g., graphene-based carbon materials) contain engineered surfaces, such as preferentially exposed crystal planes, graphitic edges, and/or crystallite edges. In some embodiments, these engineered surfaces are the result of the particle synthesis conditions within the reactor, additives into the reactor that functionalize and/or nano-mix with the particles during formation, or post-processing.

Structured Carbons

Figure 14B:
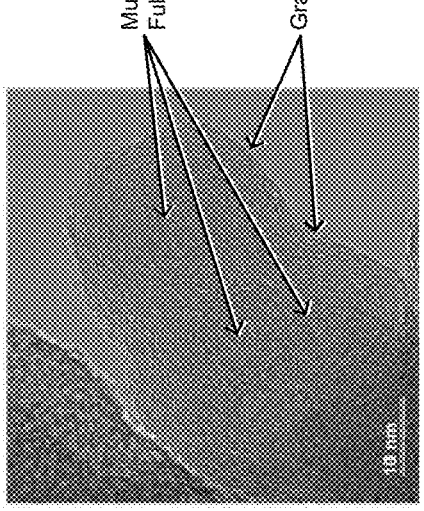
FIG. 14A through FIG. 14Y depict structured carbons, various carbon nanoparticles, various carbon-based aggregates, and various three-dimensional carbon-containing assemblies that are grown over other materials, according to some embodiments.
Figure 14A:
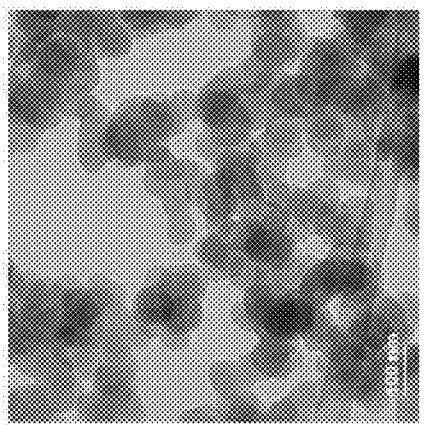
Figure 14C:
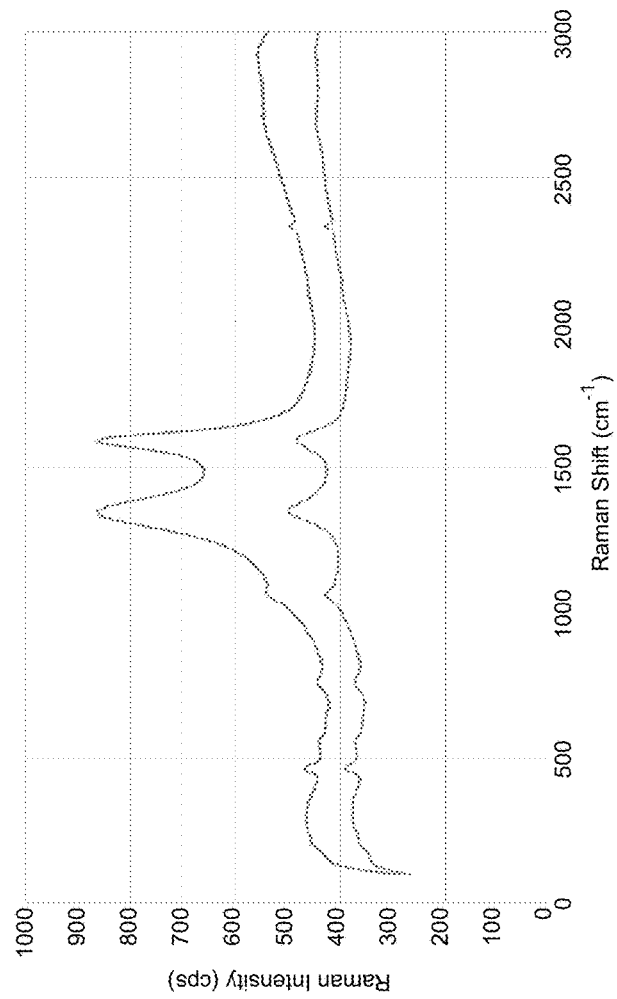
Figure 14D:
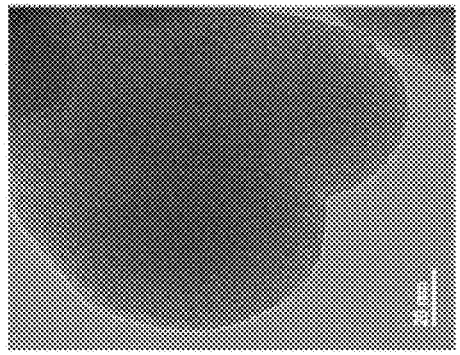
Figure 14E:
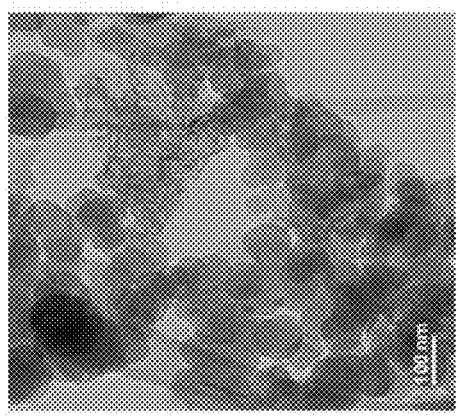
Figure 14F:
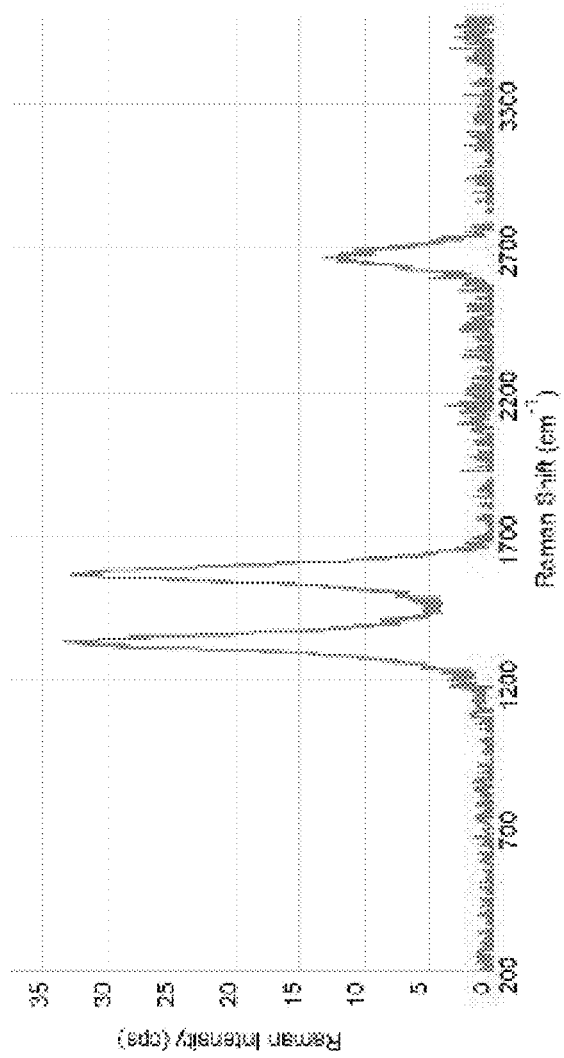
Figure 14G:
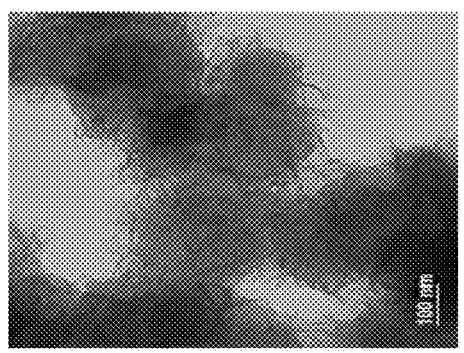
Figure 14H:
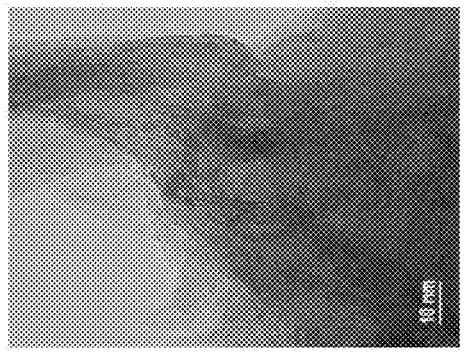
Figure 14I:
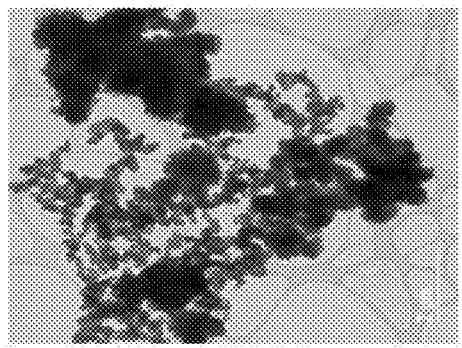
Figure 14J:
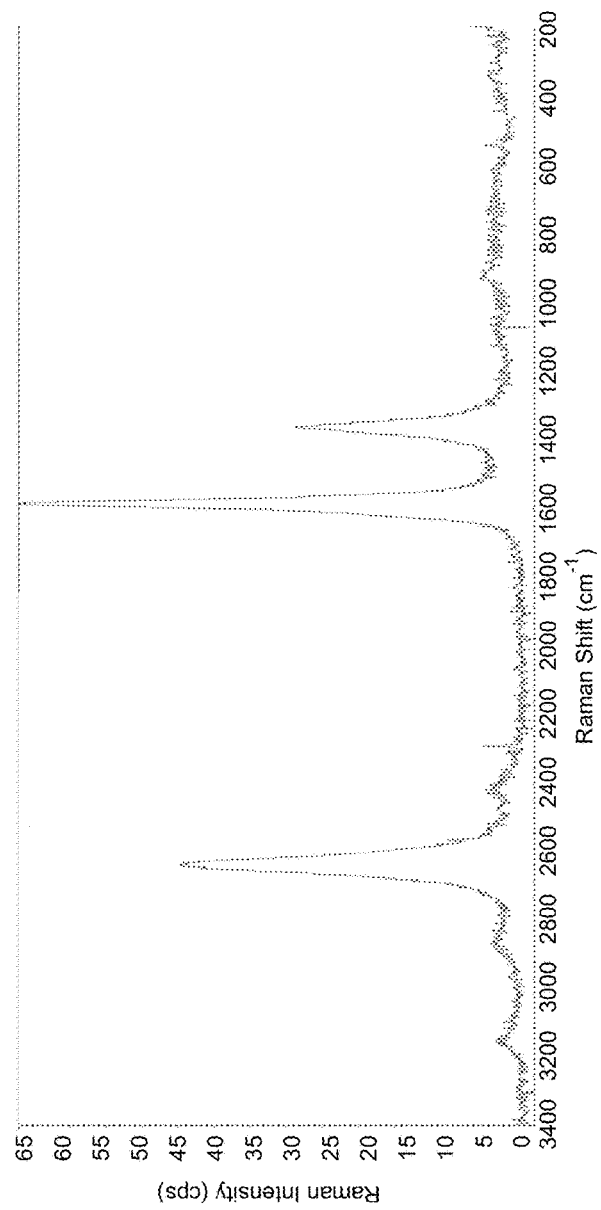
Figure 14K:
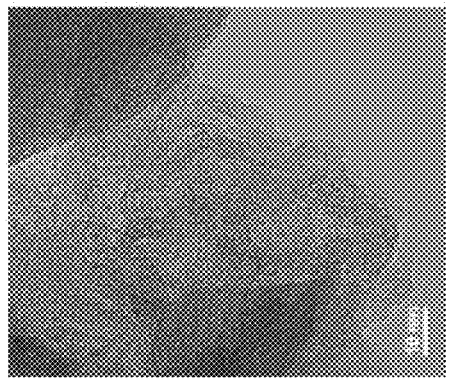
Figure 14L:
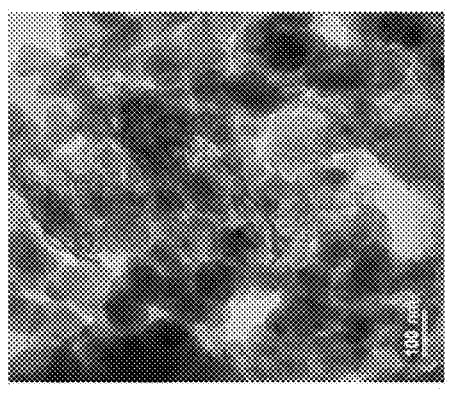
Figure 14M:
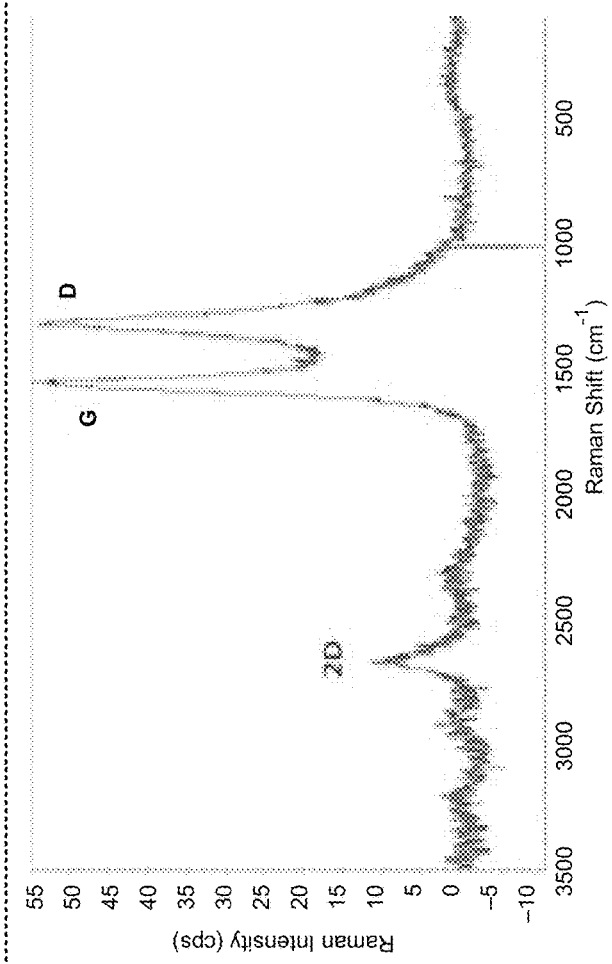
Figure 14N:
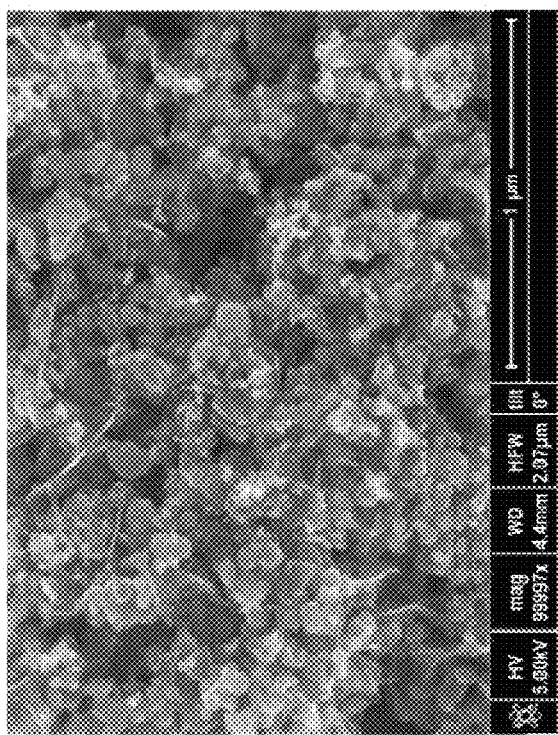
Figure 14O:
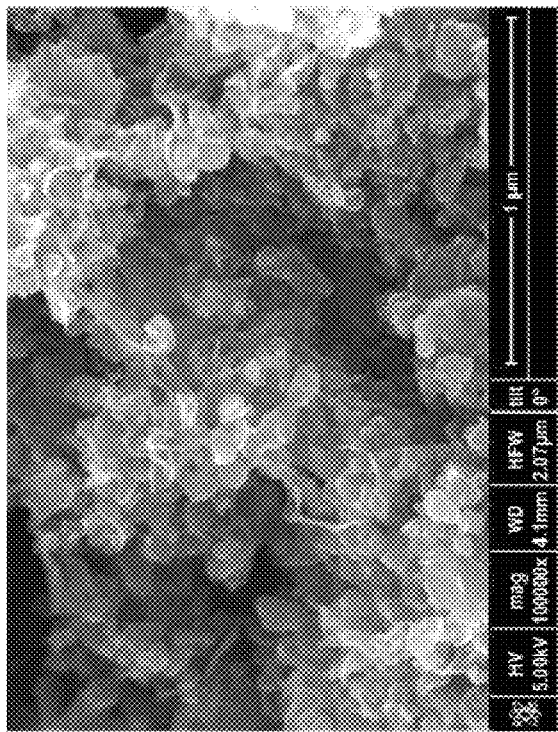
Figure 14P:
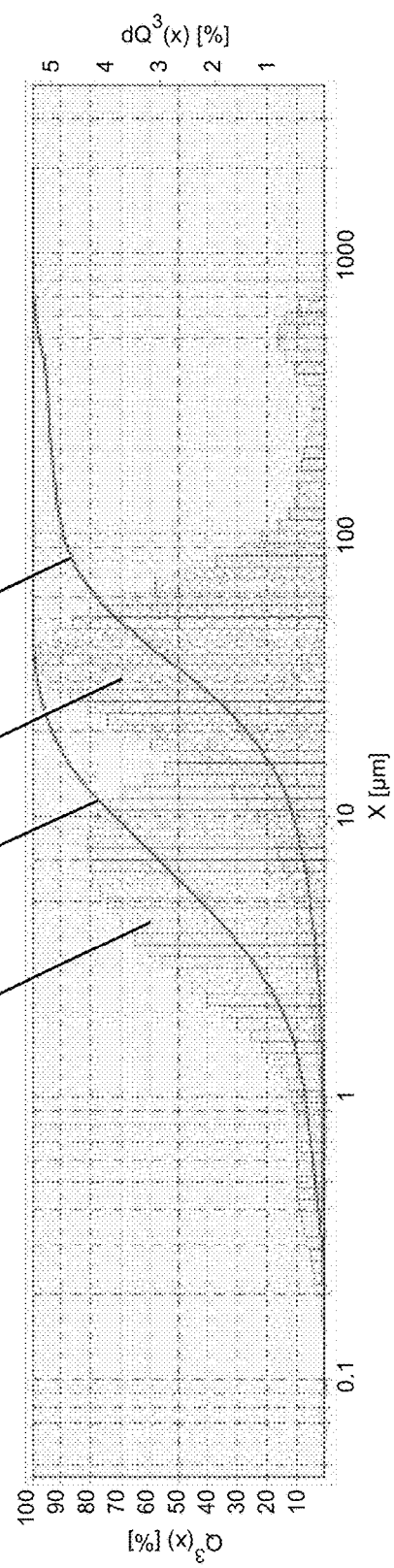
Figure 14Q:
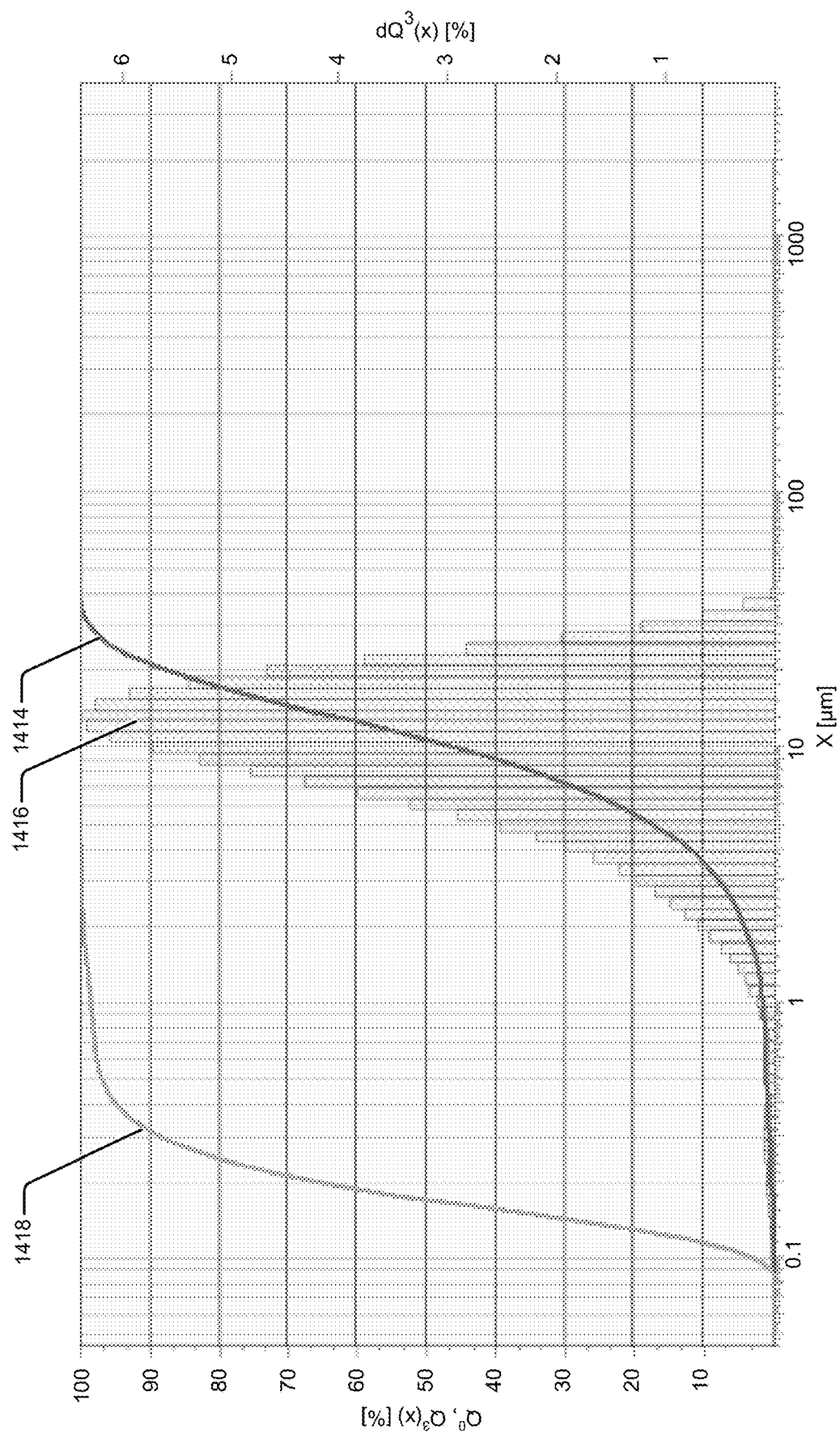
Figure 14R:
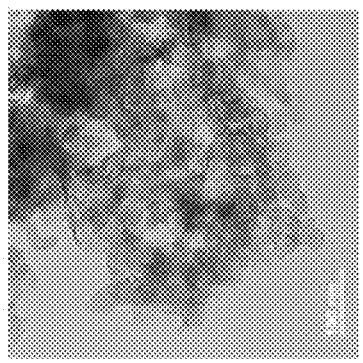
Figure 14S:
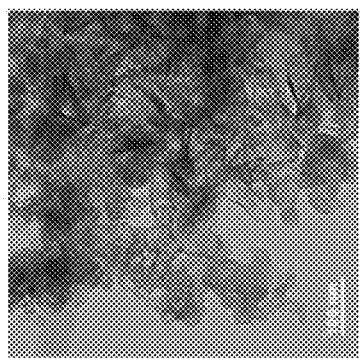
Figure 14T:
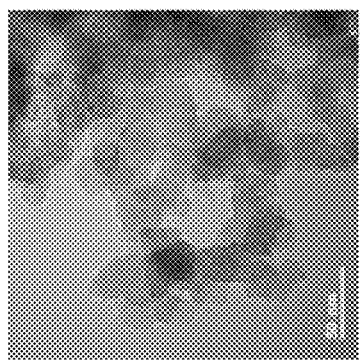
Figure 14U:
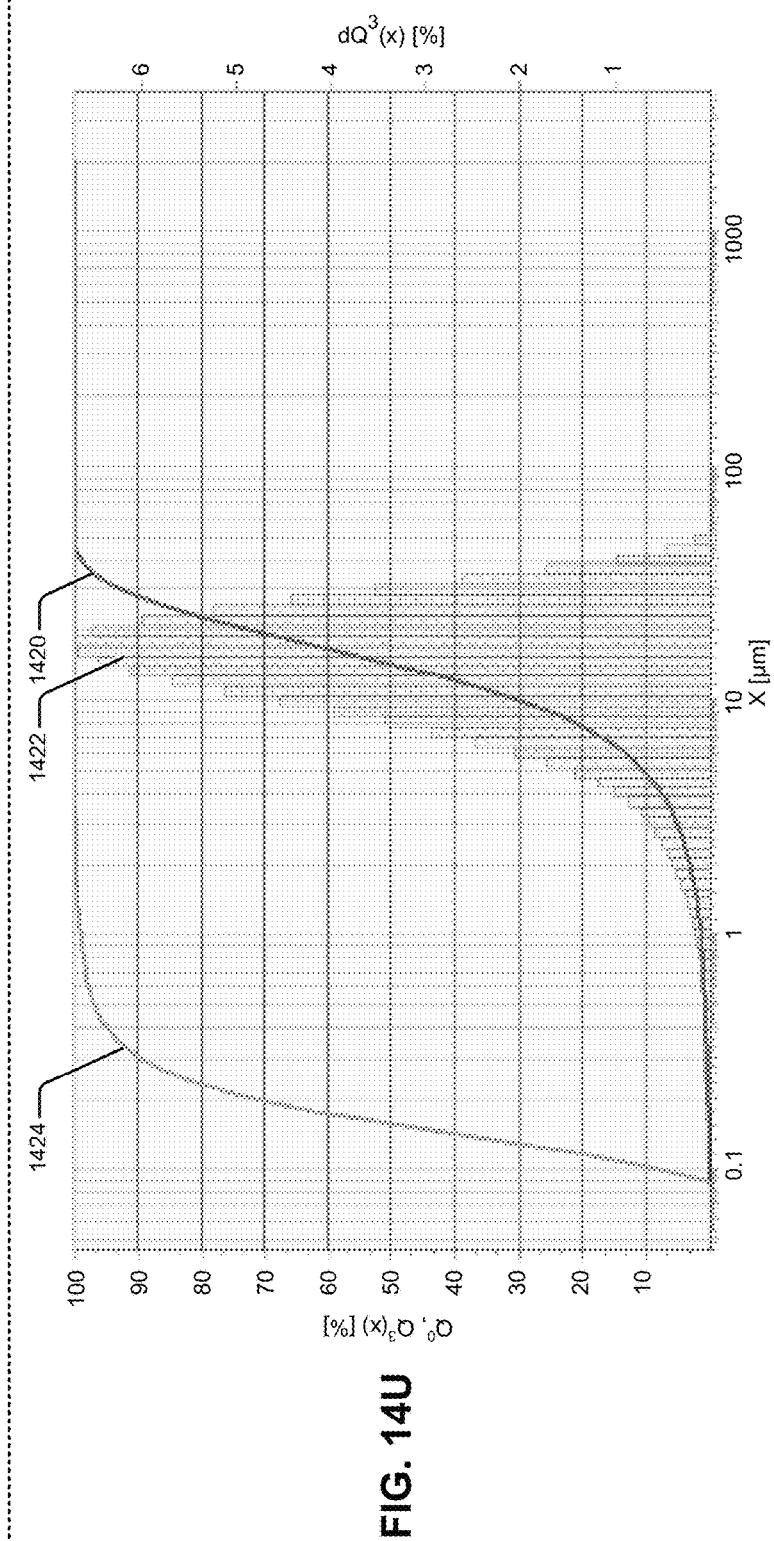
Figure 14V:
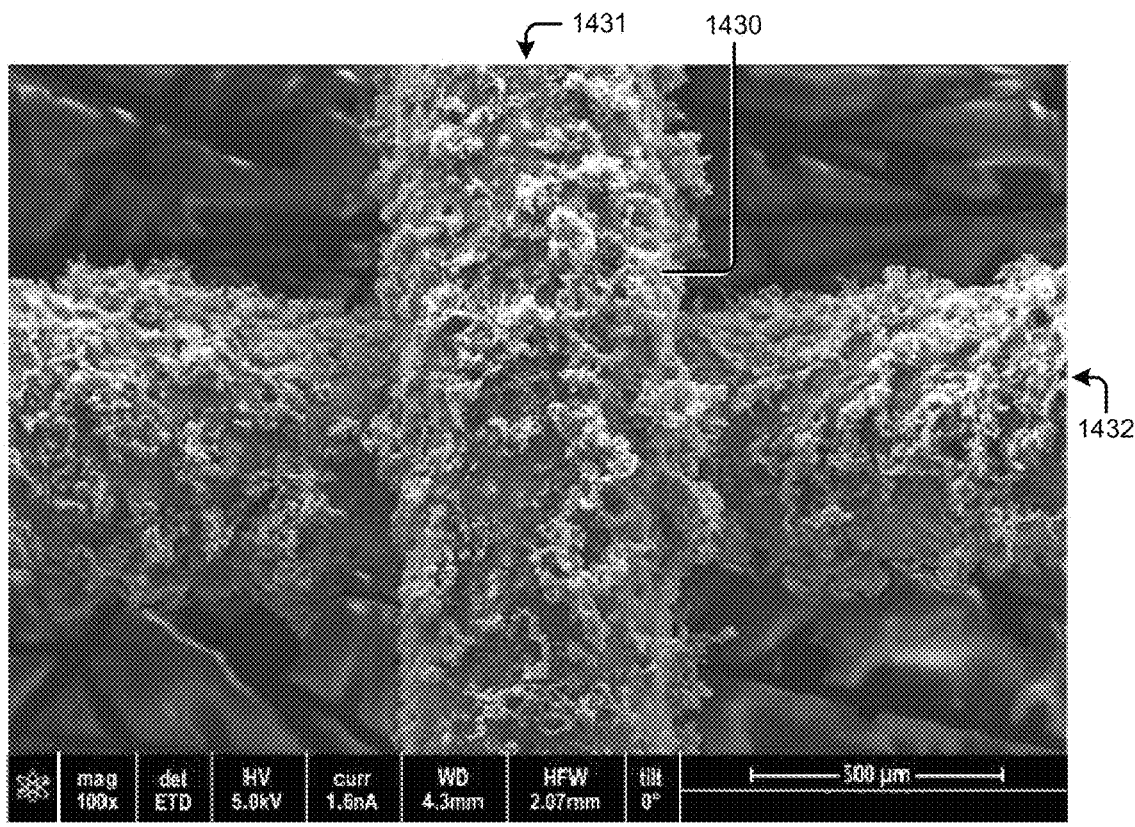
Figure 14W:
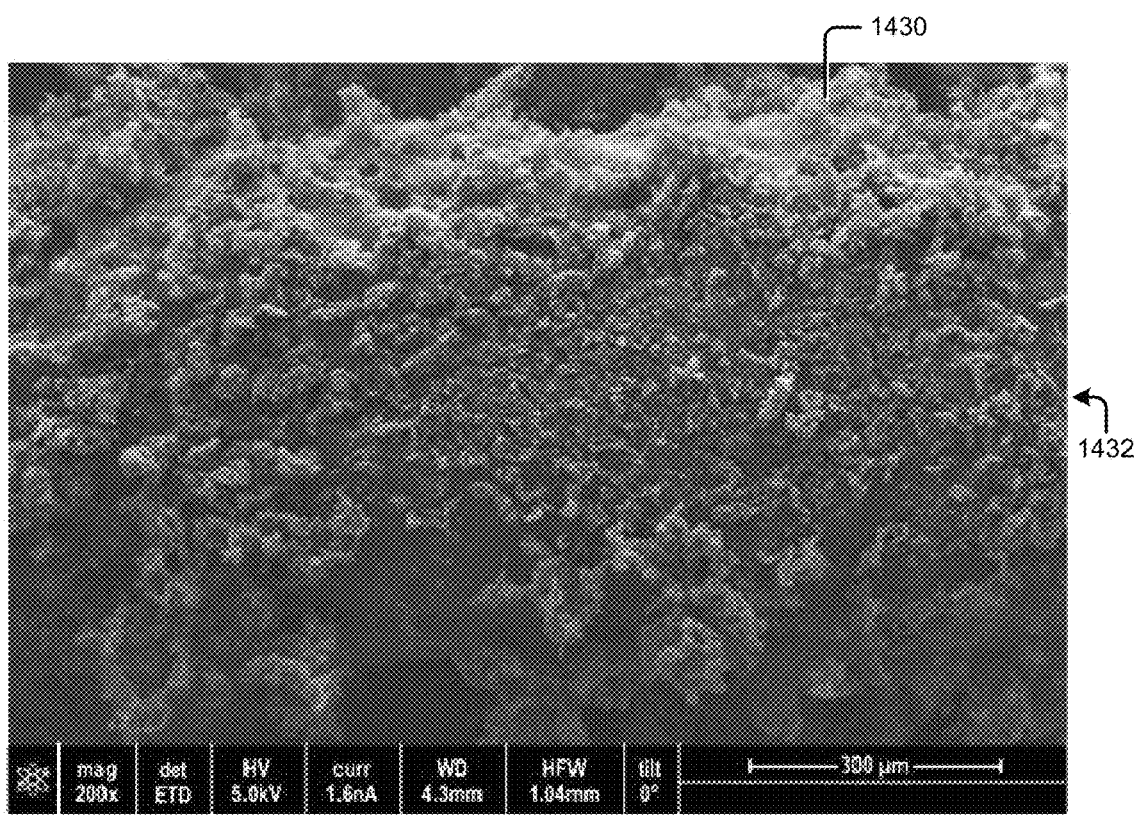
Figure 14X:
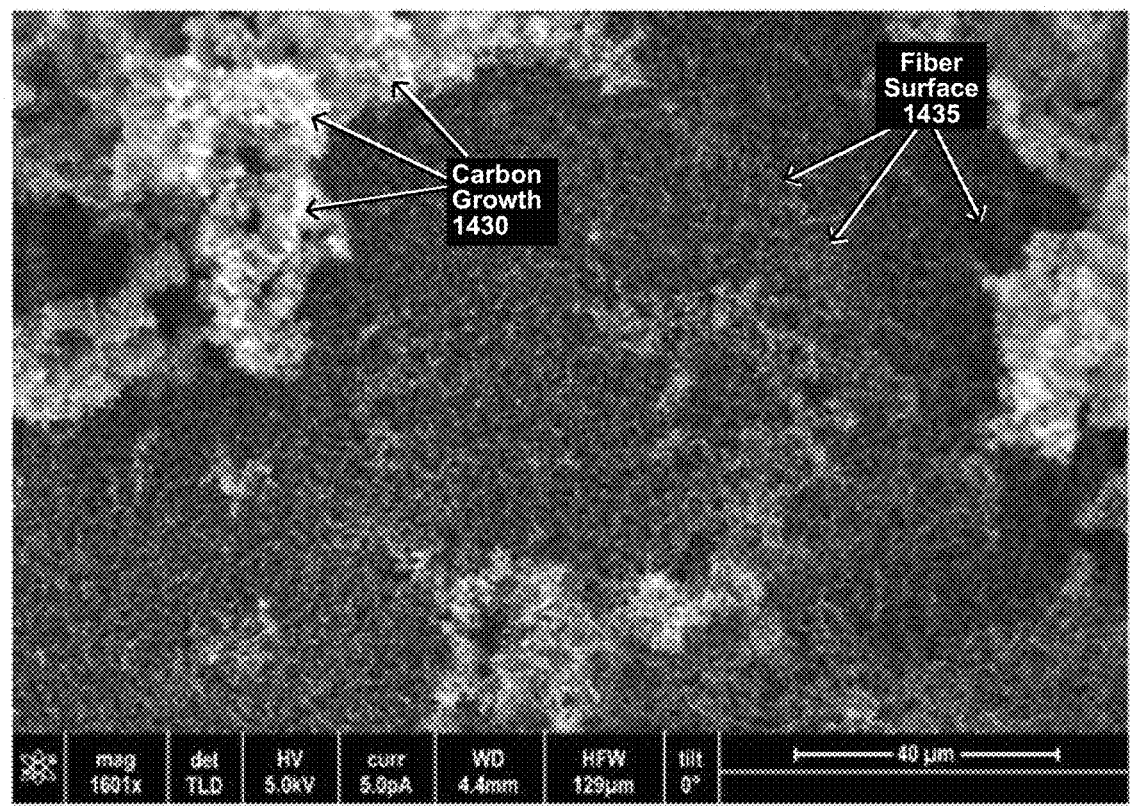
Figure 14Y:
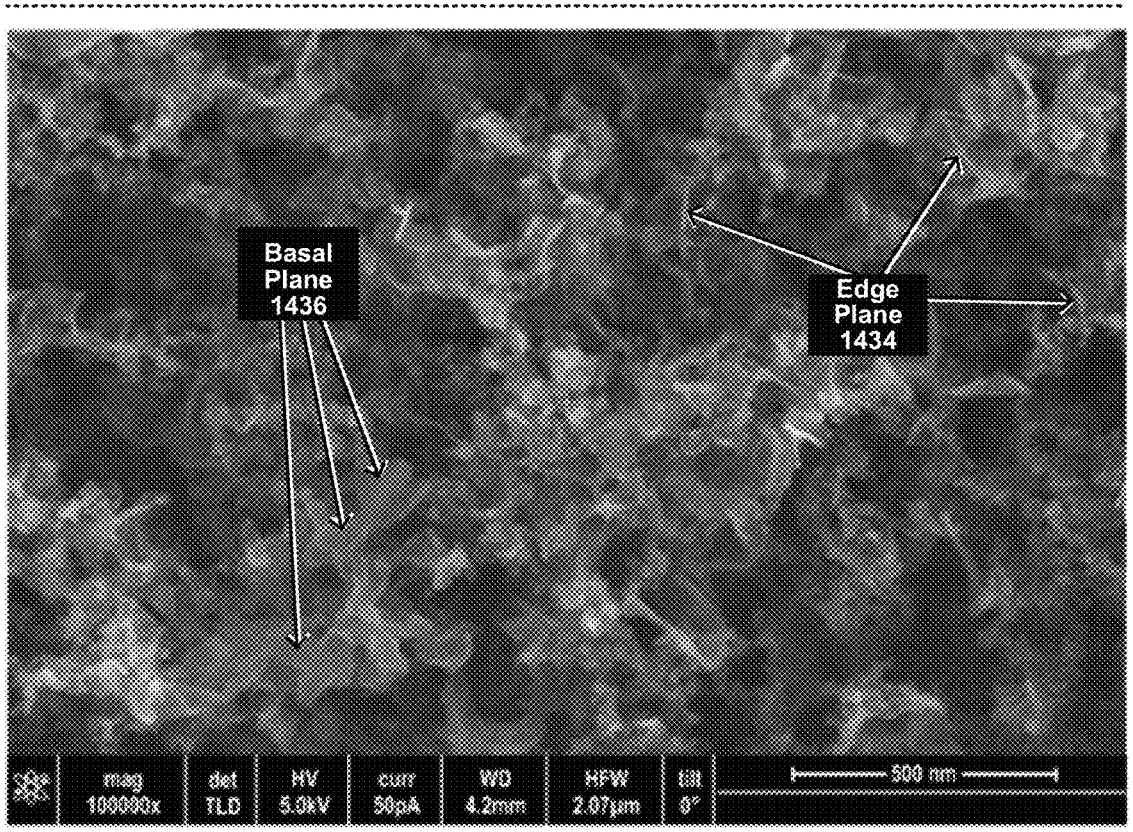

FIG. 14A through FIG. 14Y depict structured carbons, various carbon nanoparticles, various carbon-containing aggregates, and various three-dimensional carbon-containing structures that are grown over other materials, according to some embodiments of the present disclosure.

In some embodiments, the carbon nanoparticles and aggregates are characterized by a high "uniformity" (i.e., high mass fraction of desired carbon allotropes), a high degree of "order" (i.e., low concentration of defects), and/or a high degree of "purity" (i.e., low concentration of elemental impurities), in contrast to the lower uniformity, less ordered, and lower purity particles achievable with conventional systems and methods.

In some embodiments, the nanoparticles produced using the methods described herein contain graphene, multi-walled spherical fullerenes (MWSFs) or connected MWSFs and have a high uniformity (e.g., a ratio of graphene to MWSF from 20% to 80%), a high degree of order (e.g., a Raman signature with an $I_D/I_G$ ratio from 0.95 to 1.05), and a high degree of purity (e.g., the ratio of carbon to other elements (other than hydrogen), such as oxygen or metals, is greater than 99.9%). In some embodiments, the nanoparticles produced using the methods described herein contain graphene, MWSFs or connected MWSFs, and the MWSFs do not contain a core composed of impurity elements other than carbon. In some cases, the particles produced using the methods described herein are aggregates containing the nanoparticles described above with large diameters (e.g., greater than 10 μm across).

Conventional methods have been used to produce particles containing multi-walled spherical fullerenes with a high degree of order, but the conventional methods lead to carbon products with a variety of shortcomings. For example, high temperature synthesis techniques lead to particles with a mixture of many carbon allotropes and therefore low uniformity (e.g., less than 20% fullerenes to other carbon allotropes) and/or small particle sizes (e.g., less than 1 μm, or less than 100 nm in some cases). Methods using catalysts lead to products including the catalyst elements and therefore have low purity (e.g., less than 95% carbon to other elements) as well. These undesirable properties also often lead to undesirable electrical properties of the resulting carbon particles (e.g., electrical conductivity of less than 1000 S/m).

In some embodiments, the carbon nanoparticles and aggregates described herein are characterized by Raman spectroscopy that is indicative of the high degree of order and uniformity of structure. Additional advantages and/or improvements will also become apparent from the following disclosure.

In the present disclosure, the term "graphene" refers to an allotrope of carbon in the form of a two-dimensional, atomic-scale, hexagonal lattice in which one atom forms each vertex. The carbon atoms in graphene are $sp^2$-bonded. Additionally, graphene has a Raman spectrum with peaks: a G-mode at approximately 1580 $cm^{-1}$ and a D-mode at approximately 1350 $cm^{-1}$ (when using a 532 nm excitation laser).

In the present disclosure, the term "fullerene" refers to a molecule of carbon in the form of a hollow sphere, ellipsoid, tube, or other shapes. Spherical fullerenes can also be referred to as Buckminsterfullerenes, or buckyballs. Cylindrical fullerenes can also be referred to as carbon nanotubes. Fullerenes are similar in structure to graphite, which is composed of stacked graphene sheets of linked hexagonal rings. Fullerenes may also contain pentagonal (or sometimes heptagonal) rings.

In the present disclosure, the term "multi-walled fullerene" refers to fullerenes with multiple concentric layers. For example, multi-walled nanotubes (MWNTs) contain multiple rolled layers (concentric tubes) of graphene. Multi-walled spherical fullerenes (MWSFs) contain multiple concentric spheres of fullerenes.

In the present disclosure, the term "nanoparticle" refers to a particle that measures from 1 nm to 989 nm. The nanoparticle can include one or more structural characteristics (e.g., crystal structure, defect concentration, etc.), and one or more types of atoms. The nanoparticle can be any shape, including but not limited to spherical shapes, spheroidal shapes, dumbbell shapes, cylindrical shapes, elongated cylindrical type shapes, rectangular prism shapes, disk shapes, wire shapes, irregular shapes, dense shapes (i.e., with few voids), porous shapes (i.e., with many voids), etc.

In the present disclosure, the term "aggregate" refers to a plurality of nanoparticles that are connected together by Van der Waals forces, by covalent bonds, by ionic bonds, by metallic bonds, or by other physical or chemical interactions. Aggregates can vary in size considerably, but in general are larger than about 500 nm.

In some embodiments, a carbon nanoparticle, as described herein, includes two or more connected multi-walled spherical fullerenes (MWSFs) and layers of graphene coating the connected MWSFs. In some embodiments, a carbon nanoparticle, as described herein, includes two or more connected multi-walled spherical fullerenes (MWSFs) and layers of graphene coating the connected MWSFs where the MWSFs do not contain a core composed of impurity elements other than carbon. In some embodiments, a carbon nanoparticle, as described herein, includes two or more connected multi-walled spherical fullerenes (MWSFs) and layers of graphene coating the connected MWSFs where the MWSFs do not contain a void (i.e., a space with no carbon atoms greater than approximately 0.5 nm, or greater than approximately 1 nm) at the center. In some embodiments, the connected MWSFs are formed of concentric, well-ordered spheres of $sp^2$-hybridized carbon atoms, as contrasted with spheres of poorly-ordered, non-uniform, amorphous carbon particles.

In some embodiments, the nanoparticles containing the connected MWSFs have an average diameter in a range from 5 to 500 nm, or from 5 to 250 nm, or from 5 to 100 nm, or from 5 to 50 nm, or from 10 to 500 nm, or from 10 to 250 nm, or from 10 to 100 nm, or from 10 to 50 nm, or from 40 to 500 nm, or from 40 to 250 nm, or from 40 to 100 nm, or from 50 to 500 nm, or from 50 to 250 nm, or from 50 to 100 nm.

In some embodiments, the carbon nanoparticles described herein form aggregates, wherein many nanoparticles aggregate together to form a larger unit. In some embodiments, a carbon aggregate includes a plurality of carbon nanoparticles. A diameter across the carbon aggregate is in a range from 10 to 500 μm, or from 50 to 500 μm, or from 100 to 500 μm, or from 250 to 500 μm, or from 10 to 250 μm, or from 10 to 100 μm, or from 10 to 50 μm. In some embodiments, the aggregate is formed from a plurality of carbon nanoparticles, as defined above. In some embodiments, aggregates contain connected MWSFs. In some embodiments, the aggregates contain connected MWSFs with a high uniformity metric (e.g., a ratio of graphene to MWSF from 20% to 80%), a high degree of order (e.g., a Raman signature with an $I_D/I_G$ ratio from 0.95 to 1.05), and a high degree of purity (e.g., greater than 99.9% carbon).

One benefit of producing aggregates of carbon nanoparticles, particularly with diameters in the ranges described above, is that aggregates of particles greater than 10 μm are easier to collect than particles or aggregates of particles that are smaller than 500 nm. The ease of collection reduces the cost of manufacturing equipment used in the production of the carbon nanoparticles and increases the yield of the carbon nanoparticles. Additionally, particles greater than 10 μm in size pose fewer safety concerns compared to the risks of handling smaller nanoparticles, e.g., potential health and safety risks due to inhalation of the smaller nanoparticles. The lower health and safety risks, thus, further reduce the manufacturing cost.

In some embodiments, a carbon nanoparticle has a ratio of graphene to MWSFs from 10% to 90%, or from 10% to 80%, or from 10% to 140%, or from 10% to 40%, or from 10% to 20%, or from 20% to 40%, or from 20% to 90%, or from 40% to 90%, or from 140% to 90%, or from 80% to 90%. In some embodiments, a carbon aggregate has a ratio of graphene to MWSFs is from 10% to 90%, or from 10% to 80%, or from 10% to 140%, or from 10% to 40%, or from 10% to 20%, or from 20% to 40%, or from 20% to 90%, or from 40% to 90%, or from 140% to 90%, or from 80% to 90%. In some embodiments, a carbon nanoparticle has a ratio of graphene to connected MWSFs from 10% to 90%, or from 10% to 80%, or from 10% to 140%, or from 10% to 40%, or from 10% to 20%, or from 20% to 40%, or from 20% to 90%, or from 40% to 90%, or from 60% to 90%, or from 80% to 90%. In some embodiments, a carbon aggregate has a ratio of graphene to connected MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%.

In some embodiments, Raman spectroscopy is used to characterize carbon allotropes to distinguish their molecular structures. For example, graphene can be characterized using Raman spectroscopy to determine information such as order/disorder, edge and grain boundaries, thickness, number of layers, doping, strain, and thermal conductivity. MWSFs have also been characterized using Raman spectroscopy to determine the degree of order of the MWSFs.

In some embodiments, Raman spectroscopy is used to characterize the structure of graphene, MWSFs or connected MWSFs. The main peaks in the Raman spectra are the G-mode and the D-mode. The G-mode is attributed to the vibration of carbon atoms in $sp^2$-hybridized carbon networks, and the D-mode is related to the breathing of hexagonal carbon rings with defects. In some cases, defects may be present, yet may not be detectable in the Raman spectra. For example, if the presented crystalline structure is orthogonal with respect to the basal plane, the D-peak will show an increase. On the other hand, if presented with a perfectly planar surface that is parallel with respect to the basal plane, the D-peak will be zero.

When using 532 nm incident light, the Raman G-mode is typically at 1582 $cm^{-1}$ for planar graphite, however can be downshifted for MWSFs or connected MWSFs (e.g., down to 1565 $cm^{-1}$ or down to 1580 $cm^{-1}$). The D-mode is observed at approximately 1350 $cm^{-1}$ in the Raman spectra of MWSFs or connected MWSFs. The ratio of the intensities of the D-mode peak to G-mode peak (i.e., the $I_D/I_G$) is related to the degree of order of the MWSFs, where a lower $I_D/I_G$ indicates a higher degree of order. An $I_D/I_G$ near or below 1 indicates a relatively high degree of order, and an $I_D/I_G$ greater than 1.1 indicates a lower degree of order.

In some embodiments, a carbon nanoparticle or a carbon aggregate containing graphene, MWSFs or connected MWSFs, as described herein, has a Raman spectrum with a first Raman peak at about 1350 $cm^{-1}$ and a second Raman peak at about 1580 $cm^{-1}$ when using 532 nm incident light. In some embodiments, the ratio of an intensity of the first Raman peak to an intensity of the second Raman peak (i.e., the $I_D/I_G$) for the nanoparticles or the aggregates described herein is in a range from 0.95 to 1.05, or from 0.9 to 1.1, or from 0.8 to 1.2, or from 0.9 to 1.2, or from 0.8 to 1.1, or from 0.5 to 1.5, or less than 1.5, or less than 1.2, or less than 1.1, or less than 1, or less than 0.95, or less than 0.9, or less than 0.8.

In some embodiments, a carbon aggregate containing graphene, MWSFs or connected MWSFs, as defined above, has a high purity. In some embodiments, the carbon aggregate containing graphene, MWSFs or connected MWSFs has a ratio of carbon to metals of greater than 99.99%, or greater than 99.95%, or greater than 99.9%, or greater than 99.8%, or greater than 99.5%, or greater than 99%. In some embodiments, the carbon aggregate has a ratio of carbon to other elements of greater than 99.99%, or greater than 99.95%, or greater than 99.9%, or greater than 99.5%, or greater than 99%, or greater than 90%, or greater than 80%, or greater than 70%, or greater than 60%. In some embodiments, the carbon aggregate has a ratio of carbon to other elements (except for hydrogen), such as oxygen, metals or other contaminants, of greater than 99.99%, or greater than 99.95%, or greater than 99.9%, or greater than 99.8%, or greater than 99.5%, or greater than 99%, or greater than 90%, or greater than 80%, or greater than 70%, or greater than 60%.

In some embodiments, a carbon aggregate containing graphene, MWSFs or connected MWSFs, as defined above, has a high specific surface area. In some embodiments, the carbon aggregate has a Brunauer, Emmett and Teller (BET) specific surface area from 10 to 200 $m^2/g$, or from 10 to 100 $m^2/g$, or from 10 to 50 $m^2/g$, or from 50 to 200 $m^2/g$, or from 50 to 100 $m^2/g$, or from 10 to 1000 $m^2/g$.

In some embodiments, a carbon aggregate containing graphene, MWSFs or connected MWSFs, as defined above, has a high electrical conductivity. In some embodiments, a carbon aggregate containing graphene, MWSFs or connected MWSFs, as defined above, is compressed into a pellet and the pellet has an electrical conductivity greater than 500 S/m, or greater than 1000 S/m, or greater than 2000 S/m, or greater than 3000 S/m, or greater than 4000 S/m, or greater than 5000 S/m, or greater than 10000 S/m, or greater than 20000 S/m, or greater than 30000 S/m, or greater than 40000 S/m, or greater than 50000 S/m, or greater than 60000 S/m, or greater than 70000 S/m, or from 500 S/m to 100000 S/m, or from 500 S/m to 1000 S/m, or from 500 S/m to 10000 S/m, or from 500 S/m to 20000 S/m, or from 500 S/m to 100000 S/m, or from 1000 S/m to 10000 S/m, or from 1000 S/m to 20000 S/m, or from 10000 to 100000 S/m, or from 10000 S/m to 80000 S/m, or from 500 S/m to 10000 S/m. In some cases, the density of the pellet is approximately 1 $g/cm^3$, or approximately 1.2 $g/cm^3$, or approximately 1.5 $g/cm^3$, or approximately 2 $g/cm^3$, or approximately 2.2 $g/cm^3$, or approximately 2.5 $g/cm^3$, or approximately 3 $g/cm^3$. Additionally, tests have been performed in which compressed pellets of the carbon aggregate materials have been formed with compressions of 2000 psi and 12000 psi and with annealing temperatures of 800° C. and 1000° C. The higher compression and/or the higher annealing temperatures generally result in pellets with a higher degree of electrical conductivity, including in the range of 12410.0 S/m to 13173.3 S/m.

Post-Processing High Purity Structured Carbons

In some embodiments, the carbon nanoparticles and aggregates containing graphene, multi-walled spherical fullerenes (MWSFs) or connected MWSFs described herein are produced and collected, and no post-processing is done. In other embodiments, the carbon nanoparticles and aggregates containing graphene, multi-walled spherical fullerenes (MWSFs) or connected MWSFs described herein are produced and collected, and some post-processing is done. Some examples of post-processing involved in tuning deformation hysteresis in tires using graphene include mechanical processing such as ball milling, grinding, attrition milling, micro fluidizing, and other techniques to reduce the particle size without damaging the graphene or MWSFs. Some further examples of post-processing include exfoliation processes such as sheer mixing, chemical etching, oxidizing (e.g., Hummer method), annealing, doping by adding elements during annealing (e.g., sulfur, nitrogen), steaming, filtering, and lypolizing, among others. Some examples of post-processing include sintering processes such as spark plasma sintering (SPS), direct current sintering, microwave sintering, and ultraviolet (UV) sintering, which can be conducted at high pressure and temperature in an inert gas. In some embodiments, multiple post-processing methods can be used together or in a series. In some embodiments, the post-processing produces functionalized carbon nanoparticles or aggregates containing graphene, multi-walled spherical fullerenes (MWSFs) or connected MWSFs.

In some embodiments, the materials are mixed together in different combinations. In some embodiments, different carbon nanoparticles and aggregates containing graphene, MWSFs or connected MWSFs described herein are mixed together before post-processing. For example, different carbon nanoparticles and aggregates containing graphene, MWSFs or connected MWSFs with different properties (e.g., different sizes, different compositions, different purities, from different processing runs, etc.) can be mixed together. In some embodiments, the carbon nanoparticles and aggregates containing MWSFs or connected MWSFs described herein can be mixed with graphene to change the ratio of the connected MWSFs to graphene in the mixture. In some embodiments, different carbon nanoparticles and aggregates containing graphene, MWSFs or connected MWSFs described herein can be mixed together after post-processing. For example, different carbon nanoparticles and aggregates containing graphene, MWSFs or connected MWSFs with different properties and/or different post-processing methods (e.g., different sizes, different compositions, different functionality, different surface properties, different surface areas) can be mixed together.

In some embodiments, the carbon nanoparticles and aggregates described herein are produced and collected, and subsequently processed by mechanical grinding, milling, and/or exfoliating. In some embodiments, the processing (e.g., by mechanical grinding, milling, exfoliating, etc.) reduces the average size of the particles. In some embodiments, the processing (e.g., by mechanical grinding, milling, exfoliating, etc.) increases the average surface area of the particles. In some embodiments, the processing by mechanical grinding, milling and/or exfoliation shears off some fraction of the carbon layers, producing sheets of graphite mixed with the carbon nanoparticles.

In some embodiments, the mechanical grinding or milling is performed using a ball mill, a planetary mill, a rod mill, a shear mixer, a high-shear granulator, an autogenous mill, or other types of machining used to break solid materials into smaller pieces by grinding, crushing or cutting. In some embodiments, the mechanical grinding, milling and/or exfoliating is performed wet or dry. In some embodiments, the mechanical grinding is performed by grinding for some period of time, then idling for some period of time, and repeating the grinding and idling for a number of cycles. In some embodiments, the grinding period is from 1 minute to 20 minutes, or from 1 minute to 10 minutes, or from 3 minutes to 8 minutes, or approximately 3 minutes, or approximately 8 minutes. In some embodiments, the idling period is from 1 minute to 10 minutes, or approximately 5 minutes, or approximately 6 minutes. In some embodiments, the number of grinding and idling cycles is from 1 minute to 100 minutes, or from 5 minutes to 100 minutes, or from 10 minutes to 100 minutes, or from 5 minutes to 10 minutes, or from 5 minutes to 20 minutes. In some embodiments, the total amount of time of grinding and idling is from 10 minutes to 1200 minutes, or from 10 minutes to 600 minutes, or from 10 minutes to 240 minutes, or from 10 minutes to 120 minutes, or from 100 minutes to 90 minutes, or from 10 minutes to 60 minutes, or approximately 90 minutes, or approximately 120 minutes.

In some embodiments, the grinding steps in the cycle are performed by rotating a mill in one direction for a first cycle (e.g., clockwise), and then rotating a mill in the opposite direction (e.g., counterclockwise) for the next cycle. In some embodiments, the mechanical grinding or milling is performed using a ball mill, and the grinding steps are performed using a rotation speed from 100 to 1000 rpm, or from 100 to 500 rpm, or approximately 400 rpm. In some embodiments, the mechanical grinding or milling is performed using a ball mill that uses a milling media with a diameter from 0.1 mm to 20 mm, or from 0.1 mm to 10 mm, or from 1 mm to 10 mm, or approximately 0.1 mm, or approximately 1 mm, or approximately 10 mm. In some embodiments, the mechanical grinding or milling is performed using a ball mill that uses a milling media composed of metal such as steel, an oxide such as zirconium oxide (zirconia), yttria stabilized zirconium oxide, silica, alumina, magnesium oxide, or other hard materials such as silicon carbide or tungsten carbide.

In some embodiments, the carbon nanoparticles and aggregates described herein are produced and collected, and subsequently processed using elevated temperatures such as annealing or sintering. In some embodiments, the processing using elevated temperatures is done in an inert environment such as nitrogen or argon. In some embodiments, the processing using elevated temperatures is done at atmospheric pressure, or under vacuum, or at low pressure. In some embodiments, the processing using elevated temperatures is done at a temperature from 500° C. to 2500° C., or from 500° C. to 1500° C., or from 800° C. to 1500° C., or from 800° C. to 1200° C., or from 800° C. to 1000° C., or from 2000° C. to 2400° C., or approximately 800° C., or approximately 1000° C., or approximately 1500° C., or approximately 2000° C., or approximately 2400° C.

In some embodiments, the carbon nanoparticles and aggregates described herein are produced and collected, and subsequently, in post processing steps, additional elements or compounds are added to the carbon nanoparticles, thereby incorporating the unique properties of the carbon nanoparticles and aggregates into other mixtures of materials.

In some embodiments, either before or after post-processing, the carbon nanoparticles and aggregates described herein are added to solids, liquids or slurries of other elements or compounds to form additional mixtures of materials incorporating the unique properties of the carbon nanoparticles and aggregates. In some embodiments, the carbon nanoparticles and aggregates described herein are mixed with other solid particles, polymers or other materials.

In some embodiments, either before or after post-processing, the carbon nanoparticles and aggregates described herein are used in various applications beyond applications pertaining to tuning deformation hysteresis in tires using graphene. Such applications including but not limited to transportation applications (e.g., automobile and truck tires, couplings, mounts, elastomeric o-rings, hoses, sealants, grommets, etc.) and industrial applications (e.g., rubber additives, functionalized additives for polymeric materials, additives for epoxies, etc.).

FIGS. 14A and 14B show transmission electron microscope (TEM) images of as-synthesized carbon nanoparticles. The carbon nanoparticles of FIG. 14A (at a first magnification) and FIG. 14B (at a second magnification) contain connected multi-walled spherical fullerenes 1402 (MWSFs) with graphene layers 1404 that coat the connected MWSFs. The ratio of MWSF to graphene allotropes in this example is approximately 80% due to the relatively short resonance times. The MWSFs in FIG. 14A are approximately 5 nm to 10 nm in diameter, and the diameter can be from 5 nm to 500 nm using the conditions described above. In some embodiments, the average diameter across the MWSFs is in a range from 5 nm to 500 nm, or from 5 nm to 250 nm, or from 5 nm to 100 nm, or from 5 nm to 50 nm, or from 10 nm to 500 nm, or from 10 nm to 250 nm, or from 10 nm to 100 nm, or from 10 nm to 50 nm, or from 40 nm to 500 nm, or from 40 nm to 250 nm, or from 40 nm to 100 nm, or from 50 nm to 500 nm, or from 50 nm to 250 nm, or from 50 nm to 100 nm. No catalyst was used in this process, and therefore, there is no central seed containing contaminants. The aggregate particles produced in this example had a particle size of approximately 10 μm to 100 μm, or approximately 10 μm to 500 μm.

FIG. 14C shows the Raman spectrum of the as-synthesized aggregates in this example taken with 532 nm incident light. The $I_D/I_G$ for the aggregates produced in this example is from approximately 0.99 to 1.03, indicating that the aggregates were composed of carbon allotropes with a high degree of order.

FIG. 14D and FIG. 14E show example TEM images of the carbon nanoparticles after size reduction by grinding in a ball mill. The ball milling was performed in cycles with a 3-minute counter-clockwise grinding step, followed by a 6-minute idle step, followed by a 3 minute clockwise grinding step, followed by a 6-minute idle step. The grinding steps were performed using a rotation speed of 400 rpm. The milling media was zirconia and ranged in size from 0.1 mm to 10 mm. The total size reduction processing time was from 60 minutes to 120 minutes. After size reduction, the aggregate particles produced in this example had a particle size of approximately 1 μm to 5 μm. The carbon nanoparticles after size reduction are connected MWSFs with layers of graphene coating the connected MWSFs.

FIG. 14F shows a Raman spectrum from these aggregates after size reduction taken with a 532 nm incident light. The $I_D/I_G$ for the aggregate particles in this example after size reduction is approximately 1.04. Additionally, the particles after size reduction had a Brunauer, Emmett and Teller (BET) specific surface area of approximately 40 m²/g to 50 m²/g.

The purity of the aggregates produced in this sample were measured using mass spectrometry and x-ray fluorescence (XRF) spectroscopy. The ratio of carbon to other elements, except for hydrogen, measured in 16 different batches was from 99.86% to 99.98%, with an average of 99.94% carbon.

FIG. 14G, FIG. 14H and FIG. 14I show TEM images of as-synthesized carbon nanoparticles of this example. The carbon nanoparticles contain connected multi-walled spherical fullerenes (MWSFs) with layers of graphene coating the connected MWSFs. The ratio of multi-walled fullerenes to graphene allotropes in this example is approximately 30% due to the relatively long resonance times allowing thicker, or more, layers of graphene to coat the MWSFs. No catalyst was used in this process, and therefore, there is no central seed containing contaminants. The as-synthesized aggregate particles produced in this example had particle sizes of approximately 10 μm to 500 μm. FIG. 14J shows a Raman spectrum from the aggregates of this example. The Raman signature of the as-synthesized particles in this example is indicative of the thicker graphene layers which coat the MWSFs in the as-synthesized material. Additionally, the as-synthesized particles had a Brunauer, Emmett and Teller (BET) specific surface area of approximately 90 m²/g to 100 m²/g.

FIG. 14K and FIG. 14L show TEM images of the carbon nanoparticles of this example. Specifically, the images depict the carbon nanoparticles after performance of size reduction by grinding in a ball mill. The size reduction process conditions were the same as those described as pertains to the foregoing FIG. 14G through FIG. 14J. After size reduction, the aggregate particles produced in this example had a particle size of approximately 1 μm to 5 μm.

The TEM images show that the connected MWSFs that were buried in the graphene coating can be observed after size reduction. FIG. 14M shows a Raman spectrum from the aggregates of this example after size reduction taken with 532 nm incident light. The $I_D/I_G$ for the aggregate particles in this example after size reduction is approximately 1, indicating that the connected MWSFs that were buried in the graphene coating as-synthesized had become detectable in Raman after size reduction, and were well ordered. The particles after size reduction had a Brunauer, Emmett and Teller (BET) specific surface area of approximately 90 m²/g to 100 m²/g.

FIG. 14N is a scanning electron microscope (SEM) image of carbon aggregates showing the graphite and graphene allotropes at a first magnification. FIG. 14O is a SEM image of carbon aggregates showing the graphite and graphene allotropes at a second magnification. The layered graphene is clearly shown within the distortion (wrinkles) of the carbon. The 3D structure of the carbon allotropes is also visible.

The particle size distribution of the carbon particles of FIG. 14N and FIG. 14O is shown in FIG. 14P. The mass basis cumulative particle size distribution 1406 corresponds to the left y-axis in the graph ($Q^3(x)$ [%]). The histogram of the mass particle size distribution 1408 corresponds to the right axis in the graph ($dQ^3(x)$ [%]). The median particle size is approximately 33 μm. The 10th percentile particle size is approximately 9 μm, and the 90th percentile particle size is approximately 103 μm. The mass density of the particles is approximately 10 g/L.

The particle size distribution of the carbon particles captured from a multiple-stage reactor is shown in FIG. 14Q. The mass basis cumulative particle size distribution 1414 corresponds to the left y-axis in the graph ($Q^3(x)$ [%]). The histogram of the mass particle size distribution 1416 corresponds to the right axis in the graph ($dQ^3(x)$ [%]). The median particle size captured is approximately 11 μm. The 10th percentile particle size is approximately 3.5 μm, and the 90th percentile particle size is approximately 21 μm. The graph in FIG. 14Q also shows the number basis cumulative particle size distribution 1418 corresponding to the left y-axis in the graph ($Q^0(x)$ [%]). The median particle size by number basis is from approximately 0.1 μm to approximately 0.2 μm. The mass density of the particles collected is approximately 22 g/L.

Returning to the discussion of FIG. 14P, the graph also shows a second set of example results. Specifically, in this example, the particles were size-reduced by mechanical grinding, and then the size-reduced particles were processed using a cyclone separator. The mass basis cumulative particle size distribution 1410 of the size-reduced carbon particles captured in this example corresponds to the left y-axis in the graph ($Q^3(x)$ [%]). The histogram of the mass basis particle size distribution 1412 corresponds to the right axis in the graph ($dQ^3(x)$ [%]). The median particle size of the size-reduced carbon particles captured in this example is approximately 6 μm. The 10th percentile particle size is from 1 μm to 2 μm, and the 90th percentile particle size is from 10 μm to 20 μm.

Further details pertaining to making and using cyclone separators can be found in U.S. patent application Ser. No. 15/725,928, filed Oct. 5, 2017, titled "Microwave Reactor System with Gas-Solids Separation," which is hereby incorporated by reference in its entirety.

High Purity Carbon Allotropes Produced Using Microwave Reactor Systems

In some cases, carbon particles and aggregates containing graphite, graphene and amorphous carbon can be generated using a microwave plasma reactor system using a precursor material that contains methane, or contains isopropyl alcohol (IPA), or contains ethanol, or contains a condensed hydrocarbon (e.g., hexane). In some other examples, the carbon-containing precursors are optionally mixed with a supply gas (e.g., argon). The particles produced in this example contained graphite, graphene, amorphous carbon and no seed particles. The particles in this example had a ratio of carbon to other elements (other than hydrogen) of approximately 99.5% or greater.

In one particular example, a hydrocarbon was the input material for the microwave plasma reactor, and the separated outputs of the reactor comprised hydrogen gas and carbon particles containing graphite, graphene and amorphous carbon. The carbon particles were separated from the hydrogen gas in a multi-stage gas-solid separation system. The solids loading of the separated outputs from the reactor was from 0.001 g/L to 2.5 g/L.

FIG. 14R, FIG. 14S, and FIG. 14T are TEM images of as-synthesized carbon nanoparticles. The images show examples of graphite, graphene and amorphous carbon allotropes. The layers of graphene and other carbon materials can be clearly seen in the images.

The particle size distribution of the carbon particles captured is shown in FIG. 14U. The mass basis cumulative particle size distribution 1420 corresponds to the left y-axis in the graph ($Q^3(x)$ [%]). The histogram of the mass particle size distribution 1422 corresponds to the right axis in the graph ($dQ^3(x)$ [%]). The median particle size captured in the cyclone separator in this example was approximately 14 μm. The 10th percentile particle size was approximately 5 μm, and the 90th percentile particle size was approximately 28 μm. The graph in FIG. 14U also shows the number basis cumulative particle size distribution 1424 corresponding to the left y-axis in the graph ($Q^0(x)$ [%]). The median particle size by number basis in this example was from approximately 0.1 μm to approximately 0.2 μm.

FIG. 14V, FIG. 14W, FIG. 14X, and FIG. 14Y are images that show three-dimensional carbon-containing structures that are grown onto other three-dimensional structures. FIG. 14V is a 100× magnification of three-dimensional carbon structures grown onto carbon fibers, whereas FIG. 14W is a 200× magnification of three-dimensional carbon structures grown onto carbon fibers. FIG. 14X is a 1601× magnification of three-dimensional carbon structures grown onto carbon fibers. The three-dimensional carbon growth over the fiber surface is shown. FIG. 14Y is a 10000× magnification of three-dimensional carbon structures grown onto carbon fibers. The image depicts growth onto the basal plane as well as onto edge planes.

More specifically, FIGS. 14V-14Y show example SEM images of 3D carbon materials grown onto fibers using plasma energy from a microwave plasma reactor. FIG. 14V shows an SEM image of intersecting fibers 1431 and 1432 with 3D carbon material 1430 grown on the surface of the fibers. FIG. 14W is a higher magnification image (the scale bar is 300 μm compared to 500 μm for FIG. 14V) showing 3D carbon growth 1430 on the fiber 1432. FIG. 14X is a further magnified view (scale bar is 40 μm) showing 3D carbon growth 1430 on fiber surface 1435, where the 3D nature of the carbon growth 1430 can be clearly seen. FIG. 14Y shows a close-up view (scale bar is 500 nm) of the carbon alone, showing interconnection between basal planes 1436 and edge planes 1434 of numerous sub-particles of the 3D carbon material grown on the fiber. FIGS. 14V-6Y demonstrate the ability to grow 3D carbon on a 3D fiber structure according to some embodiments, such as 3D carbon growth grown on a 3D carbon fiber.

In some embodiments, 3D carbon growth on fibers can be achieved by introducing a plurality of fibers into the microwave plasma reactor and using plasma in the microwave reactor to etch the fibers. The etching creates nucleation sites such that when carbon particles and sub-particles are created by hydrocarbon disassociation in the reactor, growth of 3D carbon structures is initiated at these nucleation sites. The direct growth of the 3D carbon structures on the fibers, which themselves are three-dimensional in nature, provides a highly integrated, 3D structure with pores into which resin can permeate. This 3D reinforcement matrix (including the 3D carbon structures integrated with high aspect ratio reinforcing fibers) for a resin composite results in enhanced material properties, such as tensile strength and shear, compared to composites with conventional fibers that have smooth surfaces and which smooth surfaces typically delaminate from the resin matrix.

Functionalizing Carbon

In some embodiments, carbon materials, such as 3D carbon materials described herein, can be functionalized to promote adhesion and/or add elements such as oxygen, nitrogen, carbon, silicon, or hardening agents. In some embodiments, the carbon materials can be functionalized in-situ—that is, within the same reactor in which the carbon materials are produced. In some embodiments, the carbon materials can be functionalized in post-processing. For example, the surfaces of fullerenes or graphene can be functionalized with oxygen- or nitrogen-containing species which form bonds with polymers of the resin matrix, thus improving adhesion and providing strong binding to enhance the strength of composites.

Embodiments include functionalizing surface treatments for carbon (e.g., CNTs, CNO, graphene, 3D carbon materials such as 3D graphene) utilizing plasma reactors (e.g., microwave plasma reactors) described herein. Various embodiments can include in-situ surface treatment during creation of carbon materials that can be combined with a binder or polymer in a composite material. Various embodiments can include surface treatment after creation of the carbon materials while the carbon materials are still within the reactor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for manufacturing a tire, the method comprising:
   determining a hysteretic curve indicative of one or more mechanical properties of the tire, the one or more mechanical properties including at least a deformation of the tire;
   selecting a carbon structure based at least in part on the hysteretic curve;

generating a post-treatment carbon based on the carbon structure;
combining the post-treatment carbon and one or more materials;
curing the combination of the post-treatment carbon and the one or more materials; and
forming the tire based on the cured combination.

2. The method of claim 1, wherein the tire comprises:
a plurality of one or more elastic portions; and
a plurality of one or more plastic portions, wherein any one or more of the plurality of elastic portions and the plurality of plastic portions comprises one or more shapes.

3. The method of claim 2, wherein the carbon structure is configured to define the one or more shapes.

4. The method of claim 1, further comprising determining a surface functionality of the carbon structure.

5. The method of claim 1, further comprising performing a dynamic mechanical analysis on the carbon structure.

6. The method of claim 1, wherein the one or more materials includes any one or more of elastomers, additives, or accelerants.

7. The method of claim 1, further comprising determining whether or not the carbon structure has performance specifications that meet the set of mechanical properties of the tire.

8. The method of claim 7, further comprising tuning one or more parameters associated with manufacturing the tire based on the determination.

* * * * *